US012071788B2

(12) United States Patent
Allen et al.

(10) Patent No.: US 12,071,788 B2
(45) Date of Patent: Aug. 27, 2024

(54) ELECTRO-MECHANICAL LOCK CORE

(71) Applicant: dormakaba USA Inc., Indianapolis, IN (US)

(72) Inventors: Brendon Allen, Upland, CA (US); John Andrew Snodgrass, Plainwell, MI (US); Street Anthony Barnett, III, Watertown, MA (US); Michael Hans Viklund, Indianapolis, IN (US)

(73) Assignee: dormakaba USA Inc., Indianapolis, IN (US)

( * ) Notice: Subject to any disclaimer, the term of this patent is extended or adjusted under 35 U.S.C. 154(b) by 0 days.

(21) Appl. No.: 17/732,346

(22) Filed: Apr. 28, 2022

(65) Prior Publication Data

US 2022/0251879 A1 Aug. 11, 2022

Related U.S. Application Data

(63) Continuation of application No. 17/047,014, filed as application No. PCT/US2019/027220 on Apr. 12, 2019, now Pat. No. 11,339,589.
(Continued)

(51) Int. Cl.
*E05B 63/00* (2006.01)
*E05B 13/00* (2006.01)
(Continued)

(52) U.S. Cl.
CPC ........ *E05B 63/0056* (2013.01); *E05B 13/005* (2013.01); *E05B 13/101* (2013.01);
(Continued)

(58) Field of Classification Search
CPC .. E05B 63/0056; E05B 17/044; E05B 17/045; E05B 13/005; E05B 13/101;
(Continued)

(56) References Cited

U.S. PATENT DOCUMENTS 3,298,211 A 1/1967 Russell et al.
3,347,072 A 10/1967 Rose
(Continued)

FOREIGN PATENT DOCUMENTS

BR 112019007529 A2 7/2019
BR 112020004523 A2 9/2020
(Continued)

OTHER PUBLICATIONS

Computer Generated Translation for DE 102007005214 B3, Generated on Aug. 29, 2023, https://worldwide.espacenet.com/ (Year: 2023).*
(Continued)

*Primary Examiner* — Alyson M Merlino
(74) *Attorney, Agent, or Firm* — Faegre Drinker Biddle & Reath LLP

(57) ABSTRACT

An interchangeable electro-mechanical lock core for use with a lock device having a locked state and an unlocked state is disclosed. The interchangeable electro-mechanical lock core may include a moveable plug having a first position relative to a lock core body which corresponds to the lock device being in the locked state and a second position relative to a lock core body which corresponds to the lock device being in the unlocked state. The interchangeable electro-mechanical lock core may include a core keeper moveably coupled to a lock core body. The core keeper may be positionable in a retain position wherein the core keeper extends beyond an envelope of lock core body to hold the lock core body in an opening of the lock device and a remove position wherein the core keeper is retracted relative to retain position to permit removal.

17 Claims, 49 Drawing Sheets

Related U.S. Application Data

(60) Provisional application No. 62/657,578, filed on Apr. 13, 2018, provisional application No. 62/829,974, filed on Apr. 5, 2019.

(51) Int. Cl.
*E05B 13/10* (2006.01)
*E05B 17/04* (2006.01)
*E05B 27/00* (2006.01)
*E05B 47/00* (2006.01)

(52) U.S. Cl.
CPC ........ *E05B 17/045* (2013.01); *E05B 27/0042* (2013.01); *E05B 47/0001* (2013.01); *E05B 47/0005* (2013.01); *E05B 47/0012* (2013.01); *E05B 2047/0017* (2013.01)

(58) Field of Classification Search
CPC ............. E05B 47/0001; E05B 47/0012; E05B 47/0023; E05B 47/0638; E05B 47/0642; E05B 47/0038; E05B 47/0045; E05B 2047/0026; E05B 2047/0037; Y10T 70/7051; Y10T 70/7062; Y10T 70/7068; Y10T 70/7102; Y10T 70/7119; Y10T 70/713; Y10T 70/7136; Y10T 70/7944; Y10T 70/7915; Y10T 70/7921; Y10T 70/7644; Y10T 70/7661; Y10T 70/7684; Y10T 70/7706; Y10T 70/7723
See application file for complete search history.

(56) References Cited

U.S. PATENT DOCUMENTS 3,824,817 A 7/1974 Orr
3,905,213 A 9/1975 Roberts
3,990,283 A 11/1976 Nelson
4,386,510 A 6/1983 Best et al.
4,484,462 A 11/1984 Berkowitz
RE31,910 E 6/1985 Oliver
4,526,256 A 7/1985 Urdal
4,745,785 A 5/1988 Uebersax
4,747,281 A 5/1988 Monahan
4,789,859 A 12/1988 Clarkson et al.
4,850,210 A 7/1989 Adler et al.
4,876,783 A 10/1989 Campion et al.
4,972,694 A 11/1990 Aulbers et al.
4,995,249 A 2/1991 Preissler et al.
4,998,422 A 3/1991 Borgmann et al.
4,998,423 A 3/1991 Hsu
5,010,753 A 4/1991 Boris, Jr.
5,044,180 A 9/1991 Lebrecht
5,121,618 A 6/1992 Scott
5,209,087 A 5/1993 Cox
5,235,832 A 8/1993 Lux et al.
5,367,295 A 11/1994 Gokcebay et al.
5,507,162 A 4/1996 Chhatwal
5,552,777 A 9/1996 Gokcebay et al.
5,654,696 A 8/1997 Barrett et al.
5,682,779 A 11/1997 Dolev
5,701,773 A 12/1997 Markisello
5,749,253 A 5/1998 Glick et al.
5,752,399 A 5/1998 Shen
5,752,400 A 5/1998 Kim
5,813,260 A 9/1998 Widen
5,816,085 A 10/1998 Winardi et al.
5,839,305 A 11/1998 Aston
5,839,307 A 11/1998 Field et al.
5,921,123 A 7/1999 Schwarzkopf et al.
5,931,030 A 8/1999 Chen
5,933,086 A 8/1999 Tischendorf et al.
5,974,912 A 11/1999 Cheng et al.
6,000,609 A 12/1999 Gokcebay et al.
6,014,877 A 1/2000 Shen
6,035,673 A 3/2000 Harrison
6,125,673 A 10/2000 Luker
6,158,259 A 12/2000 Schmitz et al.
6,227,020 B1 5/2001 Lerchner
6,264,256 B1 7/2001 Hankel et al.
6,292,893 B1 9/2001 Micali
6,317,313 B1 11/2001 Mosgrove et al.
6,334,347 B1 1/2002 Iscla
6,337,618 B1 1/2002 Craig et al.
6,338,261 B1 1/2002 Liu
6,363,762 B1 4/2002 Kueng
6,370,928 B1 4/2002 Chies et al.
6,374,653 B1 4/2002 Gokcebay et al.
6,382,006 B1 5/2002 Field et al.
6,384,711 B1 5/2002 Cregger et al.
6,412,321 B1 7/2002 Aramburu et al.
6,442,986 B1 9/2002 Russell et al.
6,463,773 B1 10/2002 Dimig
6,474,122 B2 11/2002 Davis
6,523,377 B1 2/2003 Vonlanthen
6,544,627 B1 4/2003 Vijayen et al.
6,552,650 B1 4/2003 Gokcebay et al.
6,554,326 B1 4/2003 Goldman
6,564,601 B2 5/2003 Hyatt, Jr.
6,581,426 B2 6/2003 Bates et al.
6,604,394 B2 8/2003 Davis
6,615,625 B2 9/2003 Davis
6,668,606 B1 12/2003 Russell et al.
6,705,140 B1 3/2004 Dimig et al.
6,708,539 B1 3/2004 Widen
6,718,806 B2 4/2004 Davis
6,764,013 B2 7/2004 Ben-Aissa
6,766,673 B2 7/2004 Gast et al.
6,786,070 B1 9/2004 Dimig et al.
6,807,834 B2 10/2004 Tsai
6,822,552 B2 11/2004 Liden et al.
6,826,935 B2 12/2004 Gokcebay et al.
6,840,072 B2 1/2005 Russell et al.
6,848,286 B2 2/2005 Dimig
6,865,916 B2 3/2005 Goldman
6,880,376 B1 4/2005 Ko
6,927,670 B1 8/2005 Gokcebay et al.
6,967,562 B2 11/2005 Menard et al.
6,973,576 B2 12/2005 Giobbi
6,975,202 B1 12/2005 Rodriguez et al.
7,012,503 B2 3/2006 Nielsen
7,021,092 B2 4/2006 Loughlin et al.
7,036,344 B2 5/2006 Gast et al.
7,042,334 B2 5/2006 Mosgrove et al.
7,061,367 B2 6/2006 Mosgrove et al.
7,099,474 B1 8/2006 Liden et al.
7,111,165 B2 9/2006 Liden et al.
7,114,357 B2 10/2006 Armstrong et al.
7,123,127 B2 10/2006 Mosgrove et al.
7,205,882 B2 4/2007 Libin
7,222,508 B2 5/2007 Dickhans et al.
7,229,013 B2 6/2007 Ben-Aissa
7,251,474 B2 7/2007 Engstrom et al.
7,278,025 B2 10/2007 Saito et al.
7,296,447 B2 11/2007 Priest et al.
7,305,560 B2 12/2007 Giobbi
7,334,443 B2 2/2008 Meekma et al.
7,337,315 B2 2/2008 Micali
7,353,396 B2 4/2008 Micali et al.
7,363,788 B2 4/2008 Dimig et al.
7,380,279 B2 5/2008 Prokupets et al.
7,424,812 B2 9/2008 Loughlin et al.
7,434,426 B2 10/2008 Loughlin et al.
7,437,755 B2 10/2008 Farino et al.
7,446,644 B2 11/2008 Schaffzin et al.
7,471,199 B2 12/2008 Zimmerman et al.
7,472,280 B2 12/2008 Giobbi
7,591,160 B2 9/2009 Keller
7,600,129 B2 10/2009 Libin et al.
7,624,280 B2 11/2009 Oskari
7,624,606 B1 12/2009 Huang et al.
7,628,048 B2 12/2009 Huang et al.
7,640,773 B2 1/2010 Bellamy et al.
7,660,994 B2 2/2010 Libin et al.

(56) References Cited

U.S. PATENT DOCUMENTS

| | | | | |
|---|---|---|---|---|
| 7,673,481 | B2 | 3/2010 | Amir | |
| 7,690,231 | B1 | 4/2010 | Field et al. | |
| 7,694,542 | B2 | 4/2010 | Loughlin et al. | |
| 7,706,778 | B2 | 4/2010 | Lowe | |
| 7,712,342 | B2 | 5/2010 | Loughlin et al. | |
| 7,716,486 | B2 | 5/2010 | Libin et al. | |
| 7,802,293 | B2 | 9/2010 | Boyer et al. | |
| 7,822,989 | B2 | 10/2010 | Libin et al. | |
| 7,845,201 | B2 | 12/2010 | Meyerle et al. | |
| 7,845,202 | B2 * | 12/2010 | Padilla | E05B 9/086<br>70/278.1 |
| 7,870,769 | B2 | 1/2011 | Andersson | |
| 7,870,770 | B2 | 1/2011 | Blanch | |
| 7,874,190 | B2 | 1/2011 | Krisch et al. | |
| 7,905,125 | B2 | 3/2011 | Herdman | |
| 7,934,406 | B2 | 5/2011 | Loughlin et al. | |
| 7,958,759 | B2 | 6/2011 | Herdman | |
| 7,966,854 | B2 | 6/2011 | Imedio Ocana | |
| 7,980,106 | B2 | 7/2011 | Huang et al. | |
| 7,992,346 | B2 | 8/2011 | Finke | |
| 8,011,217 | B2 | 9/2011 | Marschalek et al. | |
| 8,015,597 | B2 | 9/2011 | Libin et al. | |
| 8,028,553 | B2 * | 10/2011 | Lange | E05B 47/0638<br>70/279.1 |
| 8,035,478 | B2 | 10/2011 | Lee | |
| 8,047,027 | B2 | 11/2011 | Loughlin et al. | |
| 8,070,061 | B2 | 12/2011 | Habraken | |
| 8,074,271 | B2 | 12/2011 | Davis et al. | |
| 8,074,479 | B2 | 12/2011 | Harley | |
| 8,079,240 | B2 | 12/2011 | Brown et al. | |
| 8,122,746 | B2 | 2/2012 | Hyatt, Jr. | |
| 8,144,941 | B2 | 3/2012 | Adams et al. | |
| 8,151,611 | B2 | 4/2012 | Herdman | |
| 8,161,783 | B2 | 4/2012 | Huang et al. | |
| 8,166,532 | B2 | 4/2012 | Chowdhury et al. | |
| 8,222,993 | B2 | 7/2012 | Bliding et al. | |
| 8,256,254 | B2 | 9/2012 | Bellamy | |
| 8,261,319 | B2 | 9/2012 | Libin et al. | |
| 8,272,241 | B2 | 9/2012 | Brown et al. | |
| 8,276,414 | B2 | 10/2012 | Luo | |
| 8,325,039 | B2 | 12/2012 | Picard et al. | |
| 8,331,544 | B2 | 12/2012 | Kraus et al. | |
| 8,336,349 | B2 | 12/2012 | Thimmappa et al. | |
| 8,352,730 | B2 | 1/2013 | Giobbi | |
| 8,368,507 | B2 | 2/2013 | Conreux et al. | |
| 8,370,911 | B1 | 2/2013 | Mallard | |
| 8,375,753 | B2 | 2/2013 | Goldman | |
| 8,419,083 | B2 | 4/2013 | Burmesch | |
| 8,447,969 | B2 | 5/2013 | Robinton et al. | |
| 8,448,484 | B2 | 5/2013 | Huang et al. | |
| 8,453,481 | B2 | 6/2013 | Meekma | |
| 8,456,277 | B2 | 6/2013 | Gillert et al. | |
| 8,459,071 | B2 | 6/2013 | Andersson | |
| 8,466,773 | B2 | 6/2013 | Willgert | |
| 8,468,861 | B2 | 6/2013 | Pukari et al. | |
| 8,482,378 | B2 | 7/2013 | Sadighi et al. | |
| 8,482,379 | B2 | 7/2013 | Conreux et al. | |
| 8,490,443 | B2 | 7/2013 | Gokcebay | |
| 8,490,444 | B2 | 7/2013 | Saari | |
| 8,495,898 | B2 | 7/2013 | Gokcebay | |
| 8,511,552 | B2 | 8/2013 | Habraken | |
| 8,516,865 | B2 | 8/2013 | Ferreira Sanchez | |
| 8,525,686 | B2 | 9/2013 | Burdenko | |
| 8,528,373 | B2 | 9/2013 | Hyatt et al. | |
| 8,539,802 | B2 | 9/2013 | Meyerle | |
| 8,543,684 | B2 | 9/2013 | Hulusi et al. | |
| 8,544,303 | B2 | 10/2013 | Andersson | |
| 8,552,875 | B2 | 10/2013 | Burdenko | |
| 8,581,690 | B2 | 11/2013 | Lappalainen et al. | |
| 8,593,249 | B2 | 11/2013 | Bliding et al. | |
| 8,604,903 | B2 | 12/2013 | Bowen et al. | |
| 8,616,031 | B2 | 12/2013 | Ullrich et al. | |
| 8,620,268 | B2 | 12/2013 | Metivier | |
| 8,628,019 | B2 | 1/2014 | Audebert et al. | |
| 8,635,462 | B2 | 1/2014 | Ullmann | |
| 8,640,513 | B2 | 2/2014 | Goren et al. | |
| 8,640,514 | B2 | 2/2014 | Goren et al. | |
| 8,643,469 | B2 | 2/2014 | Haeberli | |
| 8,683,833 | B2 | 4/2014 | Marschalek et al. | |
| 8,689,013 | B2 | 4/2014 | Habraken | |
| 8,712,365 | B2 | 4/2014 | Metivier | |
| 8,720,238 | B1 | 5/2014 | Davis | |
| 8,730,004 | B2 | 5/2014 | Elfstrom et al. | |
| 8,736,418 | B2 | 5/2014 | Bozionek et al. | |
| 8,776,557 | B2 | 7/2014 | Wang | |
| 8,776,561 | B1 | 7/2014 | Jones | |
| 8,780,201 | B1 | 7/2014 | Scalisi et al. | |
| 8,787,902 | B2 | 7/2014 | Kim | |
| 8,793,784 | B2 | 7/2014 | Metivier et al. | |
| 8,794,042 | B2 | 8/2014 | Herdman | |
| 8,800,402 | B2 | 8/2014 | Weum | |
| 8,805,434 | B2 | 8/2014 | Vasudevan | |
| 8,823,795 | B1 | 9/2014 | Scalisi et al. | |
| 8,836,470 | B2 | 9/2014 | Pineau et al. | |
| 8,840,020 | B2 | 9/2014 | Litz et al. | |
| 8,842,180 | B1 | 9/2014 | Kasmir et al. | |
| 8,854,177 | B2 | 10/2014 | Pineau et al. | |
| 8,872,915 | B1 | 10/2014 | Scalisi et al. | |
| 8,881,252 | B2 | 11/2014 | Van et al. | |
| 8,893,420 | B2 | 11/2014 | Milde et al. | |
| 8,907,763 | B2 | 12/2014 | Pineau et al. | |
| 8,912,879 | B2 | 12/2014 | Fyke et al. | |
| 8,919,024 | B2 | 12/2014 | Milde, Jr. | |
| 8,922,333 | B1 | 12/2014 | Kirkjan | |
| 8,928,457 | B2 | 1/2015 | Jin et al. | |
| 8,931,195 | B2 | 1/2015 | Milde, Jr. | |
| 8,933,778 | B2 | 1/2015 | Birkel et al. | |
| 8,937,659 | B1 | 1/2015 | Scalisi et al. | |
| 8,941,465 | B2 | 1/2015 | Pineau et al. | |
| 8,941,736 | B1 | 1/2015 | Scalisi | |
| 8,947,530 | B1 | 2/2015 | Scalisi | |
| 8,953,040 | B1 | 2/2015 | Scalisi et al. | |
| 8,970,344 | B2 | 3/2015 | Payson et al. | |
| 8,973,417 | B2 | 3/2015 | Bench et al. | |
| 8,990,889 | B2 | 3/2015 | Van et al. | |
| D727,769 | S | 4/2015 | Scalisi | |
| 9,002,536 | B2 | 4/2015 | Hatton | |
| 9,010,163 | B2 | 4/2015 | Romero | |
| 9,010,650 | B2 | 4/2015 | Audebert et al. | |
| 9,013,575 | B2 | 4/2015 | Scalisi | |
| 9,019,067 | B2 | 4/2015 | Bryla et al. | |
| 9,020,854 | B2 | 4/2015 | Giobbi | |
| D729,678 | S | 5/2015 | Scalisi | |
| 9,024,759 | B2 | 5/2015 | Uyeda et al. | |
| 9,027,372 | B2 | 5/2015 | Hickman | |
| 9,049,352 | B2 | 6/2015 | Scalisi et al. | |
| 9,051,759 | B2 | 6/2015 | Herdman | |
| 9,053,622 | B2 | 6/2015 | Scalisi | |
| 9,055,202 | B1 | 6/2015 | Scalisi et al. | |
| 9,057,210 | B2 | 6/2015 | Dumas et al. | |
| 9,058,738 | B1 | 6/2015 | Scalisi | |
| 9,060,103 | B2 | 6/2015 | Scalisi | |
| 9,060,104 | B2 | 6/2015 | Scalisi | |
| 9,065,987 | B2 | 6/2015 | Kasmir et al. | |
| 9,077,716 | B2 | 7/2015 | Myers et al. | |
| 9,085,917 | B2 | 7/2015 | Kriete et al. | |
| 9,087,246 | B1 | 7/2015 | Chin et al. | |
| 9,094,584 | B2 | 7/2015 | Scalisi et al. | |
| 9,098,825 | B2 | 8/2015 | Bashkin | |
| 9,098,953 | B2 | 8/2015 | Kincaid et al. | |
| 9,113,051 | B1 | 8/2015 | Scalisi | |
| 9,113,052 | B1 | 8/2015 | Scalisi et al. | |
| 9,118,819 | B1 | 8/2015 | Scalisi et al. | |
| 9,122,856 | B2 | 9/2015 | Litz et al. | |
| 9,129,457 | B2 | 9/2015 | Sumcad et al. | |
| 9,133,647 | B2 | 9/2015 | Oh et al. | |
| 9,140,509 | B2 | 9/2015 | Sullivan et al. | |
| 9,141,090 | B2 | 9/2015 | Kalous et al. | |
| 9,148,416 | B2 | 9/2015 | Tse | |
| 9,148,417 | B2 | 9/2015 | Fieweger | |
| 9,158,288 | B2 | 10/2015 | Libin et al. | |
| 9,160,987 | B1 | 10/2015 | Kasmir et al. | |
| 9,165,444 | B2 | 10/2015 | Scalisi | |
| 9,172,920 | B1 | 10/2015 | Kasmir et al. | |

(56) References Cited

U.S. PATENT DOCUMENTS 9,172,921 B1 10/2015 Scalisi et al.
9,172,922 B1 10/2015 Kasmir et al.
9,179,107 B1 11/2015 Scalisi et al.
9,179,108 B1 11/2015 Scalisi et al.
9,179,109 B1 11/2015 Kasmir et al.
9,183,683 B2 11/2015 Osman et al.
9,196,104 B2 11/2015 Dumas et al.
9,196,133 B2 11/2015 Scalisi et al.
9,197,867 B1 11/2015 Scalisi et al.
9,206,620 B2 12/2015 Karsil et al.
9,208,628 B2 12/2015 Gokcebay
9,217,616 B2 12/2015 Sullivan et al.
9,218,696 B2 12/2015 Dumas et al.
9,222,282 B2 12/2015 Russo et al.
9,222,284 B2 12/2015 Gokcebay
D747,384 S 1/2016 Scalisi
D747,385 S 1/2016 Scalisi
D747,640 S 1/2016 Scalisi
9,230,424 B1 1/2016 Scalisi et al.
9,237,318 B2 1/2016 Kasmir et al.
9,247,219 B2 1/2016 Kasmir et al.
9,251,360 B2 2/2016 Meyer et al.
9,253,176 B2 2/2016 Ford et al.
9,253,455 B1 2/2016 Harrison et al.
9,258,281 B2 2/2016 Metivier et al.
9,273,492 B2 3/2016 Gokcebay
9,292,985 B2 3/2016 Ahearn et al.
9,303,935 B2 4/2016 Milde, Jr.
9,305,412 B2 4/2016 Winkelman
9,307,403 B2 4/2016 Neafsey et al.
9,310,147 B2 4/2016 Milde, Jr.
9,312,926 B2 4/2016 Neafsey et al.
9,316,025 B2 4/2016 Lien
9,316,454 B2 4/2016 Milde, Jr.
9,317,985 B2 4/2016 Tehranchi et al.
9,317,986 B2 4/2016 Tehranchi et al.
9,322,194 B2 4/2016 Cheng et al.
9,322,201 B1 4/2016 Cheng et al.
9,326,094 B2 4/2016 Johnson et al.
D755,037 S 5/2016 Czerwinski et al.
9,328,533 B2 5/2016 Wu
9,328,535 B2 5/2016 Baker et al.
9,330,514 B2 5/2016 Kuenzi et al.
9,332,377 B2 5/2016 Agardh et al.
9,336,637 B2 5/2016 Neil et al.
9,342,936 B2 5/2016 Scalisi
9,349,113 B2 5/2016 Bashkin
9,351,100 B2 5/2016 Tarnhed et al.
9,353,551 B2 5/2016 Martinez et al.
9,359,794 B2 6/2016 Cheng
9,363,803 B2 6/2016 Seo et al.
9,369,454 B2 6/2016 Porzio et al.
9,369,455 B2 6/2016 Huang et al.
9,374,349 B1 6/2016 Corlett et al.
9,378,598 B2 6/2016 Dumas et al.
9,378,599 B2 6/2016 Lee
9,382,739 B1 7/2016 Johnson et al.
9,390,572 B2 7/2016 Almomani
9,395,133 B2 7/2016 Milde et al.
9,406,178 B2 8/2016 Pukari
9,426,653 B2 8/2016 Becker et al.
9,437,062 B2 9/2016 Ahearn et al.
9,437,063 B2 9/2016 Schoenfelder et al.
9,443,362 B2 9/2016 Singh
9,443,365 B2 9/2016 Ahearn et al.
9,447,609 B2 9/2016 Johnson et al.
9,449,443 B2 9/2016 Libin et al.
9,449,448 B2 9/2016 Andersen
9,454,889 B2 9/2016 Kerning
9,462,470 B2 10/2016 Ehrensvard
9,464,462 B1 10/2016 Liu
9,467,859 B2 10/2016 Moss et al.
9,470,017 B1 10/2016 Cheng et al.
9,470,018 B1 10/2016 Cheng et al.
9,472,034 B2 10/2016 Ahearn et al.
9,476,226 B2 10/2016 Wheeler et al.
9,478,084 B1 10/2016 Robinson
9,489,511 B2 11/2016 Rodzevski et al.
9,489,787 B1 11/2016 Ives-Halperin et al.
9,500,006 B2 11/2016 Dayanikli et al.
9,501,880 B2 11/2016 Handville et al.
9,501,883 B2 11/2016 Handville et al.
9,508,206 B2 11/2016 Ahearn et al.
9,508,239 B1 11/2016 Harrison et al.
9,509,719 B2 11/2016 Neely
9,514,327 B2 12/2016 Ford
9,524,594 B2 12/2016 Ouyang et al.
9,524,601 B1 12/2016 Dumas
9,528,294 B2 12/2016 Johnson et al.
9,528,296 B1 12/2016 Cheng et al.
9,530,262 B2 12/2016 Johnson
9,530,264 B2 12/2016 Caterino et al.
9,530,295 B2 12/2016 Johnson
9,531,721 B2 12/2016 Neafsey et al.
9,534,420 B1 1/2017 Cheng et al.
9,536,359 B1 1/2017 Gokcebay
9,536,363 B2 1/2017 Ahearn et al.
9,540,848 B1 1/2017 Wu
9,542,785 B2 1/2017 Meganck et al.
9,546,504 B2 * 1/2017 Overgaard .......... E05B 63/0056
9,548,973 B2 1/2017 Hulusi et al.
9,553,860 B2 1/2017 Meyer
9,562,370 B2 2/2017 Ohl et al.
9,567,773 B2 2/2017 Dore et al.
9,574,372 B2 2/2017 Johnson et al.
9,580,931 B2 2/2017 Myers et al.
9,587,415 B2 3/2017 Walls et al.
9,589,397 B1 3/2017 Christopher et al.
9,589,403 B2 3/2017 Lingan et al.
9,589,406 B2 3/2017 Borg et al.
9,591,682 B2 3/2017 Astrand et al.
9,593,522 B1 3/2017 Murar et al.
9,595,148 B2 3/2017 Borg et al.
9,613,476 B2 4/2017 Johnson
9,613,483 B2 4/2017 Giobbi
9,617,757 B2 4/2017 Lowder
9,619,954 B2 4/2017 Allibhoy et al.
9,624,695 B1 4/2017 Cheng et al.
9,626,859 B2 4/2017 Ribas et al.
9,631,400 B2 4/2017 Liu et al.
9,640,001 B1 5/2017 Vazquez et al.
9,640,004 B2 5/2017 Lowder
9,644,398 B1 5/2017 Cheng et al.
9,644,399 B2 5/2017 Johnson et al.
9,644,400 B1 5/2017 Cheng et al.
9,647,996 B2 5/2017 Johnson et al.
9,652,913 B2 5/2017 Drako et al.
9,652,917 B2 5/2017 Johnson et al.
9,654,450 B2 5/2017 Ford et al.
9,659,422 B2 5/2017 Lovelock et al.
9,659,424 B2 5/2017 Huber et al.
9,663,972 B2 5/2017 Ullrich et al.
9,666,000 B1 5/2017 Schoenfelder et al.
9,672,345 B2 6/2017 Davis et al.
9,672,674 B2 6/2017 Meganck et al.
9,679,429 B2 6/2017 Duncan et al.
9,681,426 B2 6/2017 Seo et al.
9,683,391 B2 6/2017 Johnson et al.
9,683,392 B1 6/2017 Cheng et al.
9,685,015 B2 6/2017 Johnson
9,685,017 B2 6/2017 Johnson
9,685,018 B2 6/2017 Johnson
9,690,272 B2 6/2017 Chin et al.
9,690,348 B2 6/2017 Chin et al.
9,690,959 B2 6/2017 Chin et al.
9,691,198 B2 6/2017 Cheng et al.
9,691,205 B2 6/2017 Robinson
9,691,207 B2 6/2017 Almomani
9,695,616 B2 7/2017 Johnson et al.
9,697,656 B2 7/2017 Trani
9,697,657 B2 7/2017 Anderson et al.
9,697,664 B2 7/2017 Ribas et al.
9,704,314 B2 7/2017 Johnson et al.
9,704,316 B2 7/2017 Kirkjan

(56) References Cited

U.S. PATENT DOCUMENTS

| | | | |
|---|---|---|---|
| 9,704,320 | B2 | 7/2017 | Johnson et al. |
| 9,705,265 | B2 | 7/2017 | Lowder |
| 9,706,365 | B2 | 7/2017 | Johnson et al. |
| 9,710,987 | B2 | 7/2017 | Scoggins et al. |
| 9,713,002 | B2 | 7/2017 | Roy et al. |
| 9,721,413 | B2 | 8/2017 | Dumas et al. |
| 9,722,756 | B2 | 8/2017 | Seo et al. |
| 9,725,927 | B1 | 8/2017 | Cheng |
| 9,726,448 | B1 | 8/2017 | Milde et al. |
| 9,727,328 | B2 | 8/2017 | Johnson |
| 9,728,022 | B2 | 8/2017 | Gengler et al. |
| 9,728,023 | B2 | 8/2017 | Johnson |
| 9,736,284 | B2 | 8/2017 | Scalisi et al. |
| 9,739,555 | B2 | 8/2017 | Milde et al. |
| 9,741,186 | B1 | 8/2017 | Lemke |
| 9,743,049 | B2 | 8/2017 | Scalisi et al. |
| 9,747,735 | B1 | 8/2017 | Drako et al. |
| 9,747,737 | B2 | 8/2017 | Kuenzi |
| 9,747,739 | B2 | 8/2017 | Gengler et al. |
| 9,754,433 | B2 | 9/2017 | Lagimodiere et al. |
| 9,760,705 | B2 | 9/2017 | Davis et al. |
| 9,761,073 | B2 | 9/2017 | Cheng et al. |
| 9,761,074 | B2 | 9/2017 | Cheng et al. |
| 9,763,086 | B2 | 9/2017 | Benoit et al. |
| 9,767,267 | B2 | 9/2017 | Davis et al. |
| 9,767,630 | B1 | 9/2017 | Kazerani et al. |
| 9,767,632 | B2 | 9/2017 | Johnson |
| 9,769,161 | B2 | 9/2017 | Davis et al. |
| 9,769,435 | B2 | 9/2017 | Scalisi et al. |
| 9,773,364 | B2 | 9/2017 | Kerning et al. |
| 9,779,569 | B2 | 10/2017 | Yun |
| 9,781,599 | B2 | 10/2017 | Myers et al. |
| 9,786,133 | B2 | 10/2017 | Harrison et al. |
| 9,792,747 | B2 | 10/2017 | Baumgarte et al. |
| 9,797,166 | B2 | 10/2017 | Dore et al. |
| 9,799,183 | B2 | 10/2017 | Harrison et al. |
| 9,803,942 | B2 | 10/2017 | Milde, Jr. |
| 9,805,534 | B2 | 10/2017 | Ho et al. |
| 9,811,960 | B2 | 11/2017 | Voss |
| 9,818,247 | B2 | 11/2017 | Johnson |
| 9,826,561 | B2 | 11/2017 | Bolin et al. |
| 9,836,906 | B2 | 12/2017 | Carstens et al. |
| 9,841,743 | B2 | 12/2017 | Davis |
| 9,842,446 | B2 | 12/2017 | Vecchiotti et al. |
| 9,842,447 | B2 | 12/2017 | Badger, II |
| 9,847,020 | B2 | 12/2017 | Davis |
| 9,852,559 | B2 | 12/2017 | Rettig et al. |
| 9,852,562 | B2 | 12/2017 | Belhadia et al. |
| 9,852,567 | B2 | 12/2017 | Hild et al. |
| 9,860,928 | B2 | 1/2018 | Astrand et al. |
| 9,865,112 | B2 | 1/2018 | Maiwand et al. |
| 9,865,113 | B2 | 1/2018 | Maiwand et al. |
| 9,865,144 | B2 | 1/2018 | Trani |
| 9,870,460 | B2 | 1/2018 | Eberwine et al. |
| 9,870,665 | B2 | 1/2018 | Maiwand et al. |
| 9,879,932 | B2 | 1/2018 | Milde et al. |
| 9,883,370 | B2 | 1/2018 | Kerning et al. |
| 9,886,617 | B2 | 2/2018 | Rowe et al. |
| 9,886,806 | B2 | 2/2018 | Bashkin |
| 9,888,216 | B2 | 2/2018 | Scalisi et al. |
| 9,892,579 | B2 | 2/2018 | Ku |
| 9,898,880 | B2 | 2/2018 | Nagisetty et al. |
| 9,902,368 | B2 | 2/2018 | Maiwand et al. |
| 9,913,135 | B2 | 3/2018 | Perold et al. |
| 9,916,707 | B2 | 3/2018 | Vincent et al. |
| 9,916,746 | B2 | 3/2018 | Johnson et al. |
| 9,922,473 | B1 | 3/2018 | Haworth et al. |
| 9,922,481 | B2 | 3/2018 | Johnson et al. |
| 9,924,319 | B2 | 3/2018 | Hoyer et al. |
| 9,934,637 | B2 | 4/2018 | Ribas et al. |
| 9,940,491 | B2 | 4/2018 | Lim et al. |
| 9,940,768 | B2 | 4/2018 | Carstens et al. |
| 9,947,153 | B2 | 4/2018 | Bergerhoff et al. |
| 9,947,154 | B2 | 4/2018 | Davis et al. |
| 9,947,155 | B2 | 4/2018 | Trani |
| 9,947,158 | B2 | 4/2018 | Baumgarte et al. |
| 9,959,690 | B2 | 5/2018 | Zielinski et al. |
| 9,959,692 | B2 | 5/2018 | Hild et al. |
| 9,963,107 | B2 | 5/2018 | Murar et al. |
| 9,965,911 | B2 | 5/2018 | Wishne |
| 9,972,144 | B2 | 5/2018 | Klein et al. |
| 9,985,950 | B2 | 5/2018 | Caterino et al. |
| 9,997,036 | B2 | 6/2018 | Scalisi |
| 9,998,922 | B2 | 6/2018 | Robinton et al. |
| 9,999,984 | B2 | 6/2018 | Wilhelm et al. |
| 9,999,989 | B2 | 6/2018 | Rago et al. |
| 10,008,057 | B2 | 6/2018 | Ives-Halperin et al. |
| 10,008,061 | B2 | 6/2018 | Klink et al. |
| 10,009,145 | B2 | 6/2018 | Seo et al. |
| 10,012,010 | B2 | 7/2018 | Baker et al. |
| 10,013,825 | B2 | 7/2018 | Belhadia et al. |
| 10,015,653 | B2 | 7/2018 | Lang et al. |
| 10,017,963 | B2 | 7/2018 | Johnson et al. |
| 10,026,249 | B2 | 7/2018 | Grandpre et al. |
| 10,026,253 | B2 | 7/2018 | Giobbi |
| 10,027,170 | B2 | 7/2018 | Holmstroem |
| 10,033,702 | B2 | 7/2018 | Ford et al. |
| 10,033,972 | B2 | 7/2018 | Almomani et al. |
| 10,037,525 | B2 | 7/2018 | Neafsey |
| 10,044,519 | B2 | 8/2018 | Kasmir et al. |
| 10,050,948 | B2 | 8/2018 | Lagerstedt et al. |
| 10,062,232 | B2 | 8/2018 | Allibhoy et al. |
| 10,062,251 | B2 | 8/2018 | Kasmir et al. |
| 10,074,224 | B2 | 9/2018 | Ho et al. |
| 10,083,559 | B2 | 9/2018 | Schoenfelder et al. |
| 10,083,560 | B2 | 9/2018 | Baumgarte et al. |
| 10,115,256 | B2 | 10/2018 | Davis |
| 10,125,519 | B1 | 11/2018 | Gengler et al. |
| 10,181,231 | B2 | 1/2019 | Kristensen et al. |
| 10,186,099 | B2 | 1/2019 | Ahearn et al. |
| 10,192,383 | B2 | 1/2019 | Aase |
| 10,249,120 | B2 | 4/2019 | Ahearn et al. |
| 10,264,433 | B2 | 4/2019 | Ahearn et al. |
| 10,282,930 | B2 | 5/2019 | Borg et al. |
| 10,349,279 | B2 | 7/2019 | Myers et al. |
| 10,360,743 | B2 | 7/2019 | Ahearn et al. |
| 10,366,551 | B2 | 7/2019 | Drako et al. |
| 10,453,280 | B2 | 10/2019 | Kontturi |
| 10,472,859 | B2 | 11/2019 | Ku |
| 10,490,005 | B2 | 11/2019 | Caterino et al. |
| 10,492,066 | B2 | 11/2019 | Tarmey et al. |
| 10,540,835 | B2 | 1/2020 | Kuenzi et al. |
| 10,554,644 | B2 | 2/2020 | Toepke et al. |
| 10,580,240 | B2 | 3/2020 | Caterino et al. |
| 11,339,589 | B2 | 5/2022 | Allen et al. |
| 11,447,980 | B2 | 9/2022 | Snodgrass |
| 11,466,473 | B2 | 10/2022 | Barnett, III et al. |
| 2002/0144526 | A1 | 10/2002 | Ming-Chih |
| 2003/0217574 | A1 | 11/2003 | Meis |
| 2004/0007032 | A1 | 1/2004 | Davis |
| 2004/0055346 | A1 | 3/2004 | Gillert |
| 2004/0069028 | A1 | 4/2004 | Dimig et al. |
| 2004/0107751 | A1 | 6/2004 | Hyatt |
| 2004/0154364 | A1 | 8/2004 | Dimig et al. |
| 2004/0255628 | A1 | 12/2004 | Meyerle |
| 2005/0050929 | A1 | 3/2005 | Meyerle |
| 2005/0127687 | A1 | 6/2005 | Dimig |
| 2006/0010945 | A1 | 1/2006 | Herdman |
| 2006/0059548 | A1 | 3/2006 | Hildre et al. |
| 2006/0170533 | A1 | 8/2006 | Chioiu et al. |
| 2007/0017265 | A1 | 1/2007 | Andersson |
| 2007/0084259 | A1 | 4/2007 | Bellamy et al. |
| 2007/0200665 | A1 | 8/2007 | Studerus |
| 2007/0229257 | A1 | 10/2007 | Bliding et al. |
| 2008/0072636 | A1 | 3/2008 | Padilla et al. |
| 2008/0072637 | A1 | 3/2008 | Padilla et al. |
| 2008/0180211 | A1 | 7/2008 | Lien |
| 2008/0229793 | A1 | 9/2008 | Lange |
| 2009/0013736 | A1 | 1/2009 | Voosen |
| 2009/0127328 | A1 | 5/2009 | Aissa |
| 2009/0280862 | A1 | 11/2009 | Loughlin et al. |
| 2009/0320538 | A1 | 12/2009 | Pellaton |
| 2010/0011822 | A1 | 1/2010 | Imedio Ocana |
| 2010/0116007 | A1 | 5/2010 | Thimmappa et al. |

(56) References Cited

U.S. PATENT DOCUMENTS

2010/0194526 A1 8/2010 Loughlin et al.
2010/0194527 A1 8/2010 Loughlin et al.
2010/0199733 A1 8/2010 Herdman
2011/0232341 A1 9/2011 Herdman
2011/0291798 A1 12/2011 Schibuk
2012/0169461 A1 7/2012 Dubois, Jr.
2012/0213362 A1 8/2012 Bliding et al.
2012/0313383 A1 12/2012 Lundberg et al.
2013/0008213 A1 1/2013 Brown et al.
2013/0014552 A1 1/2013 Bench et al.
2013/0015671 A1 1/2013 Calleberg
2013/0061055 A1 3/2013 Schibuk
2013/0063246 A1 3/2013 Kim
2013/0139561 A1 6/2013 Parto et al.
2013/0212661 A1 8/2013 Neafsey et al.
2013/0257589 A1 10/2013 Mohiuddin et al.
2013/0312468 A1 11/2013 Read et al.
2013/0335193 A1 12/2013 Hanson et al.
2014/0002236 A1 1/2014 Pineau et al.
2014/0051407 A1 2/2014 Ahearn et al.
2014/0077929 A1 3/2014 Dumas et al.
2014/0145823 A1 5/2014 Aase
2014/0150502 A1 6/2014 Duncan
2014/0157842 A1 6/2014 Almomani et al.
2014/0165673 A1 6/2014 Tyner et al.
2014/0223976 A1 8/2014 Chiou et al.
2014/0260452 A1 9/2014 Chen
2014/0292481 A1 10/2014 Dumas et al.
2014/0298869 A1 10/2014 Wang
2014/0313010 A1 10/2014 Huang et al.
2014/0340196 A1 11/2014 Myers et al.
2014/0365773 A1 12/2014 Gerhardt et al.
2014/0365781 A1 12/2014 Dmitrienko et al.
2015/0101370 A1* 4/2015 Russo ................ E05B 47/0001
70/283.1
2015/0119019 A1 4/2015 Minichmayr
2015/0163206 A1 6/2015 McCarthy et al.
2015/0184423 A1 7/2015 Chen
2015/0184425 A1 7/2015 Ellis et al.
2015/0206367 A1 7/2015 Goldman et al.
2015/0233142 A1 8/2015 Schweitzer et al.
2015/0235492 A1 8/2015 Hong et al.
2015/0240531 A1 8/2015 Blust et al.
2015/0259950 A1 9/2015 Schweitzer et al.
2015/0279132 A1 10/2015 Perotti
2015/0287256 A1 10/2015 Davis
2015/0292240 A1 10/2015 Ribas et al.
2015/0292246 A1 10/2015 Schweitzer et al.
2015/0294517 A1 10/2015 Herrala
2015/0300048 A1 10/2015 Yen et al.
2015/0339870 A1 11/2015 Cojocaru et al.
2015/0350913 A1 12/2015 Eberwine et al.
2015/0356797 A1 12/2015 McBride et al.
2015/0356801 A1 12/2015 Nitu et al.
2016/0014103 A1 1/2016 Masters et al.
2016/0019733 A1 1/2016 Robinton et al.
2016/0035165 A1 2/2016 Dumas et al.
2016/0040452 A1 2/2016 Ku
2016/0042581 A1 2/2016 Ku
2016/0042582 A1 2/2016 Hyde et al.
2016/0047142 A1 2/2016 Gengler et al.
2016/0048673 A1 2/2016 Marchiori et al.
2016/0049027 A1 2/2016 Soldner et al.
2016/0086400 A1 3/2016 Dumas et al.
2016/0145900 A1 5/2016 Kaiser
2016/0189454 A1 6/2016 Johnson et al.
2016/0241559 A1 8/2016 Trani et al.
2016/0241999 A1 8/2016 Chin et al.
2016/0249159 A1 8/2016 Berg et al.
2016/0258189 A1 9/2016 Frolov
2016/0258202 A1 9/2016 Scalisi
2016/0261824 A1 9/2016 Scalisi
2016/0275733 A1 9/2016 Carstens et al.
2016/0275735 A1 9/2016 Carstens et al.
2016/0275739 A1 9/2016 Scalisi
2016/0275741 A1 9/2016 Carstens et al.
2016/0277383 A1 9/2016 Guyomarc'h et al.
2016/0277388 A1 9/2016 Lowe et al.
2016/0284147 A1 9/2016 Trani
2016/0284170 A1 9/2016 Kasmir et al.
2016/0284183 A1 9/2016 Trani
2016/0300417 A1 10/2016 Hatton
2016/0300476 A1 10/2016 Kasmir et al.
2016/0307380 A1 10/2016 Ho et al.
2016/0308859 A1 10/2016 Barry et al.
2016/0319569 A1 11/2016 Johnson et al.
2016/0319571 A1 11/2016 Johnson
2016/0330413 A1 11/2016 Scalisi et al.
2016/0341537 A1 11/2016 Ku
2016/0343188 A1 11/2016 Johnson
2016/0344091 A1 11/2016 Trani
2016/0358433 A1 12/2016 Johnson
2016/0358437 A1 12/2016 Johnson et al.
2017/0002587 A1 1/2017 Wheeler
2017/0009491 A1 1/2017 Nguyen et al.
2017/0016249 A1 1/2017 Johnson et al.
2017/0022733 A1 1/2017 Lowder
2017/0022735 A1 1/2017 Lowder
2017/0024693 A1 1/2017 Wiechers
2017/0030109 A1 2/2017 Duncan et al.
2017/0034485 A1 2/2017 Scalisi
2017/0048495 A1 2/2017 Scalisi
2017/0051533 A1 2/2017 Kester et al.
2017/0076520 A1 3/2017 Ho et al.
2017/0084132 A1 3/2017 Scalisi
2017/0085843 A1 3/2017 Scalisi et al.
2017/0085844 A1 3/2017 Scalisi et al.
2017/0098335 A1 4/2017 Payack, Jr.
2017/0109954 A1 4/2017 Drako et al.
2017/0132861 A1 5/2017 Ho et al.
2017/0145714 A1 5/2017 Ohl et al.
2017/0152677 A1 6/2017 Klammer et al.
2017/0180539 A1 6/2017 Payack, Jr.
2017/0187995 A1 6/2017 Scalisi et al.
2017/0193724 A1 7/2017 Johnson et al.
2017/0211294 A1 7/2017 Reese et al.
2017/0213404 A1 7/2017 Sivalingam et al.
2017/0221291 A1 8/2017 Gokcebay
2017/0226772 A1 8/2017 Lowder
2017/0228603 A1 8/2017 Johnson
2017/0228953 A1 8/2017 Lupovici
2017/0236345 A1 8/2017 Watters
2017/0236346 A1 8/2017 Murar et al.
2017/0236350 A1 8/2017 Lin
2017/0236354 A1 8/2017 Baker et al.
2017/0241164 A1 8/2017 Brown et al.
2017/0243420 A1 8/2017 Lien
2017/0243455 A1 8/2017 Johnson et al.
2017/0251366 A1 8/2017 Perna et al.
2017/0263065 A1 9/2017 Johnson
2017/0284128 A1 10/2017 Lim et al.
2017/0302424 A1 10/2017 Seo et al.
2017/0311161 A1 10/2017 Kuenzi
2017/0321453 A1 11/2017 Zheng et al.
2017/0328661 A1 11/2017 Milde, Jr.
2017/0330226 A1 11/2017 Kuenzi et al.
2017/0337758 A1 11/2017 Ahearn et al.
2017/0345236 A1 11/2017 Kuenzi et al.
2017/0352207 A1 12/2017 Siklosi
2017/0365119 A1 12/2017 Yun
2018/0007041 A1 1/2018 Davis et al.
2018/0045479 A1 2/2018 Milde, Jr.
2018/0051484 A1 2/2018 Picard et al.
2018/0068503 A1 3/2018 Prasad et al.
2018/0069722 A1 3/2018 Scalisi et al.
2018/0073274 A1 3/2018 Johnson et al.
2018/0081335 A1 3/2018 Davis
2018/0082577 A1 3/2018 Davis
2018/0089915 A1 3/2018 Lundberg
2018/0091500 A1 3/2018 Baty et al.
2018/0091641 A1 3/2018 Trani
2018/0094456 A1 4/2018 Lowder
2018/0096593 A1 4/2018 Davis
2018/0103030 A1 4/2018 Einberg et al.

(56) References Cited

U.S. PATENT DOCUMENTS

| | | | | |
|---|---|---|---|---|
| 2018/0114384 | A1 | 4/2018 | Graziano | |
| 2018/0115897 | A1 | 4/2018 | Einberg et al. | |
| 2018/0122219 | A1 | 5/2018 | Caterino et al. | |
| 2018/0130273 | A1 | 5/2018 | Eid | |
| 2018/0135336 | A1 | 5/2018 | Johnson et al. | |
| 2018/0135337 | A1 | 5/2018 | Johnson et al. | |
| 2018/0146336 | A1 | 5/2018 | Hoyer et al. | |
| 2018/0151007 | A1 | 5/2018 | Einberg et al. | |
| 2018/0151013 | A1 | 5/2018 | Carstens et al. | |
| 2018/0179785 | A1 | 6/2018 | Liddell et al. | |
| 2018/0179786 | A1 | 6/2018 | Johnson | |
| 2018/0191889 | A1 | 7/2018 | Gerhardt et al. | |
| 2018/0204399 | A1 | 7/2018 | Newman | |
| 2018/0211457 | A1 | 7/2018 | Haworth et al. | |
| 2018/0211462 | A1 | 7/2018 | Wendling et al. | |
| 2018/0225899 | A1 | 8/2018 | Baumgarte et al. | |
| 2018/0253917 | A1 | 9/2018 | Kazerani et al. | |
| 2018/0261029 | A1 | 9/2018 | Johnson et al. | |
| 2018/0268675 | A1 | 9/2018 | Johnson et al. | |
| 2018/0270214 | A1 | 9/2018 | Caterino et al. | |
| 2018/0332033 | A1 | 11/2018 | Lakhani et al. | |
| 2018/0357845 | A1 | 12/2018 | Berg et al. | |
| 2019/0026731 | A1 | 1/2019 | Neafsey | |
| 2019/0035185 | A1 | 1/2019 | Kuenzi | |
| 2019/0035188 | A1 | 1/2019 | Kuenzi et al. | |
| 2019/0141504 | A1 | 5/2019 | Ahearn et al. | |
| 2019/0169874 | A1 | 6/2019 | Gengler et al. | |
| 2019/0172281 | A1 | 6/2019 | Einberg et al. | |
| 2019/0218826 | A1 * | 7/2019 | Allen | E05B 47/0012 |
| 2019/0279451 | A1 | 9/2019 | Wishne | |
| 2019/0325678 | A1 | 10/2019 | Ahearn et al. | |
| 2019/0335334 | A1 | 10/2019 | Myers et al. | |
| 2019/0340854 | A1 | 11/2019 | Ahearn et al. | |
| 2019/0347883 | A1 | 11/2019 | Klink et al. | |
| 2019/0362578 | A1 | 11/2019 | Baker et al. | |
| 2020/0024868 | A1 | 1/2020 | Snodgrass | |
| 2020/0040607 | A1 | 2/2020 | Snodgrass et al. | |
| 2020/0151986 | A1 | 5/2020 | Kuenzi et al. | |
| 2020/0199911 | A1 | 6/2020 | Allen et al. | |
| 2020/0318392 | A1 | 10/2020 | Barnett, III et al. | |
| 2021/0246689 | A1 | 8/2021 | Allen et al. | |

FOREIGN PATENT DOCUMENTS

| | | | | |
|---|---|---|---|---|
| CN | 1056921 | A | 12/1991 | |
| CN | 1181121 | A | 5/1998 | |
| CN | 1702274 | A | 11/2005 | |
| CN | 2858885 | Y | 1/2007 | |
| CN | 1930351 | A | 3/2007 | |
| CN | 101065552 | A | 10/2007 | |
| CN | 101500861 | A | 8/2009 | |
| CN | 104763242 | A | 7/2015 | |
| CN | 105971401 | A | 9/2016 | |
| CN | 110114541 | A | 8/2019 | |
| DE | 29703559 | U1 | 4/1997 | |
| DE | 19612156 | C2 | 7/1998 | |
| DE | 29911356 | U1 | 10/1999 | |
| DE | 19854454 | C2 | 9/2000 | |
| DE | 102007005214 | B3 * | 6/2008 | E05B 47/0012 |
| DE | 202008007068 | U1 * | 11/2009 | E05B 47/0012 |
| DE | 102018202563 | A1 * | 8/2019 | E05B 47/004 |
| EP | 0588209 | A1 | 3/1994 | |
| EP | 0999328 | A1 | 5/2000 | |
| EP | 1065335 | A1 | 1/2001 | |
| EP | 1079051 | A1 | 2/2001 | |
| EP | 1174572 | A2 | 1/2002 | |
| EP | 1653415 | A1 | 5/2006 | |
| EP | 1903168 | A2 | 3/2008 | |
| EP | 2275628 | A2 | 1/2011 | |
| EP | 2348490 | A1 | 7/2011 | |
| EP | 2620919 | A1 | 7/2013 | |
| EP | 2725823 | A1 | 4/2014 | |
| EP | 2998485 | A1 * | 3/2016 | E05B 47/0615 |
| EP | 3009992 | A1 | 4/2016 | |
| EP | 3147868 | A1 | 3/2017 | |
| EP | 3156980 | A1 | 4/2017 | |
| EP | 3188136 | A1 | 7/2017 | |
| EP | 1908898 | B1 * | 12/2017 | E05B 1/0007 |
| EP | 3293995 | A1 | 3/2018 | |
| EP | 3327679 | A1 | 5/2018 | |
| EP | 3358534 | A1 | 8/2018 | |
| GB | 2178476 | A | 2/1987 | |
| GB | 2262770 | B | 3/1995 | |
| WO | 2004/020767 | A1 | 3/2004 | |
| WO | 2004/034336 | A1 | 4/2004 | |
| WO | 2007/142405 | A1 | 12/2007 | |
| WO | 2012/009607 | A1 | 1/2012 | |
| WO | 2012/073265 | A1 | 6/2012 | |
| WO | 2013/019281 | A1 | 2/2013 | |
| WO | 2014/140922 | A2 | 9/2014 | |
| WO | 2014/150172 | A2 | 9/2014 | |
| WO | 2014/151692 | A2 | 9/2014 | |
| WO | 2015/013275 | A1 | 1/2015 | |
| WO | 2015/031812 | A1 | 3/2015 | |
| WO | 2015/054646 | A2 | 4/2015 | |
| WO | 2015/054667 | A1 | 4/2015 | |
| WO | 2015/138726 | A1 | 9/2015 | |
| WO | 2015/138740 | A1 | 9/2015 | |
| WO | 2015/138747 | A1 | 9/2015 | |
| WO | 2016/001489 | A1 | 1/2016 | |
| WO | 2016/023558 | A1 | 2/2016 | |
| WO | 2016/075545 | A1 | 5/2016 | |
| WO | 2016/130777 | A1 | 8/2016 | |
| WO | 2016/131416 | A1 | 8/2016 | |
| WO | 2016/150951 | A1 | 9/2016 | |
| WO | 2016/172119 | A1 | 10/2016 | |
| WO | 2016/185013 | A1 | 11/2016 | |
| WO | 2016/196025 | A1 | 12/2016 | |
| WO | 2016/202796 | A1 | 12/2016 | |
| WO | 2017/066849 | A1 | 4/2017 | |
| WO | 2017/082823 | A1 | 5/2017 | |
| WO | 2017/091826 | A1 | 6/2017 | |
| WO | 2017/136110 | A1 | 8/2017 | |
| WO | 2017/175020 | A1 | 10/2017 | |
| WO | 2017/180381 | A1 | 10/2017 | |
| WO | 2017/180388 | A1 | 10/2017 | |
| WO | 2017/180454 | A1 | 10/2017 | |
| WO | 2017/180563 | A1 | 10/2017 | |
| WO | 2017/201029 | A1 | 11/2017 | |
| WO | 2017/207476 | A1 | 12/2017 | |
| WO | 2018/041904 | A1 | 3/2018 | |
| WO | 2018/075605 | A1 | 4/2018 | |
| WO | 2018/081697 | A1 | 5/2018 | |
| WO | 2018/091660 | A1 | 5/2018 | |
| WO | 2018/104383 | A1 | 6/2018 | |
| WO | 2018/104384 | A1 | 6/2018 | |
| WO | 2018/128754 | A1 | 7/2018 | |
| WO | 2018/128755 | A1 | 7/2018 | |
| WO | 2018/136740 | A2 | 7/2018 | |
| WO | 2018/136744 | A1 | 7/2018 | |
| WO | 2019/051337 | A1 | 3/2019 | |
| WO | 2019/200257 | A1 | 10/2019 | |
| WO | 2022/056298 | A1 | 3/2022 | |

OTHER PUBLICATIONS

Computer Generated Translation for DE 202008007068 U1, Generated on Aug. 29, 2023, https://worldwide.espacenet.com/ (Year: 2023).*

International Preliminary Report on Patentability received for PCT Patent Application No. PCT/US2017/057123, mailed on May 2, 2019, 27 pages.

International Preliminary Report on Patentability received for PCT Patent Application No. PCT/US2018/050117, mailed on Mar. 19, 2020, 17 pages.

International Preliminary Report on Patentability received for PCT Patent Application No. PCT/US2019/027220, mailed on Oct. 22, 2020, 9 pages.

International Search Report and Written Opinion received for PCT Patent Application No. PCT/US2017/057123, mailed on Jan. 4, 2018, 28 pages.

(56) References Cited

OTHER PUBLICATIONS

International Search Report and Written Opinion received for PCT Patent Application No. PCT/US2018/050117, mailed on Nov. 8, 2018, 18 pages.
International Search Report and Written Opinion received for PCT Patent Application No. PCT/US2019/027220, mailed on Aug. 15, 2019, 12 pages.
Poron (Reggistered) XRD (Trademark) Extreme Impact Protection—Physical Properties, Rogers Corporation, p. 1.

* cited by examiner

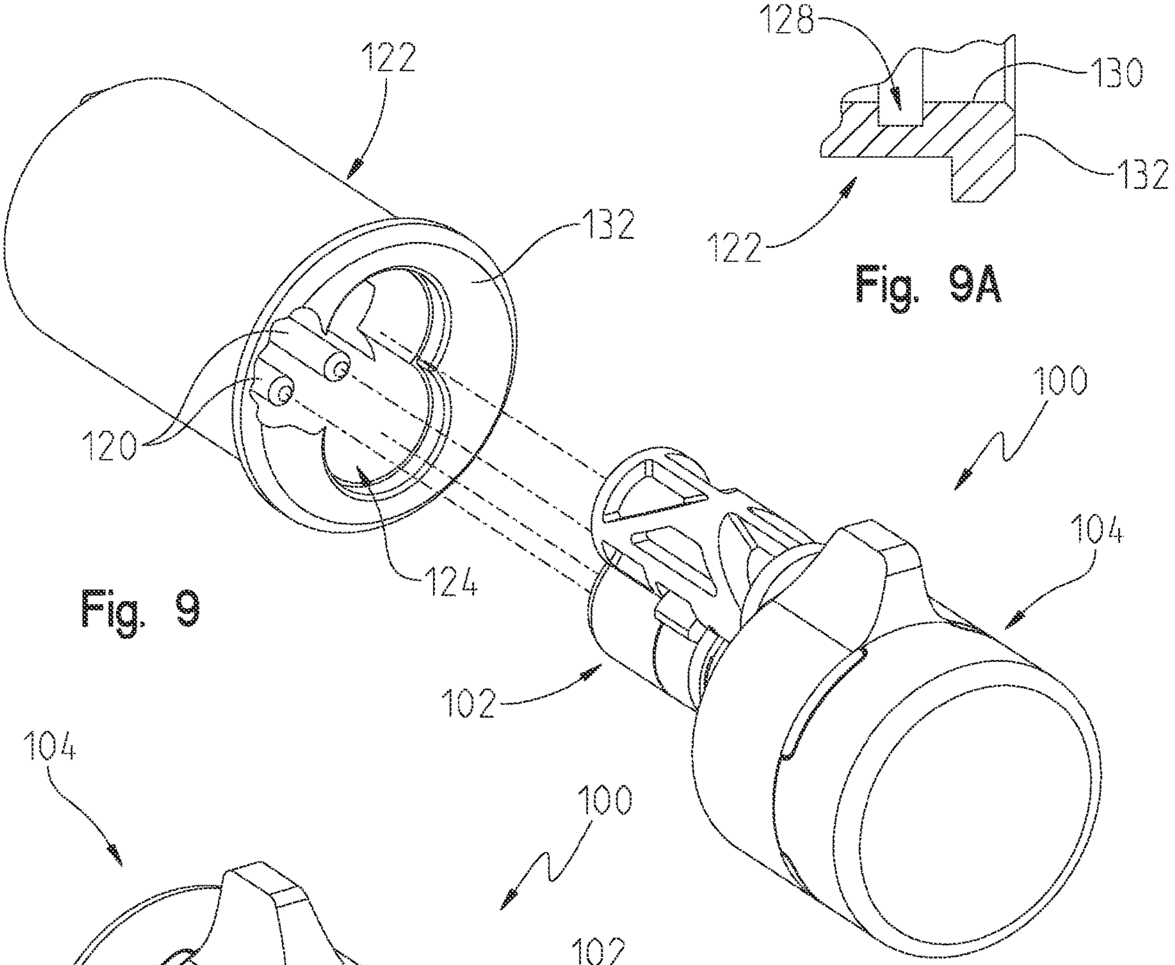
Fig. 9A
Fig. 9
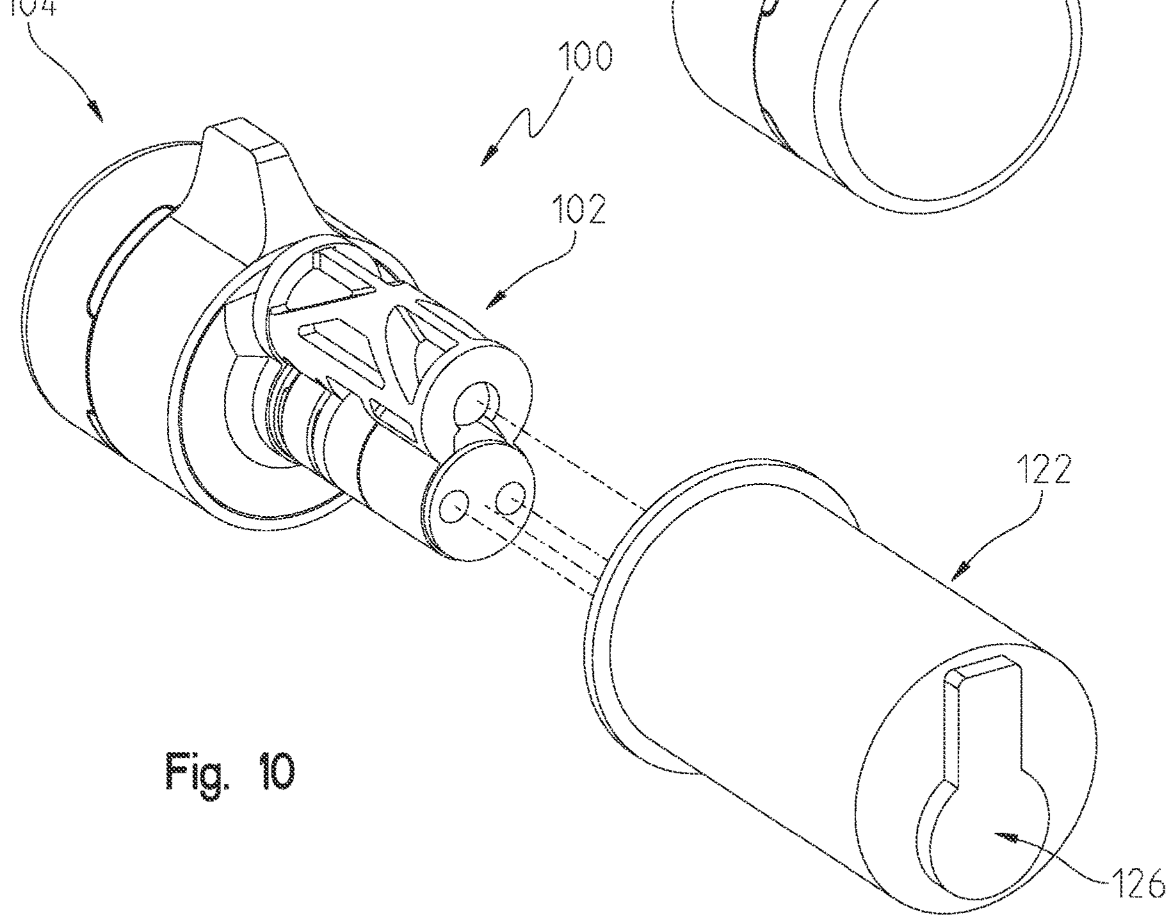
Fig. 10

ELECTRO-MECHANICAL LOCK CORE

RELATED APPLICATIONS

This application is a continuation of U.S. patent application Ser. No. 17/047,014, filed Oct. 12, 2020, which is a national stage application of PCT Patent Application No. PCT/US19/27220, filed Apr. 12, 2019, titled ELECTRO-MECHANICAL LOCK CORE, which claims the benefit of U.S. Provisional Application No. 62/657,578, filed Apr. 13, 2018, titled ELECTRO-MECHANICAL LOCK CORE and U.S. Provisional Application No. 62/829,974, filed Apr. 5, 2019, titled ELECTRO-MECHANICAL LOCK CORE the entire disclosures of which are expressly incorporated by reference herein.

FIELD

The present disclosure relates to lock cores and in particular to interchangeable lock cores having an electro-mechanical locking system.

BACKGROUND

Small format interchangeable cores (SFIC) can be used in applications in which re-keying is regularly needed. SFICs can be removed and replaced with alternative SFICs actuated by different keys, including different keys of the same format or different keys using alternative key formats such as physical keys and access credentials such as smartcards, proximity cards, key fobs, cellular telephones and the like.

SUMMARY

In embodiments, an interchangeable electro-mechanical lock core for use with a lock device having a locked state and an unlocked state is provided. The interchangeable electro-mechanical lock core may include a moveable plug having a first position relative to a lock core body which corresponds to the lock device being in the locked state and a second position relative to a lock core body which corresponds to the lock device being in the unlocked state. The interchangeable electro-mechanical lock core may include a core keeper moveably coupled to a lock core body. The core keeper may be positionable in a retain position wherein the core keeper extends beyond an envelope of lock core body to hold the lock core body in an opening of the lock device and a remove position wherein the core keeper is retracted relative to the retain position to permit removal of the lock core body from the opening of the lock device.

In an exemplary embodiment of the present disclosure, an interchangeable electro-mechanical lock core for use with a lock device having a locked state and an unlocked state is provided. The lock device including an opening sized to receive the interchangeable lock core. The interchangeable lock core comprising a lock core body having a front end and a rear end; a moveable plug positioned within an interior of the lock core body proximate a rear end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis; a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position; an operator actuatable assembly supported by the lock core body and including an operator actuatable input device positioned forward of the front end of the lock core body; an electro-mechanical control system which in a first configuration operatively couples the operator actuatable input device of the operator actuatable assembly to the moveable plug and in a second configuration uncouples the operator actuatable input device of the operator actuatable assembly from the moveable plug; and an actuator accessible from an exterior of the lock core body. The actuator operatively coupled to the core keeper independent of the moveable plug to move the core keeper from the retain position to the remove position.

In an example thereof, the actuator is a mechanical actuator. In another example thereof, the actuator is completely internal to the lock core body. In a variation thereof, the actuator is accessible through an opening in the lock core body. In a further example thereof, the operator actuatable input device blocks access to the opening in the lock core body when the operator actuatable input device is coupled to the lock core body.

In yet a further example thereof, the interchangeable electro-mechanical lock core further comprises a control sleeve. The moveable plug being received by the control sleeve. The core keeper extending from the control sleeve. The actuator being operatively coupled to the control sleeve independent of the core keeper. In a variation thereof, the control sleeve includes a first partial gear and the actuator includes a second partial gear, the first partial gear and the second partial gear are intermeshed to operatively couple the actuator to the core keeper.

In yet a further example thereof, the electro-mechanical control system includes a first blocker which is positionable in a first position wherein the actuator is incapable of moving the core keeper from the retain position to the remove position and a second position wherein the actuator is capable of moving the core keeper from the retain position to the remove position. In a variation thereof, the electro-mechanical control system includes an electronic controller, a motor driven by the electronic controller, a power source operatively coupled to the motor, and a clutch positionable by the motor in a first position to engage the moveable plug in the first configuration of the electro-mechanical control system and in a second position disengaged from the moveable plug in the second configuration of the electro-mechanical control system. In another variation thereof, each of the electronic controller, the motor, and the power source are supported by the operator actuatable assembly. In a further variation thereof, the first blocker is positionable by the clutch. In yet another variation thereof, the first blocker is carried by the clutch. In still another variation thereof, with the first blocker in the second position, the actuator is to be moved in two degrees of freedom to move the core keeper from the retain position to the remove position. In still a further yet variation, the two degrees of freedom include a translation followed by a rotation.

In yet another example thereof, the electro-mechanical control system includes an electronic controller executing an access granted logic to determine whether to permit or deny movement of the first.

In another exemplary embodiment of the present disclosure, an interchangeable lock core for use with a lock device having a locked state and an unlocked state is provided. The lock device including an opening sized to receive the interchangeable lock core. The interchangeable lock core comprising a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body, the lock core body having a front end and a rear end opposite the front end, the front end including a front face; a moveable plug positioned within the interior of the lock core body proximate the rear end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis; a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position; an operator actuatable assembly supported by the lock core body, the operator actuatable assembly including a base extending into the interior of the lock core body and an operator actuatable input device positioned forward of the front end of the lock core body and supported by the base; an electro-mechanical control system which in a first configuration operatively couples the operator actuatable input device of the operator actuatable assembly to the moveable plug and in a second configuration uncouples the operator actuatable input device of the operator actuatable assembly from the moveable plug; and a retainer which couples the operator actuatable assembly to the lock core body at a position between the front face of the lock core body and the rear end of the lock core body.

In an example thereof, the lock core body includes an opening and the base of the operator actuatable assembly includes a groove, the retainer being positioned in the opening of the lock core body and the groove of the operator actuatable assembly. In a variation thereof, the groove is a circumferential groove and the retainer permits the operator actuatable assembly to freely rotate about the moveable plug axis.

In a further exemplary embodiment of the present disclosure, an interchangeable electro-mechanical lock core for use with a lock device having a locked state and an unlocked state is provided. The lock device including an opening sized to receive the interchangeable lock core. The interchangeable lock core comprising a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body, the lock core body having a front end and a rear end opposite the front end, the front end including a front face; a moveable plug positioned within the interior of the lock core body proximate the rear end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis; a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position; an operator actuatable assembly supported by the lock core body, the operator actuatable assembly including an operator actuatable input device positioned forward of the front end of the lock core body and supported by the lock core body, the operator actuatable input device including a knob portion intersecting the moveable plug axis and a thumb tab extending outward from the knob portion; and an electro-mechanical control system which in a first configuration operatively couples the operator actuatable input device of the operator actuatable assembly to the moveable plug and in a second configuration uncouples the operator actuatable input device of the operator actuatable assembly from the moveable plug.

In an example thereof, the knob portion is rotationally symmetrical about the moveable plug axis. In another example thereof, a first portion of the knob portion is a first portion of a base, a second portion of the base is positioned internal to the lock core body, and a second portion of the knob portion is a cover which is supported by the base. In a variation thereof, the electro-mechanical control system includes an electronic controller, a motor driven by the electronic controller, and a power source operatively coupled to the motor, each of the electronic controller, the motor, and the power source are supported by the base of the operator actuatable assembly. In a further variation thereof, the knob portion circumscribes the power source and the electronic controller. In still a further variation thereof, the electro-mechanical control system includes a clutch positionable by the motor in a first position to engage the moveable plug in the first configuration of the electro-mechanical control system and in a second position disengaged from the moveable plug in the second configuration of the electro-mechanical control system. In yet another variation thereof, the power source intersects the moveable plug axis.

In a still further example thereof, the electro-mechanical control system includes an electronic controller, a motor driven by the electronic controller, and a power source operatively coupled to the motor, each of the electronic controller, the motor, and the power source are supported by the operator actuatable assembly. In a variation thereof, the operator actuatable assembly is freely spinning about the moveable plug axis when the electro-mechanical control system is in the second configuration. In another variation thereof, the electro-mechanical control system includes a clutch positionable by the motor in a first position to engage the moveable plug in the first configuration of the electro-mechanical control system and in a second position disengaged from the moveable plug in the second configuration of the electro-mechanical control system.

In a further yet example thereof, the operator actuatable input device is freely spinning about the moveable plug axis when the electro-mechanical control system is in the second configuration.

In a further still exemplary embodiment of the present disclosure, a method of accessing a core keeper of an interchangeable lock core having an operator actuatable assembly is provided. The method comprising the steps of moving, through a non-contact method, a retainer which couples a first portion of an operator actuatable input device of the operator actuatable assembly to a second portion of the operator actuatable assembly; and moving at least the first portion of the operator actuatable input device away from the lock core to provide access to an actuator operatively coupled to the core keeper.

In an example thereof, the moving step includes locating a plurality of magnets proximate the operator actuatable input device. In a variation thereof, the operator actuatable input device includes a knob portion and the step of locating the plurality of magnets proximate the operator actuatable input device includes the step of placing a ring about the knob portion, the ring supporting the plurality of magnets.

In a further still exemplary embodiment of the present disclosure, an interchangeable electro-mechanical lock core for use with a lock device having a locked state and an unlocked state is provided. The lock device including an opening sized to receive the interchangeable lock core. The interchangeable lock core comprising a lock core body having a front end and a rear end; a moveable plug positioned within an interior of the lock core body proximate a rear end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis; a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position; an operator actuatable assembly supported by the lock core body and including an operator actuatable input device positioned forward of the front end of the lock core body; an electro-mechanical control system which in a first configuration operatively couples the operator actuatable input device to the moveable plug; in a second configuration operatively couples the operator actuatable input device to the core keeper; and in a third configuration uncouples the operator actuatable input device from both the moveable plug and the core keeper, wherein the electro-mechanical control system automatically transitions between the first configuration, the second configuration, and the third configuration.

In an example thereof, in the second configuration of the electro-mechanical control system the operator actuatable input device is further operatively coupled to the moveable plug. In another example thereof, the electro-mechanical control system includes a motor and a control element driven by the motor to a first position relative to a front face of the moveable plug when the electro-mechanical control system is in the first configuration, to a second position relative to the front face of the moveable plug when the electro-mechanical control system is in the second configuration, and to a third position relative to the front face of the moveable plug when the electro-mechanical control system is in the third configuration. In a variation thereof, the front face of the moveable plug is between the front end of the lock core body and the rear end of the lock core body and an end of the control element is positioned between the front face of the moveable plug and the rear end of the lock core body in at least one of the first position of the control element, the second position of the control element, and the third position of the control element. In another variation thereof, the end of the control element is positioned between the front face of the moveable plug and the rear end of the lock core body in a plurality of the first position of the control element, the second position of the control element, and the third position of the control element.

In a further example thereof, the electro-mechanical lock core further comprises a control sleeve. The moveable plug received by the control sleeve, and the core keeper extending from the control sleeve. In a variation thereof, the electro-mechanical control system includes a cam member positioned within the moveable plug, the cam member being moveable from a first position wherein the operator actuatable input device is operatively uncoupled from the control sleeve to a second position wherein the operator actuatable input device is operatively coupled to the control sleeve. In a further variation thereof, the cam member is linearly translated along the moveable plug axis from the first position of the cam member to the second position of the cam member. In still a further variation thereof, the control element moves the cam member from the first position of the cam member to the second position of the cam member. In still another variation thereof, the cam member is rotated relative to the moveable plug from the first position of the cam member to the second position of the cam member. In a further still variation thereof, the control element moves the cam member from the first position of the cam member to the second position of the cam member. In yet still another variation thereof, the cam member is rotated about an axis perpendicular to the moveable plug axis.

In a further still example thereof, the lock core body includes an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body.

In a further still exemplary embodiment of the present disclosure, an interchangeable lock core for use with a lock device having a locked state and an unlocked state is provided. The lock device including an opening sized to receive the interchangeable lock core. The interchangeable lock core comprising a lock core body having a front end and a rear end; a moveable plug positioned within an interior of the lock core body proximate a rear end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis; a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position; an operator actuatable assembly supported by the lock core body and including an operator actuatable input device positioned forward of the front end of the lock core body; an electro-mechanical control system which in a first configuration operatively couples the operator actuatable input device to the moveable plug; in a second configuration operatively couples the operator actuatable input device to the core keeper; and in a third configuration uncouples the operator actuatable input device from both the lock plug and the core keeper, the electro-mechanical control system including a motor and a control element driven by the motor to a first position relative to a front face of the moveable plug when the electro-mechanical control system is in the first configuration, to a second position relative to the front face of the moveable plug when the electro-mechanical control system is in the second configuration, and to a third position relative to the front face of the moveable plug when the electro-mechanical control system is in the third configuration.

In an example thereof, the front face of the moveable plug is between the front end of the lock core body and the rear end of the lock core body and an end of the control element is positioned between the front face of the moveable plug and the rear end of the lock core body in at least one of the first position of the control element, the second position of the control element, and the third position of the control element. In a variation thereof, the end of the control element is positioned between the front face of the moveable plug and the rear end of the lock core body in a plurality of the first position of the control element, the second position of the control element, and the third position of the control element. In another variation thereof, the front face of the moveable plug is between the front end of the lock core body and the rear end of the lock core body and an end of the control element is positioned between the front face of the moveable plug and the front end of the lock core body in at least one of the first position of the control element, the second position of the control element, and the third position of the control element.

In a further example thereof, the electro-mechanical lock core further comprises a control sleeve. The moveable plug received by the control sleeve. The core keeper extending from the control sleeve. In a variation thereof, the electro-mechanical control system includes a cam member positioned within the moveable plug, the cam member being moveable from a first position wherein the operator actuatable input device is operatively uncoupled from the control sleeve to a second position wherein the operator actuatable input device is operatively coupled to the control sleeve. In another variation thereof, the cam member is linearly translated along the moveable plug axis from the first position of the cam member to the second position of the cam member.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 9 illustrates an exploded front perspective view of the electro-mechanical lock core of FIG. 1 for assembly to a lock cylinder shown with a partial cutaway;

FIG. 9A illustrates a partial sectional view of the lock cylinder of FIG. 9 illustrating an exemplary retainer of the lock cylinder;

FIG. 10 illustrates an exploded rear perspective view of the electro-mechanical lock core and lock cylinder of FIG. 9;

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
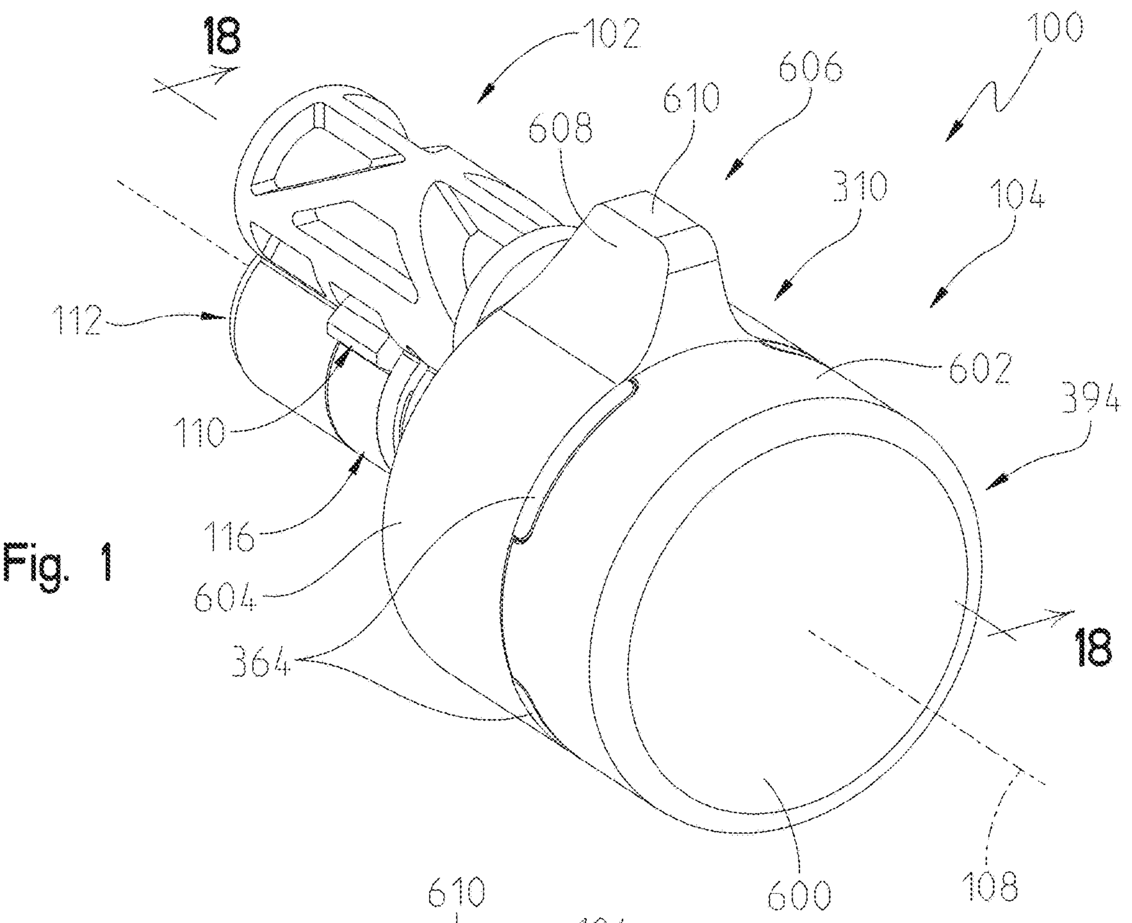
FIG. 1 illustrates a front perspective view of an electro-mechanical lock core.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms “couples”, “coupled”, “coupler” and variations thereof are used to include both arrangements wherein the two or more components are in direct physical contact and arrangements wherein the two or more components are not in direct contact with each other (e.g., the components are “coupled” via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIGS. 1-6, an electro-mechanical lock core 100 includes a core assembly 102 and an operator actuation assembly 104. As explained herein in more detail, in certain configurations operator actuation assembly 104 may be actuated to rotate a lock actuator plug 106 (see FIG. 14) of core assembly 102 about its longitudinal axis 108. Further, operator actuation assembly 104 may be oriented to permit access to a control assembly 176 (see FIG. 14) to move a core keeper 110 of core assembly 102 relative to a core body 112 of core assembly 102.

Figure 2:
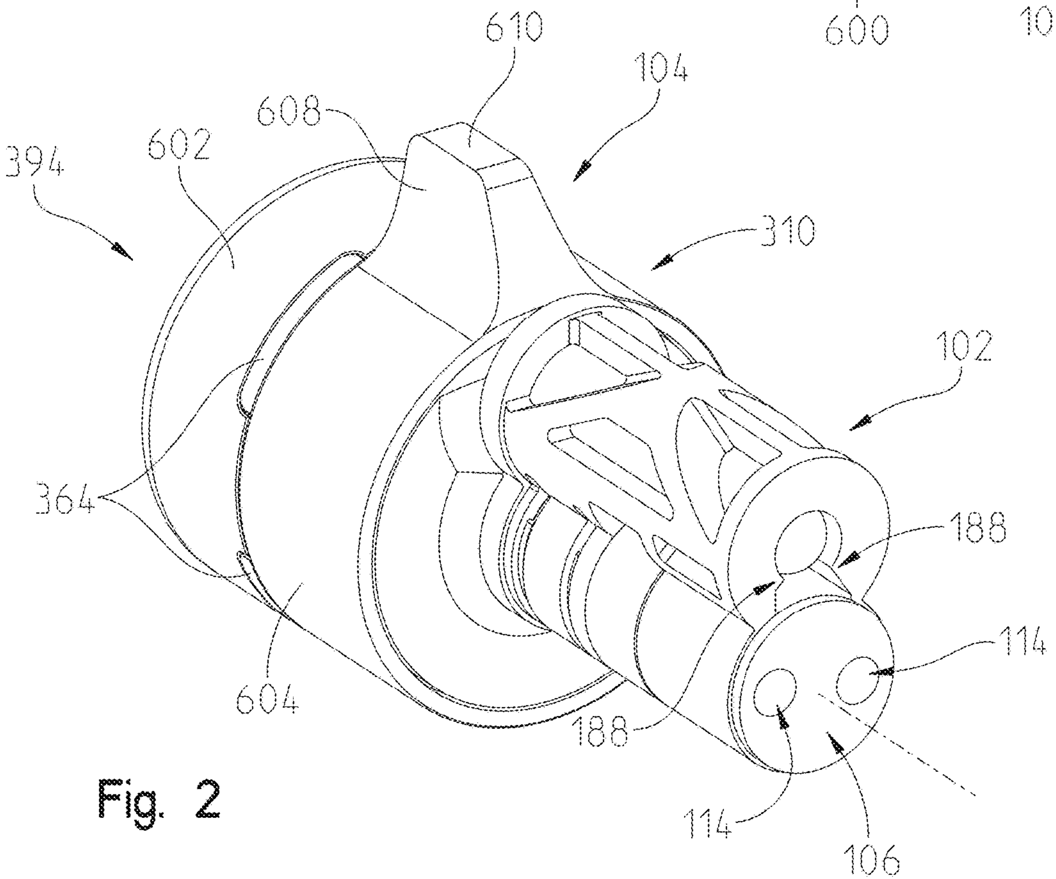
FIG. 2 illustrates a rear perspective view of the electro-mechanical lock core of FIG. 1.
Figure 3:
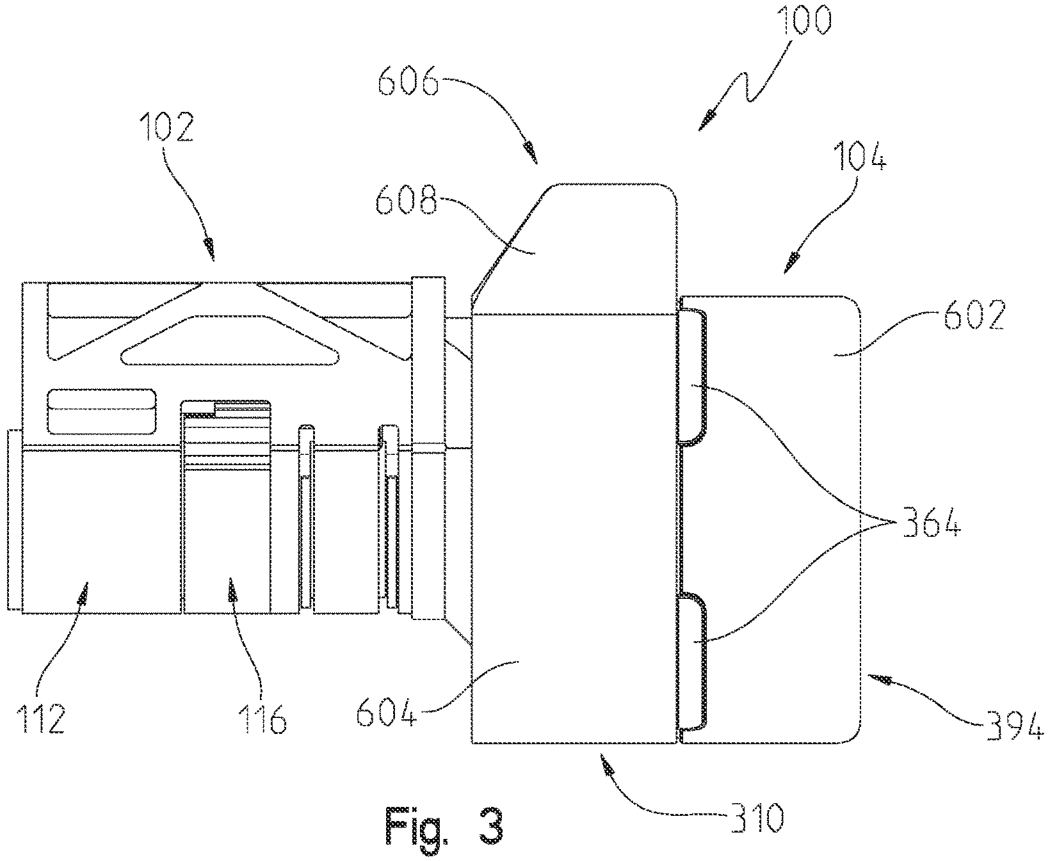
FIG. 3 illustrates a left side elevation view of the electro-mechanical lock core of FIG. 1.
Figure 4:
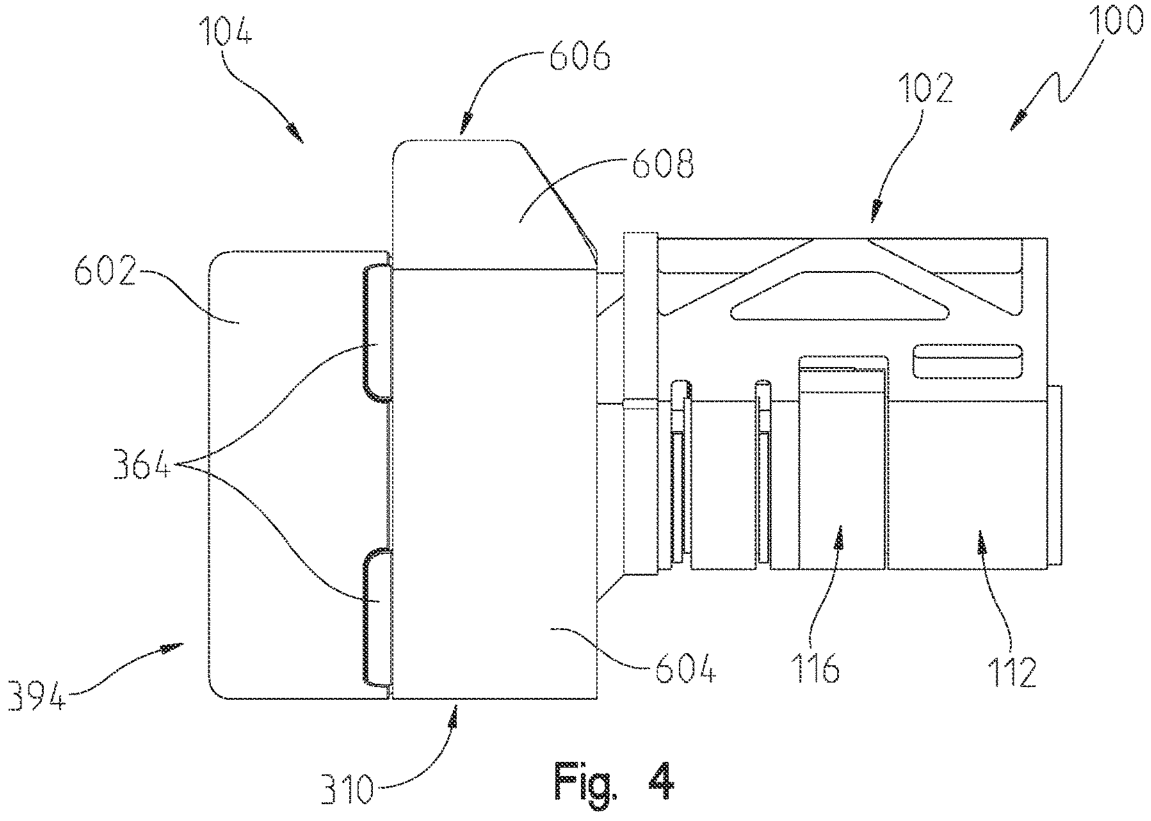
FIG. 4 illustrates a right side elevation view of the electro-mechanical lock core of FIG. 1.
Figure 5:
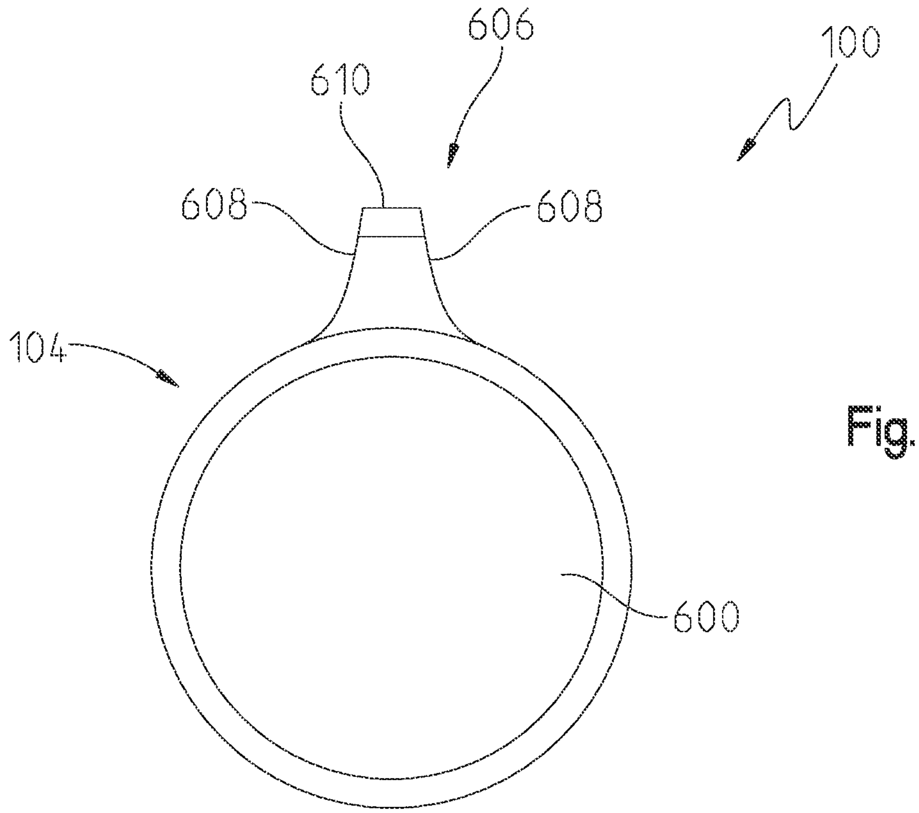
FIG. 5 illustrates a front view of the electro-mechanical lock core of FIG. 1.
Figure 6:
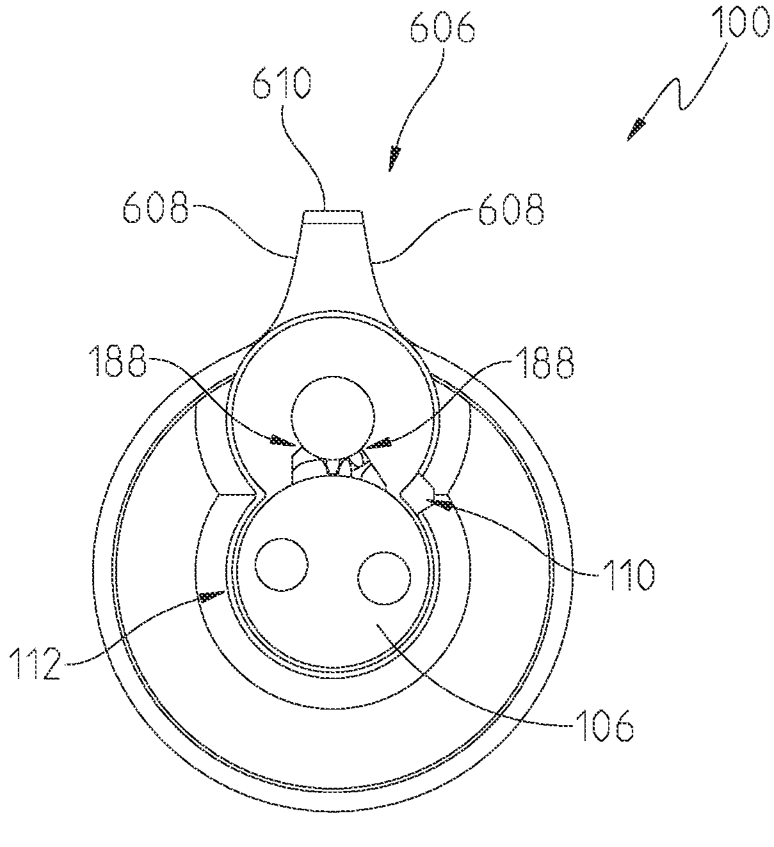
FIG. 6 illustrates a rear view of the electro-mechanical lock core of FIG. 1.
Figure 7:
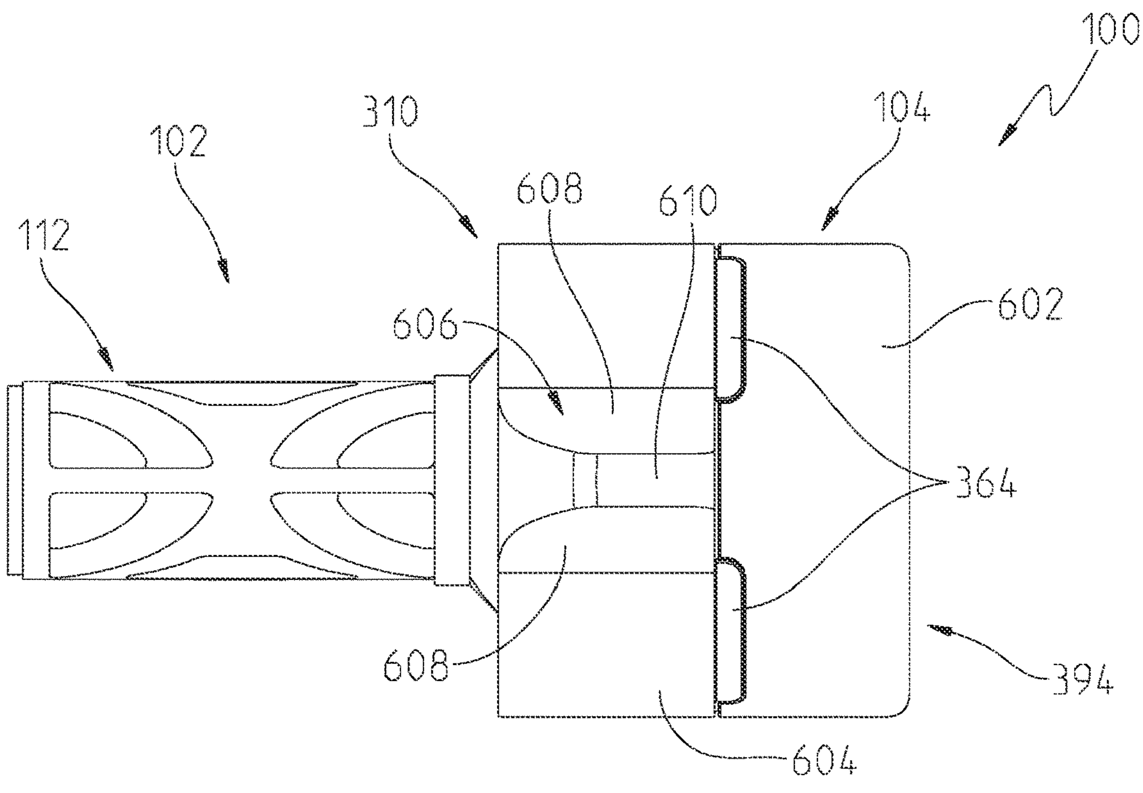
FIG. 7 illustrates a top view of the electro-mechanical lock core of FIG. 1.
Figure 8:
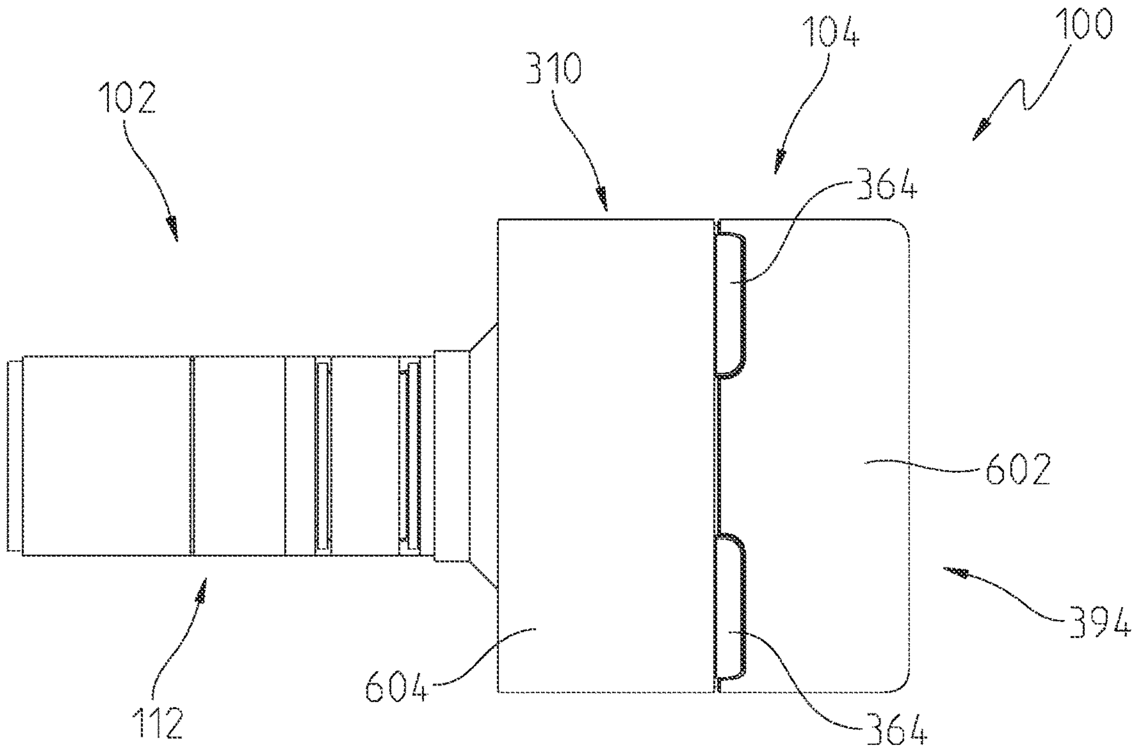
FIG. 8 illustrates a bottom view of the electro-mechanical lock core of FIG. 1.
Figure 11:
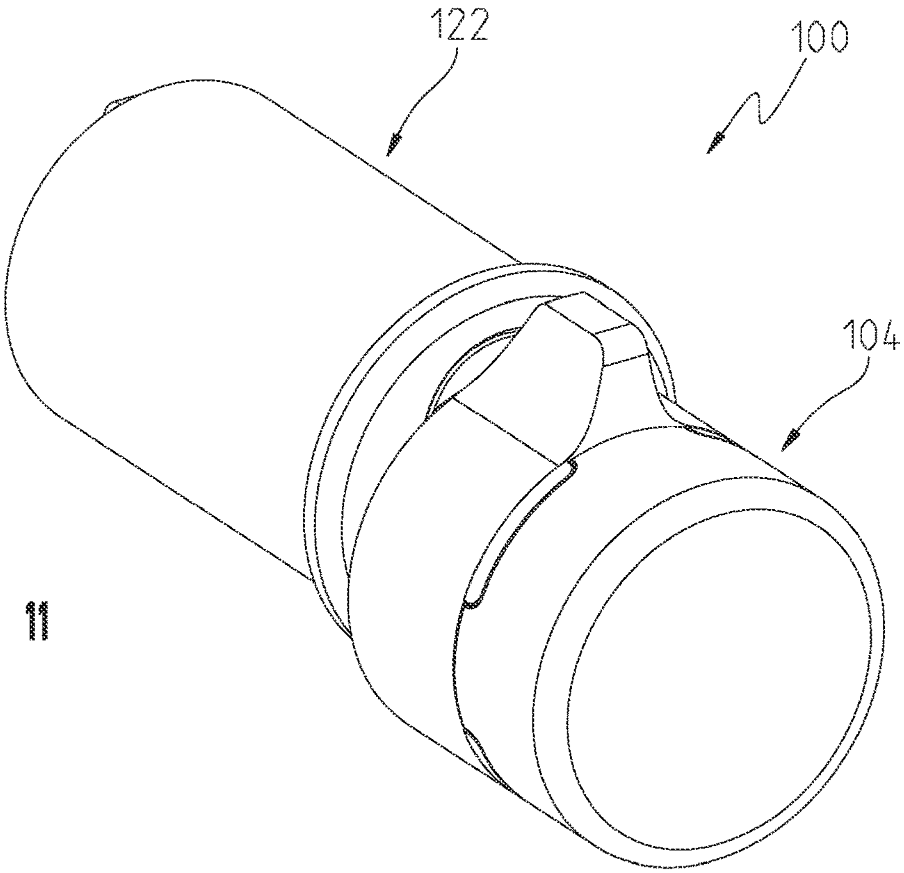
FIG. 11 illustrates a front perspective view of the electro-mechanical lock core and lock cylinder of FIG. 9 wherein electro-mechanical lock core is assembled to lock cylinder.
Figure 12:
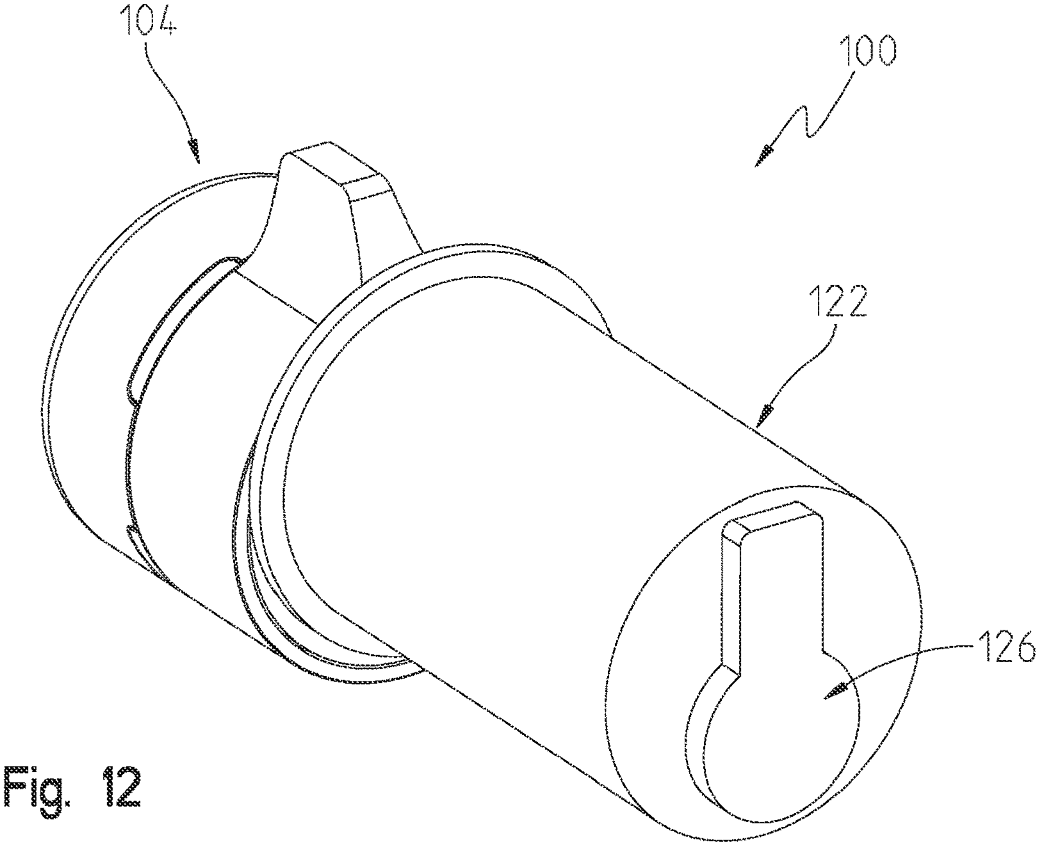
FIG. 12 illustrates a rear perspective view of the electro-mechanical lock core and lock cylinder of FIG. 9 wherein electro-mechanical lock core is assembled to lock cylinder.

Referring to FIG. 2, lock actuator plug 106 includes a lock interface in the form of a plurality of recesses 114, illustratively two, which receive lock pins 120 of a lock cylinder 122 when core assembly 102 is received in recess 124 of lock cylinder 122, as shown in FIG. 9. In embodiments, the lock interface of lock actuator plug 106 may include one or more protrusions, one or more recesses, or a combination of one or more protrusions and one or more recesses. Further, the lock interface may be provided as part of one or more components coupled to lock actuator plug 106. Lock pins 120 are in turn coupled to a cam member 126 (see FIG. 10) of lock cylinder 122 which is rotatable by a corresponding rotation of lock pins 120. As is known in the art, cam member 126 may be in turn coupled to a lock system, such as a latch bolt of a door lock, a shank of a padlock or other suitable lock systems.

When core assembly 102 is received in recess 124 of lock cylinder 122, core keeper 110 is in a first position wherein it is received in a recess 128 (see FIG. 9A) in an interior wall 130 of lock cylinder 122 to retain or otherwise prevent the removal of core assembly 102 from lock cylinder 122 without the movement of core keeper 110 to a second position wherein the core keeper 110 is not received in recess 128 of lock cylinder 122. Further, core assembly 102 is positioned generally flush with a front surface 132 of lock cylinder 122.

Figure 48:
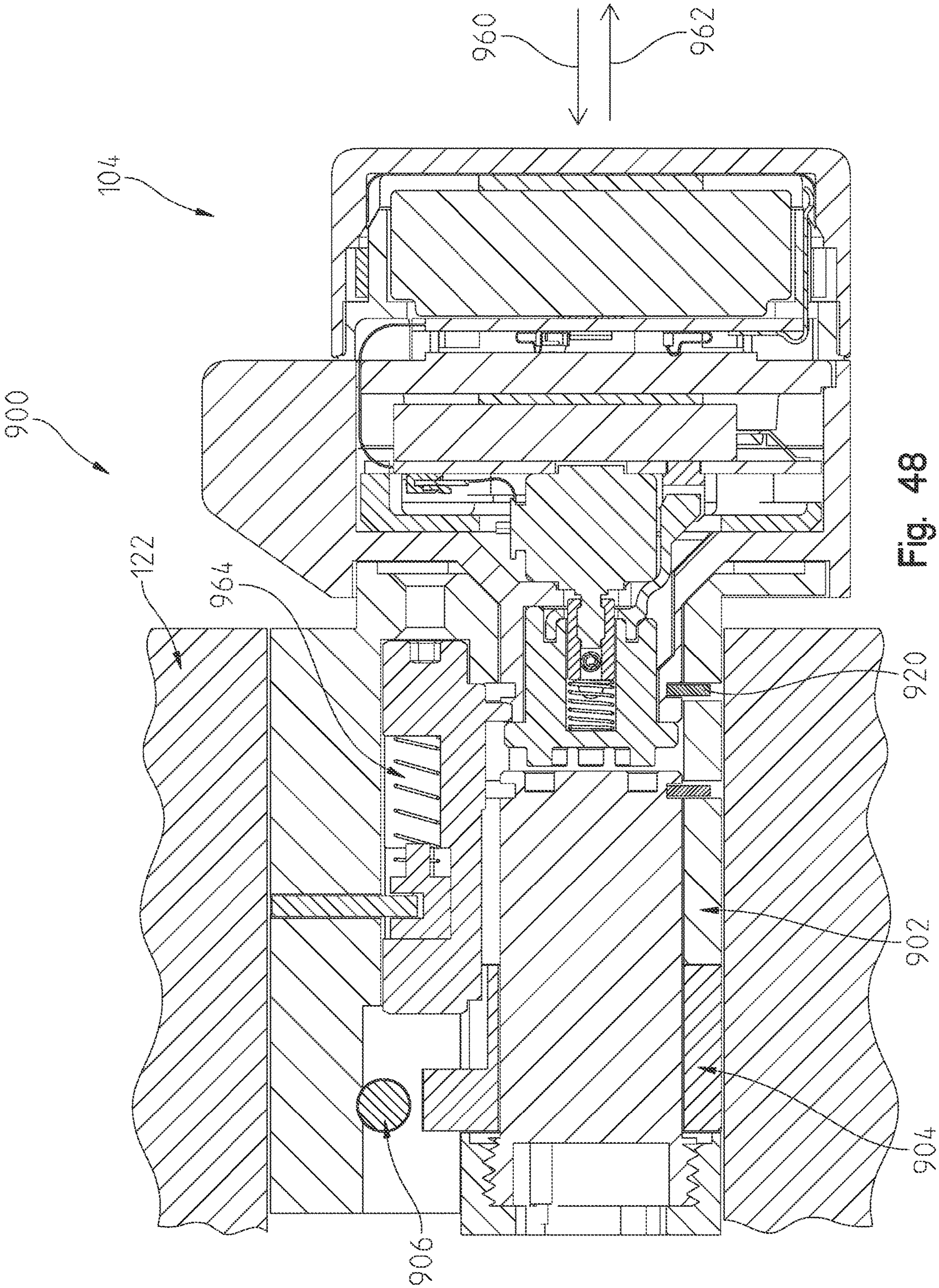
FIG. 48 illustrates a sectional view of the large format electro-mechanical interchangeable core of FIG. 45 taken along lines 48-48 of FIG. 45.
Figure 49:
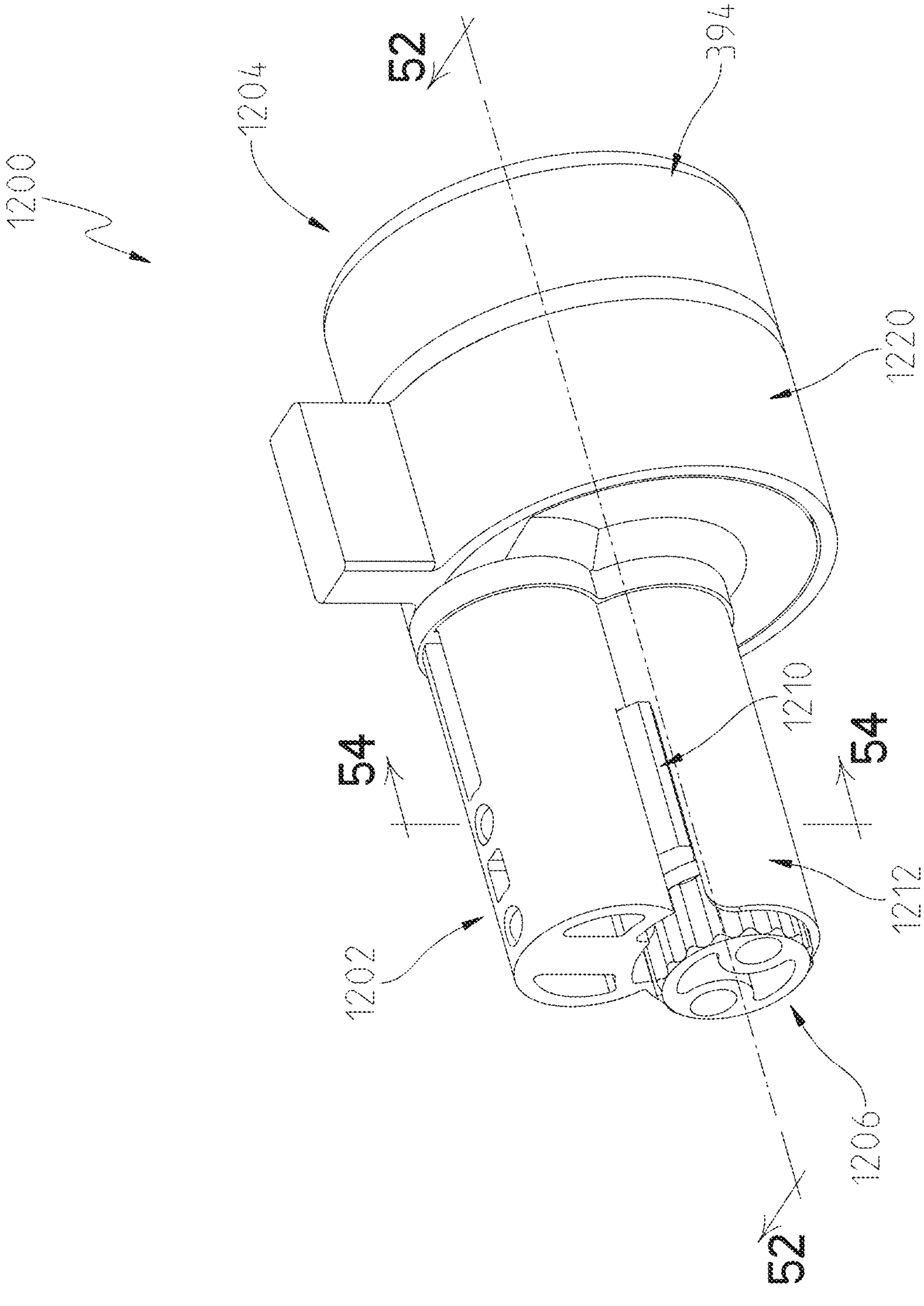
FIG. 49 illustrates a rear perspective view of a further electro-mechanical lock core.
Figure 50:
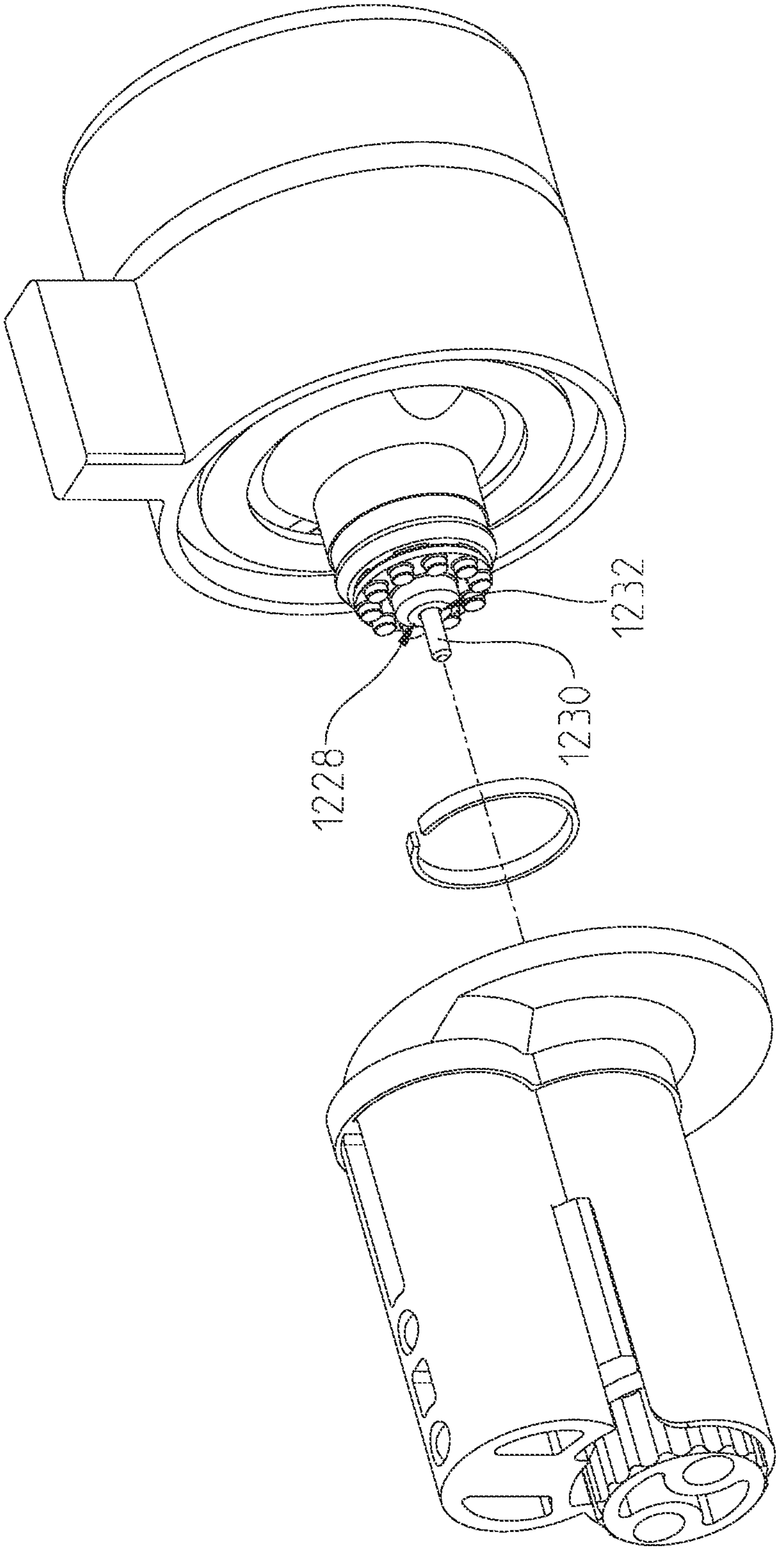
FIG. 50 illustrates an exploded view of the electro-mechanical lock core of FIG. 32.

In the illustrated embodiment, core body 112 defines a figure eight profile (See FIGS. 9 and 10) which is received in a corresponding figure eight profile of lock cylinder 122 (See FIGS. 9 and 10). The illustrated figure eight profile is known as a small format interchangeable core ("SFIC"). Core body 112 may also be sized and shaped to be compatible with large format interchangeable cores ("LFIC") (see FIGS. 48-50) and other known cores.

Figure 13:
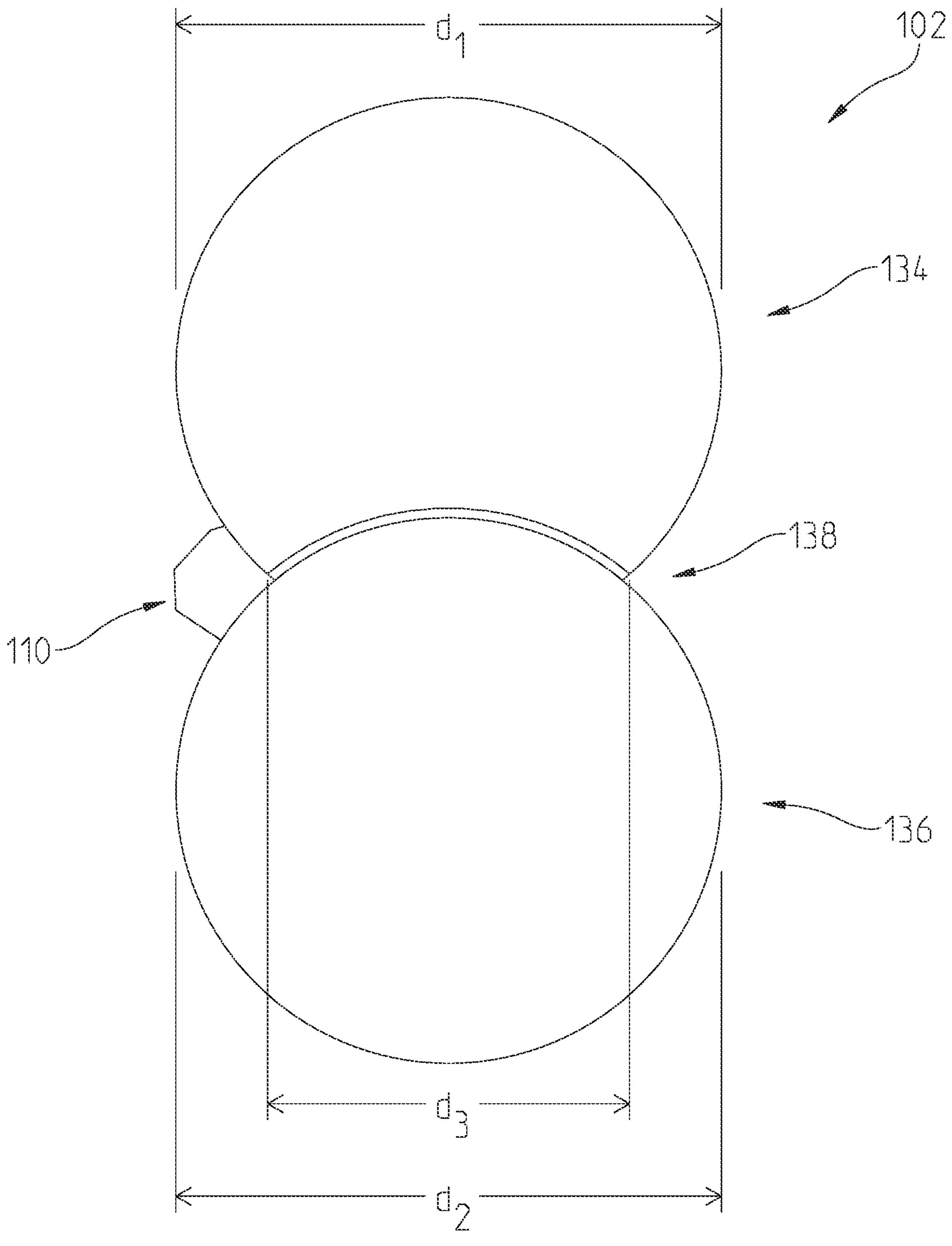
FIG. 13 illustrates a diagrammatic view of an envelope of a lock core body of the electro-mechanical lock core of FIG. 1.

Referring to FIG. 13, core assembly 102 includes an upper portion 134 with a first maximum lateral extent ($d_1$), a lower portion 136 with a second maximum lateral extent ($d_2$), and a waist portion 138 having a third maximum lateral extent ($d_3$). The third maximum lateral extent ($d_3$) is less than the first maximum lateral extent ($d_1$) and less than the second maximum lateral extent ($d_2$). Exemplary interchangeable lock cores having a longitudinal shape satisfying the relationship of first maximum lateral extent ($d_1$), second maximum lateral extent ($d_2$), and third maximum lateral extent ($d_3$) include small format interchangeable cores (SFIC), large format interchangeable cores (LFIC), and other suitable interchangeable cores. In alternative embodiments, core assembly 102 may have longitudinal shapes that do not satisfy the relationship of first maximum lateral extent ($d_1$), second maximum lateral extent ($d_2$), and third maximum lateral extent ($d_3$).

Core body 112 may be translated relative to lock cylinder 122 along longitudinal axis 108 in direction 162 to remove core body 112 from lock cylinder 122 when core keeper 110 is received within the envelope of core body 112 such that core body 112 has a figure eight profile and may not be translated relative to lock cylinder 122 along longitudinal axis 108 to remove core body 112 from lock cylinder 122 when core keeper 110 is positioned at least partially outside of the envelope of core body 112 in a recess 128 of lock cylinder 122 (see FIG. 9A).

Although electro-mechanical lock core 100 is illustrated in use with lock cylinder 122, electro-mechanical lock core 100 may be used with a plurality of lock systems to provide a locking device which restricts the operation of the coupled lock system. Exemplary lock systems include door handles, padlocks, and other suitable lock systems. Further, although operator actuation assembly 104 is illustrated as including a generally cylindrical knob, other user actuatable input devices may be used including handles, levers, and other suitable devices for interaction with an operator.

Figure 14:
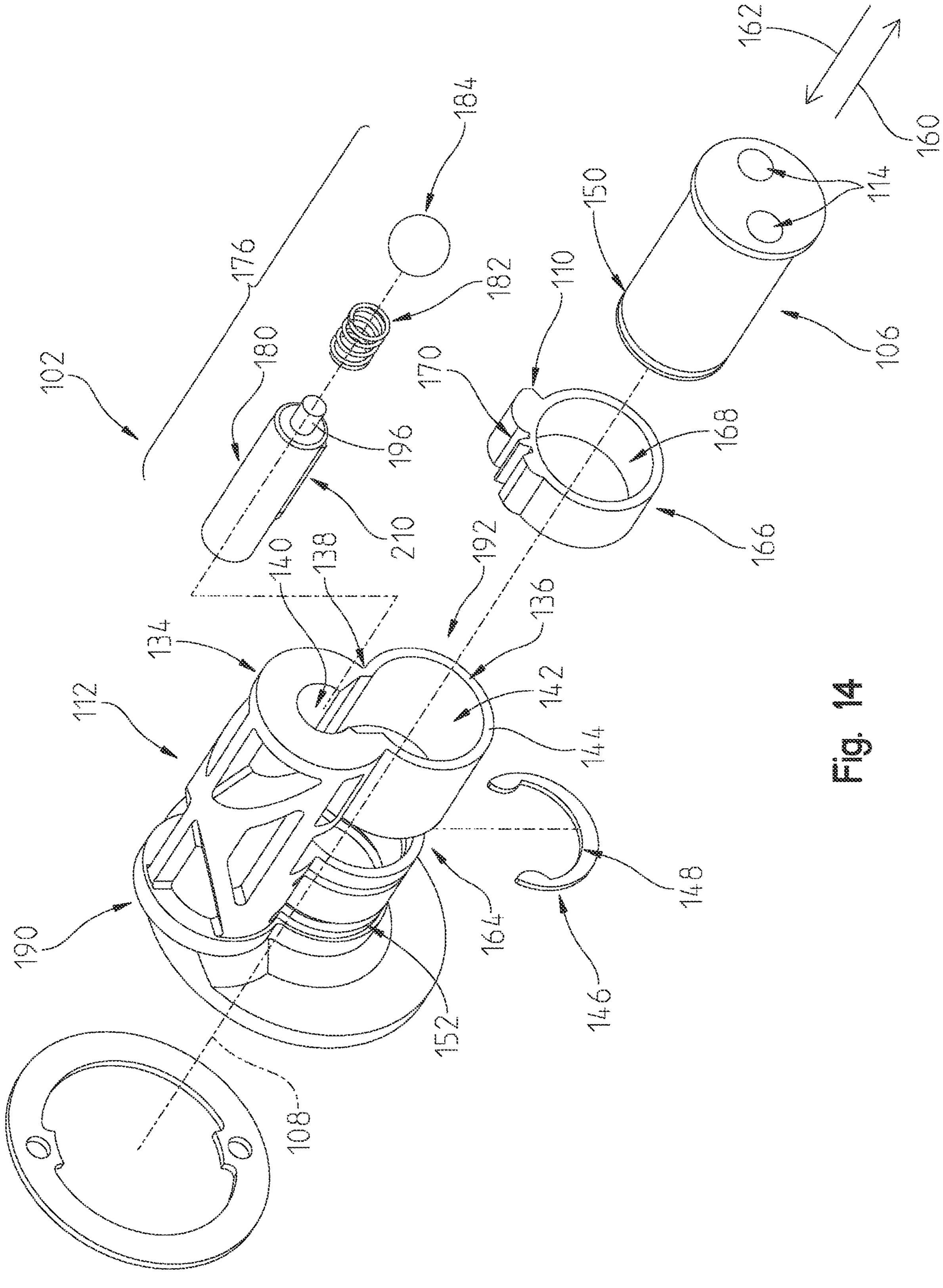
FIG. 14 illustrates an exploded rear perspective view of a lock core assembly of the electro-mechanical lock core of FIG. 1.

Turning to FIG. 14 the components of core assembly 102 are described in more detail. Core body 112 of core assembly 102 includes an upper cavity 140 and a lower cavity 142. Lower cavity 142 includes lock actuator plug 106 which is received through a rear face 144 of core body 112. Upper cavity 140 includes a control assembly 176.

Figure 19:
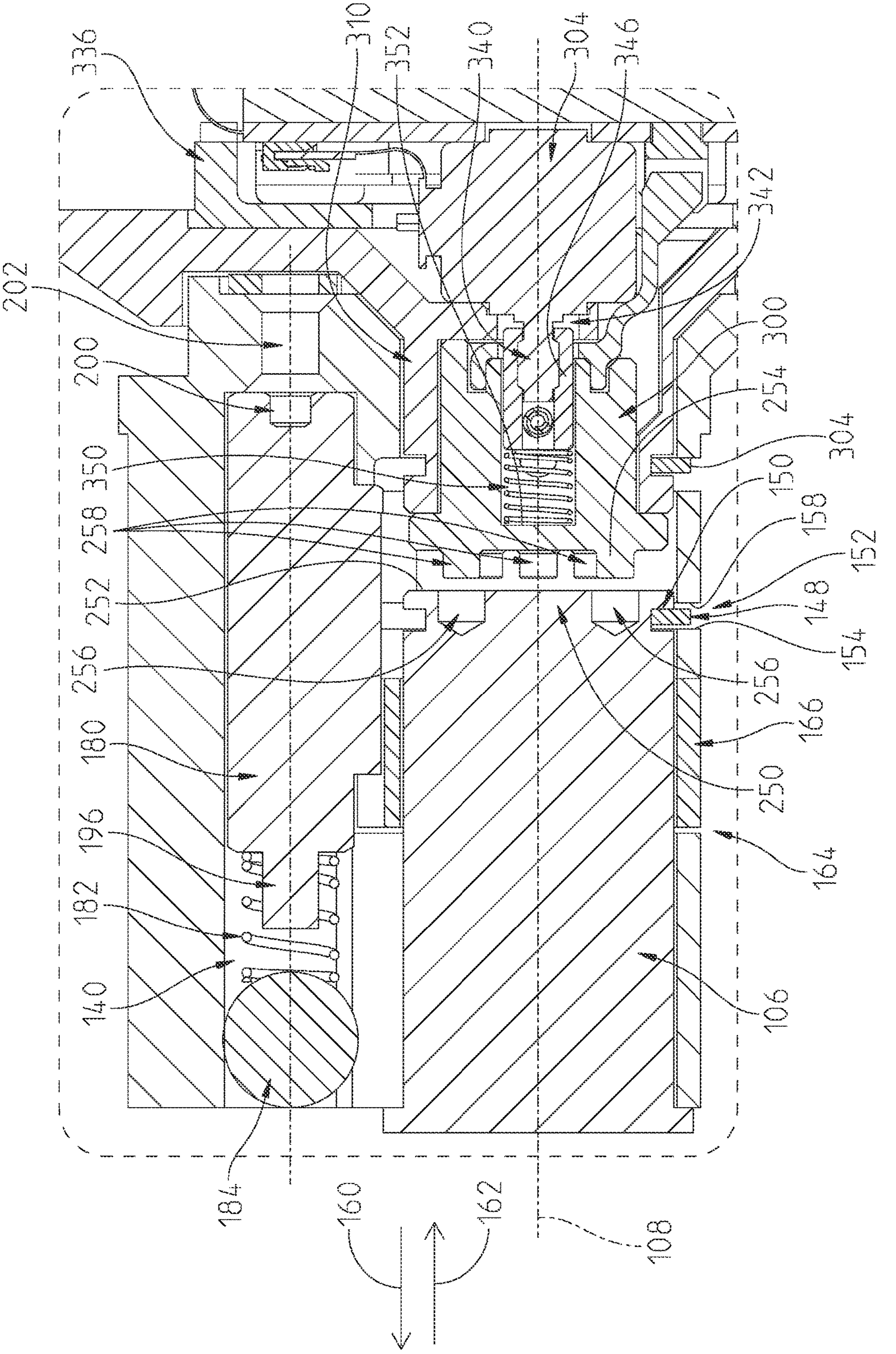
FIG. 19 illustrates a detail view of the sectional view of FIG. 18.

Lock actuator plug 106 is retained relative to core body 112 with a retainer 146. Retainer 146 maintains a longitudinal position of lock actuator plug 106 along axis 108 while allowing lock actuator plug 106 to rotate about longitudinal axis 108. In the illustrated embodiment, retainer 146 is a C-clip 148 which is received in a groove 150 of lock actuator plug 106. As shown in FIG. 19, C-clip 148 is received in an opening 152 of core body 112 between a face 154 of core body 112 and a face 158 of core body 112.

Returning to FIG. 14, a control sleeve 166 is received in an opening 164 of lower portion 136 of core body 112. Control sleeve 166 has a generally circular shape with a central through aperture 168. Lock actuator plug 106 is received within aperture 168 of control sleeve 166, as shown in FIG. 19. Control sleeve 166 also supports core keeper 110. Control sleeve 166 also includes a partial gear 170. Control sleeve 166, core keeper 110, and partial gear 170 are shown as an integral component. In embodiments, one or more of core keeper 110 and partial gear 170 are discrete components coupled to control sleeve 166.

Upper cavity 140 of core body 112 receives control assembly 176. As explained in more detail herein, control assembly 176 restricts access to and controls movement of core keeper 110. Control assembly 176 includes an actuator 180, a biasing member 182, and a cap 184. Illustratively biasing member 182 is a compression spring and cap 184 is a ball. A first end of biasing member 182 contacts cap 184 and a second end of biasing member 182 is received over a protrusion 196 of actuator 180 (see FIG. 18). In embodiments, protrusion 196 is optional and biasing member 182 abuts against an end of actuator 180. Actuator 180 further includes a tool engagement portion 200 which aligns with a passage 202 provided in a front end 190 of core body 112.

Actuator 180, biasing member 182, and cap 184 are inserted into upper cavity 140 from a rear end 192 of core body 112 which receives lock actuator plug 106. Cap 184 is pressed through rear end 192 and abuts a rear end of upper cavity 140 which has projections 188 (see FIGS. 2 and 6) to retain cap 184.

Figure 25:
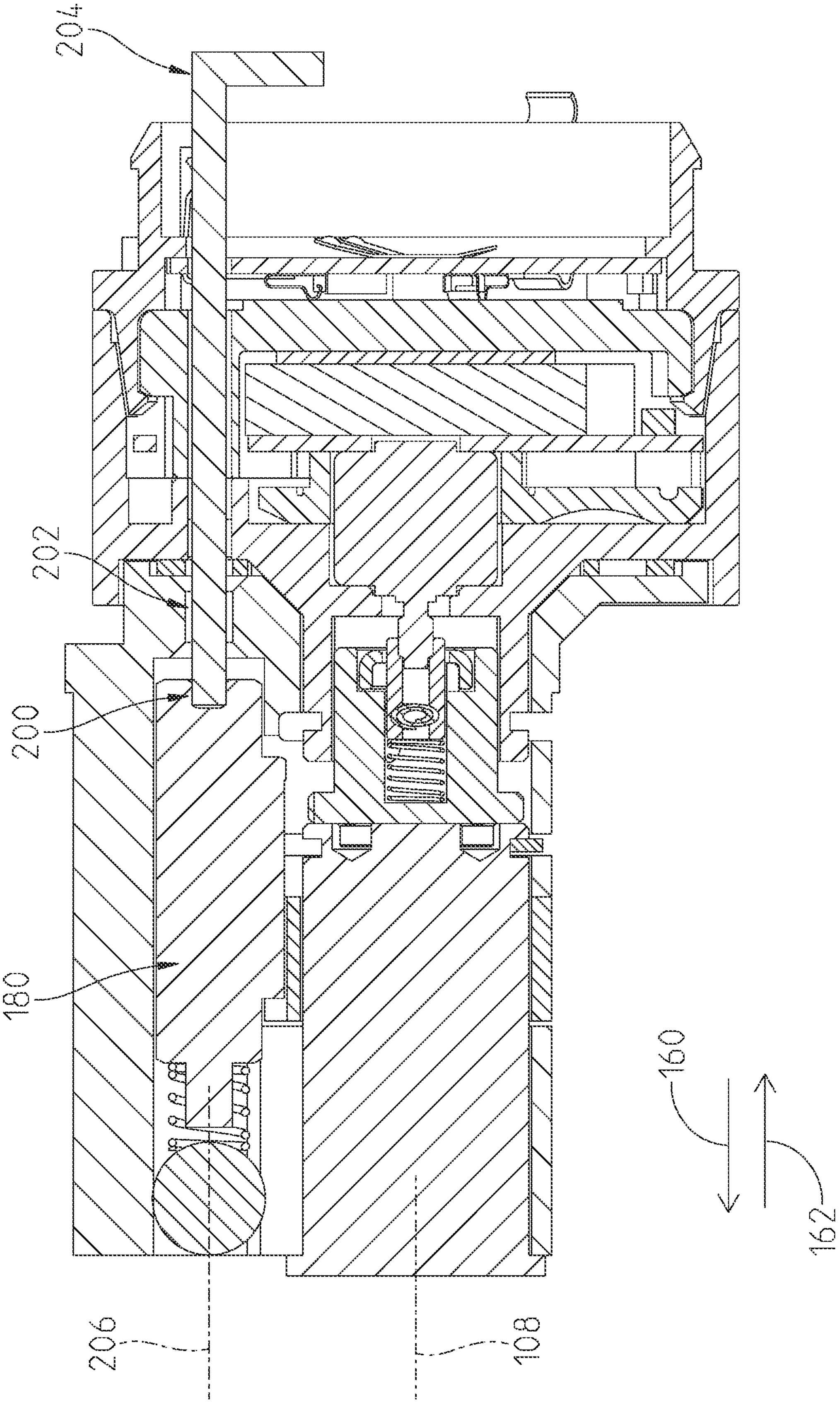
FIG. 25 illustrates the sectional view of FIG. 17 with the clutch assembly engaged with the lock actuator plug.
Figure 29:
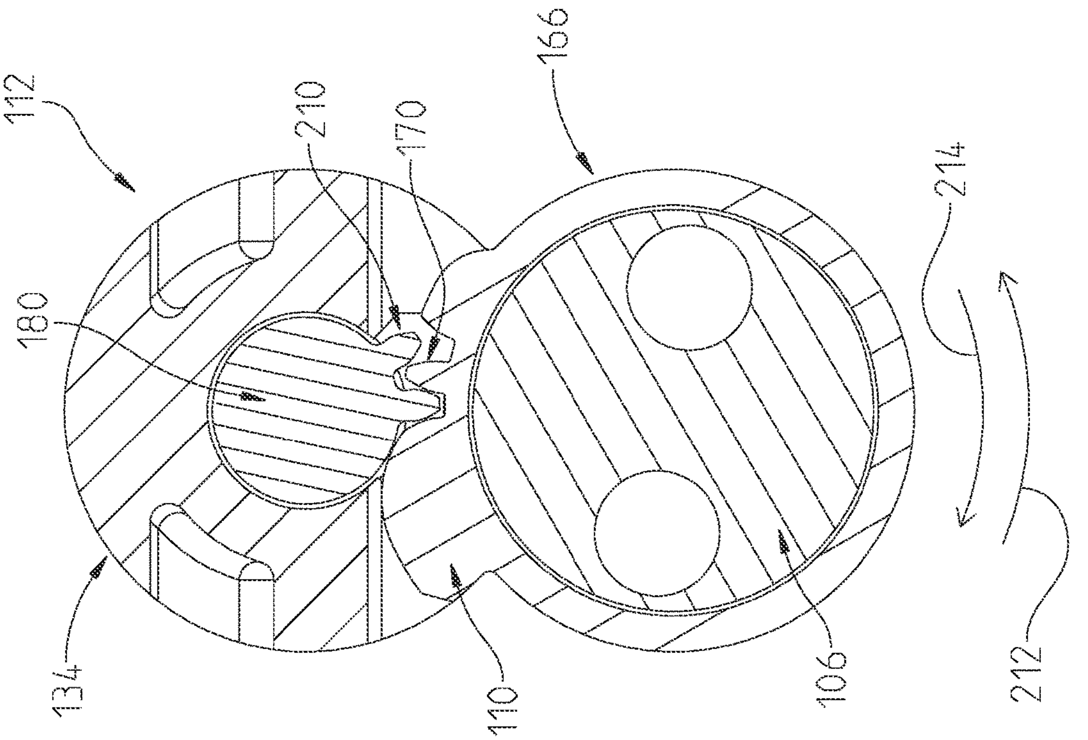
FIG. 29 illustrates a sectional view of the electro-mechanical lock core of FIG. 5 along lines 29-29 of FIG. 27 with the core keeper in the retracted position.
Figure 28:
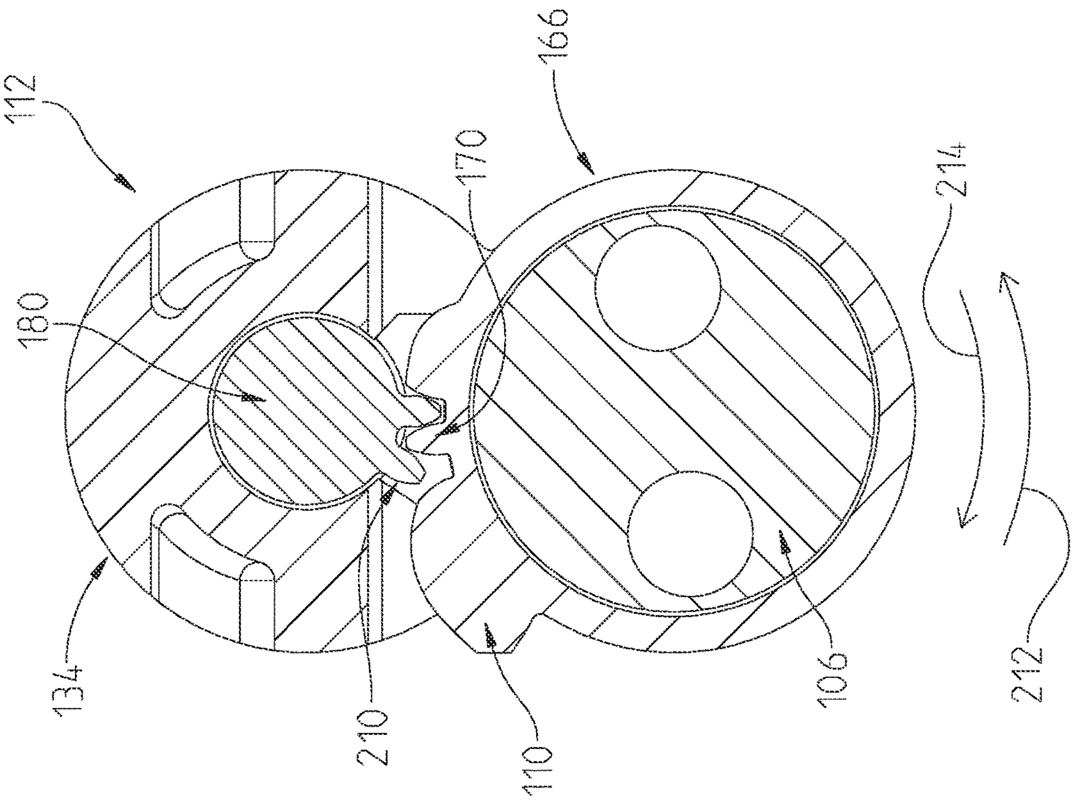
FIG. 28 illustrates a sectional view of the electro-mechanical lock core of FIG. 1 along lines 28-28 of FIG. 26 with the core keeper in the extended position.

Actuator 180 further includes a partial gear 210 which intermeshes with partial gear 170 of control sleeve 166. Referring to FIG. 28, partial gear 210 of actuator 180 is illustrated intermeshed with partial gear 170 of control sleeve 166 and core keeper 110 is in an extended position. By rotating actuator 180 counterclockwise in direction 212, control sleeve 166 is rotated clockwise in direction 214 to a release position wherein electro-mechanical lock core 100 may be removed from lock cylinder 122. Illustratively, in the release position core keeper 110 is retracted into the envelope of core assembly 102, as illustrated in FIG. 29. By rotating actuator 180 clockwise in direction 214, control sleeve 166 is rotated counterclockwise in direction 212 to a secure or retain position wherein electro-mechanical lock core 100 may not be removed from lock cylinder 122. Illustratively, in the secure position core keeper 110 extends beyond the envelope of core assembly 102, as illustrated in FIG. 28. As illustrated in FIG. 25 and explained in more detail herein, a tool 204 is inserted through passage 202 to engage tool engagement portion 200 to translate actuator 180 in direction 160 and rotate actuator 180 about axis 206 in direction 212 (see FIG. 29) to retract core keeper 110.

Figure 18:
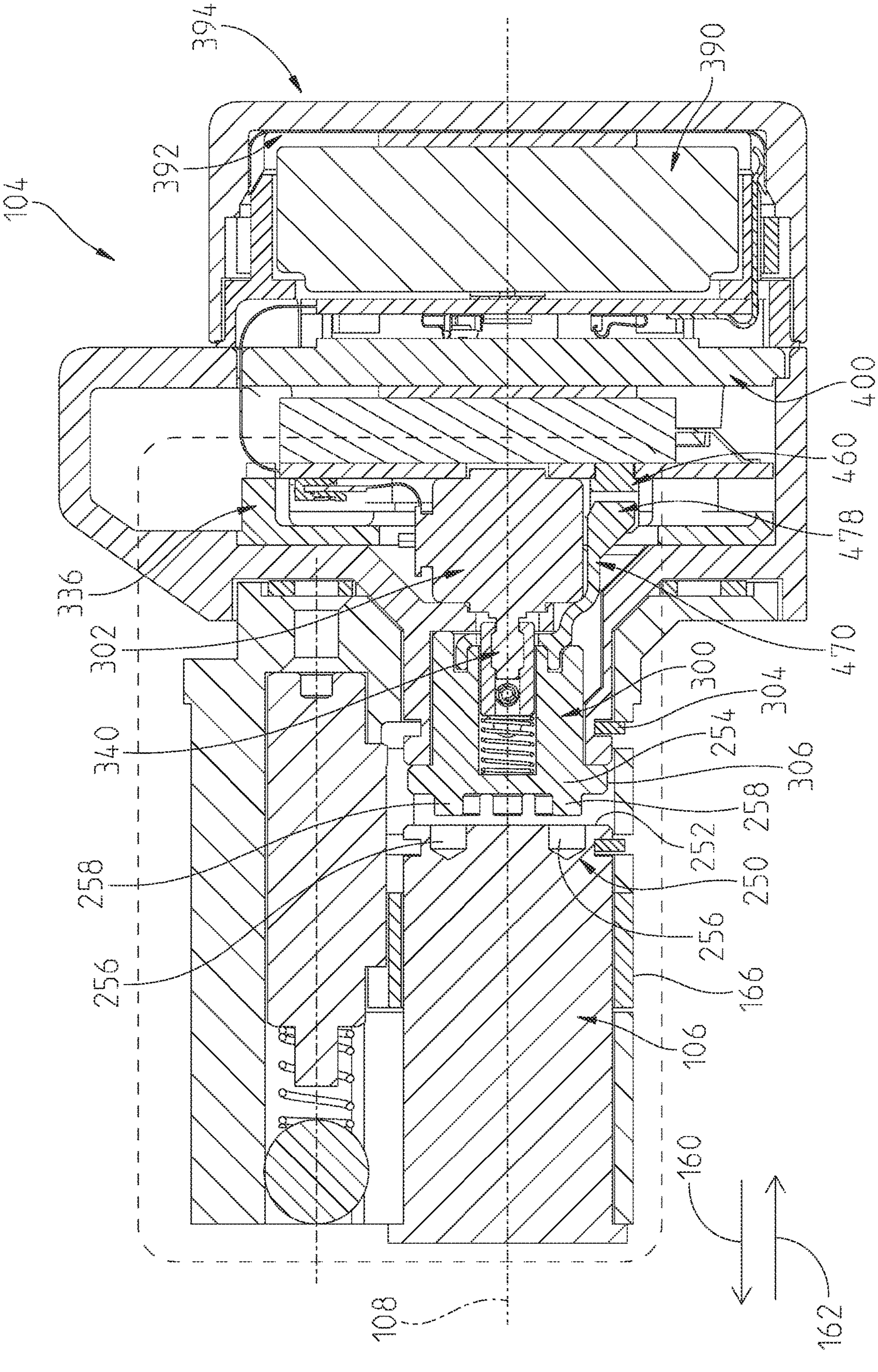
FIG. 18 illustrates a sectional view of the electro-mechanical lock core of FIG. 1 along lines 18-18 of FIG. 1 with the clutch assembly of FIG. 17 disengaged from a lock actuator plug of the lock core assembly of FIG. 14.

Referring to FIG. 18, lock actuator plug 106 includes an engagement interface 250 on a front end 252 of lock actuator plug 106. Engagement interface 250 includes a plurality of engagement features 256, illustratively recesses, which cooperate with a plurality of engagement features 258, illustratively protrusions, of an engagement interface 254 of a moveable clutch 300 of operator actuation assembly 104. By including a plurality of interlocking protrusions and recesses, as shown in the illustrated embodiment, clutch 300 may have multiple rotational positions relative to lock actuator plug 106 about longitudinal axis 108 wherein engagement features 258 of clutch 300 may engage engagement features 256 of lock actuator plug 106. In other embodiments, engagement features 256 may be protrusions or a combination of recesses and protrusions and engagement features 258 would have complementary recesses or a combination of complementary recesses and protrusions. In other embodiments, engagement features 256 of lock actuator plug 106 and engagement features 258 of moveable clutch 300 may be generally planar frictional surfaces which when held in contact couple clutch 300 and lock actuator plug 106 to rotate together.

As explained in more detail herein, moveable clutch 300 is moveable along longitudinal axis 108 in direction 160 and direction 162 between a first position wherein engagement interface 254 of moveable clutch 300 is disengaged from engagement interface 250 of lock actuator plug 106 and a second position wherein engagement interface 254 of moveable clutch 300 is engaged with engagement interface 250 of lock actuator plug 106. The movement of moveable clutch 300 is controlled by an electric motor 302 as described in more detail herein. In the first position, operator actuation assembly 104 is operatively uncoupled from lock actuator plug 106 and a rotation of operator actuation assembly 104 about longitudinal axis 108 does not cause a rotation of lock actuator plug 106 about longitudinal axis 108. In the second position, operator actuation assembly 104 is operatively coupled to lock actuator plug 106 and a rotation of operator actuation assembly 104 about longitudinal axis 108 causes a rotation of lock actuator plug 106 about longitudinal axis 108.

Figure 31:
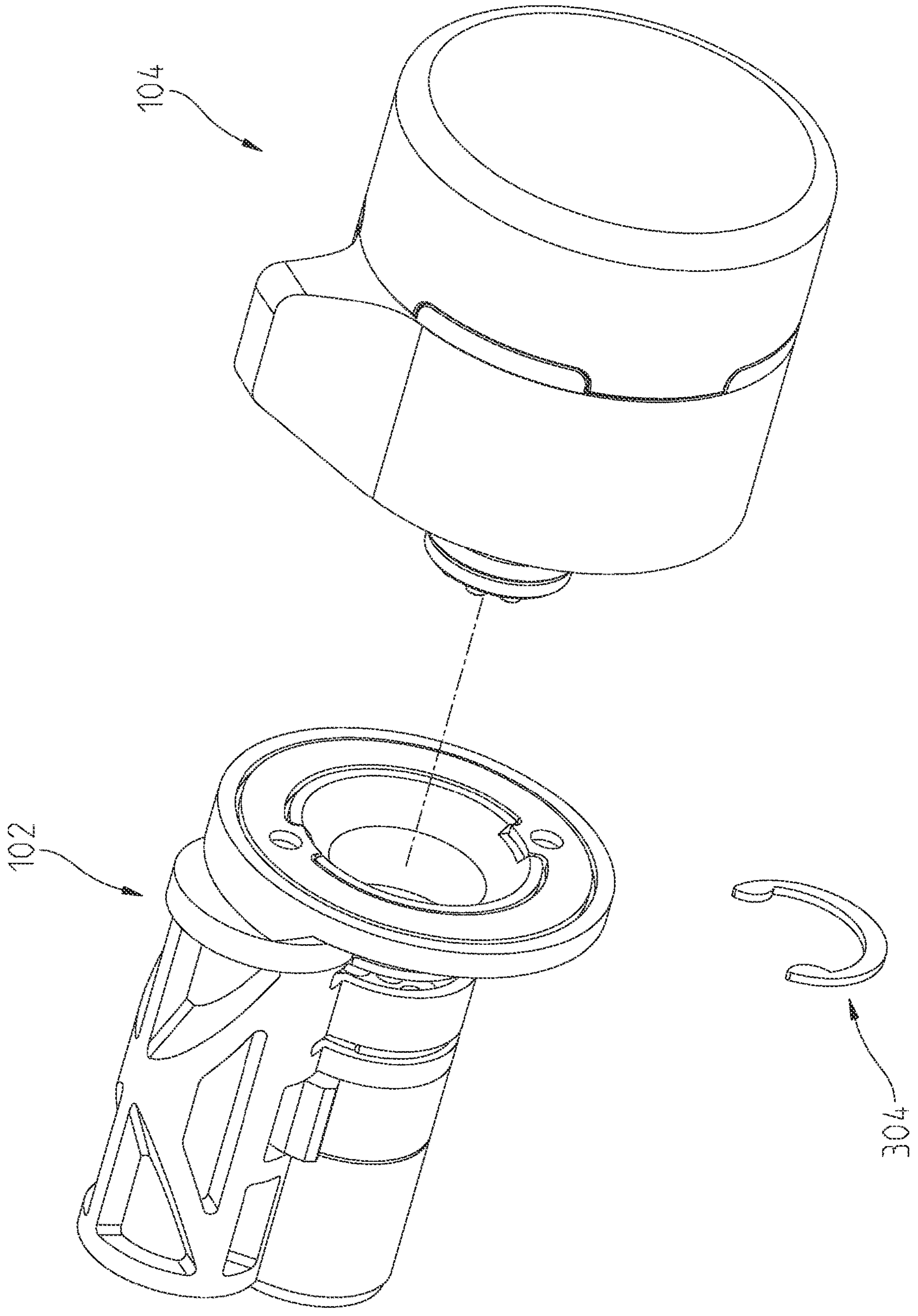
FIG. 31 is an exploded view of the electro-mechanical lock core of FIG. 30.
Figure 32:
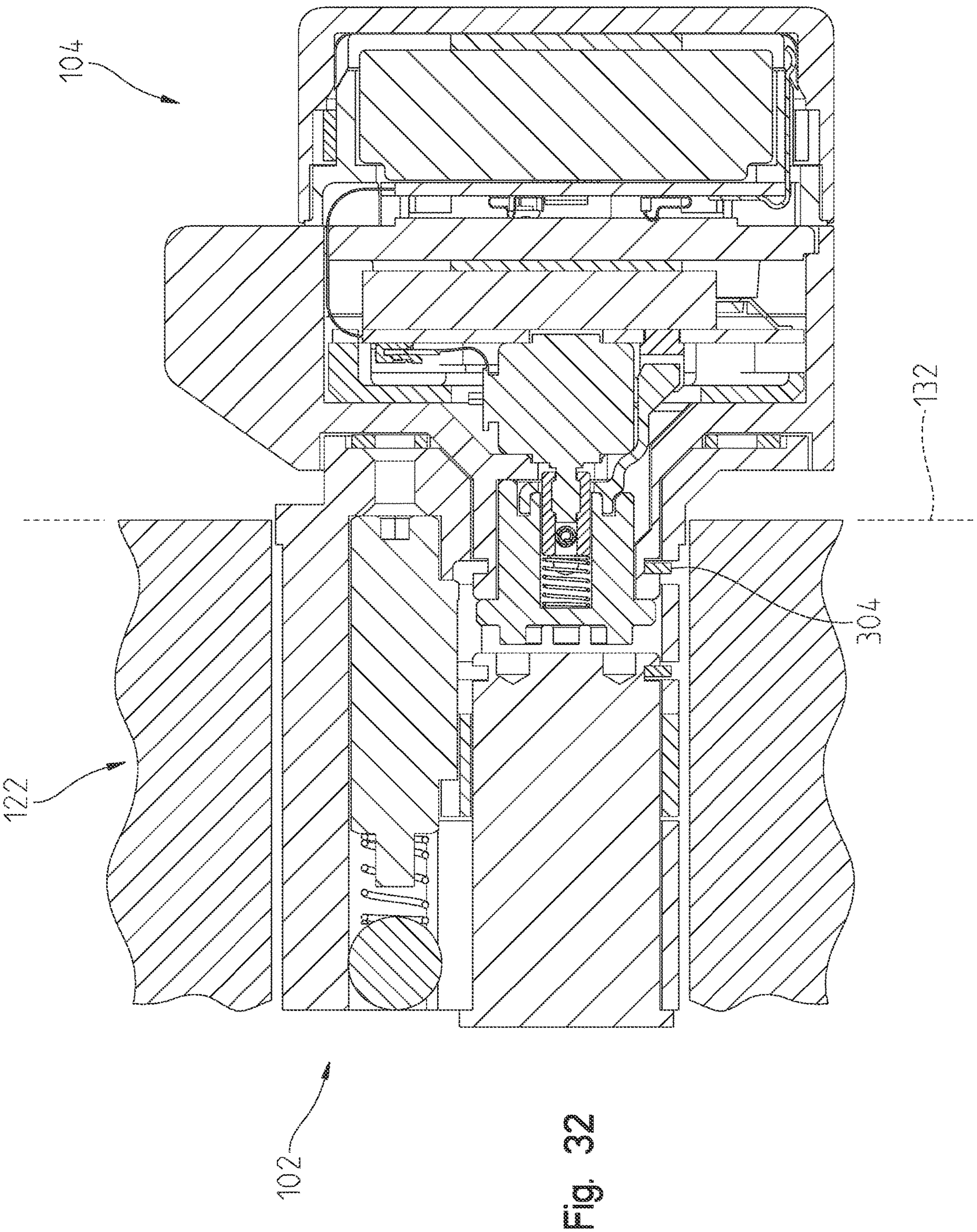
FIG. 32 is a sectional view of the electro-mechanical lock core of FIG. 30 taken along lines 32-32 of FIG. 30.

As shown in FIG. 18, moveable clutch 300 and electric motor 302 are both part of operator actuation assembly 104 which is coupled to core assembly 102 and held relative to core assembly 102 with a retainer 304, illustratively a C-clip (see FIGS. 31 and 32). In embodiments, one or both of moveable clutch 300 and electric motor 302 are part of core assembly 102 and operator actuation assembly 104 is operatively coupled to moveable clutch 300 when operator actuation assembly 104 is coupled to core assembly 102.

Figure 15:
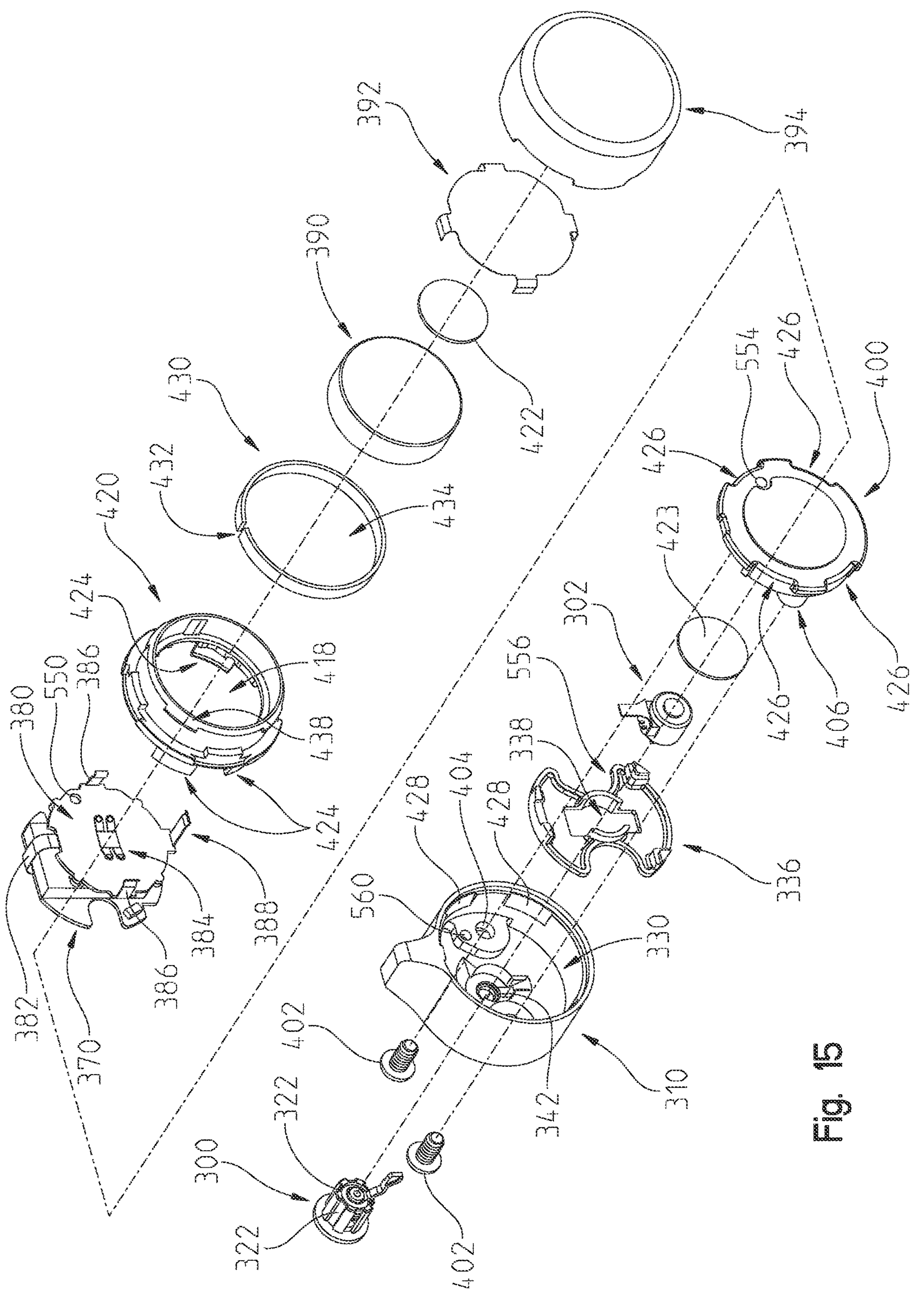
FIG. 15 illustrates an exploded front perspective view of an operator actuatable assembly and clutch assembly of the electro-mechanical lock core of FIG. 1.
Figure 16:
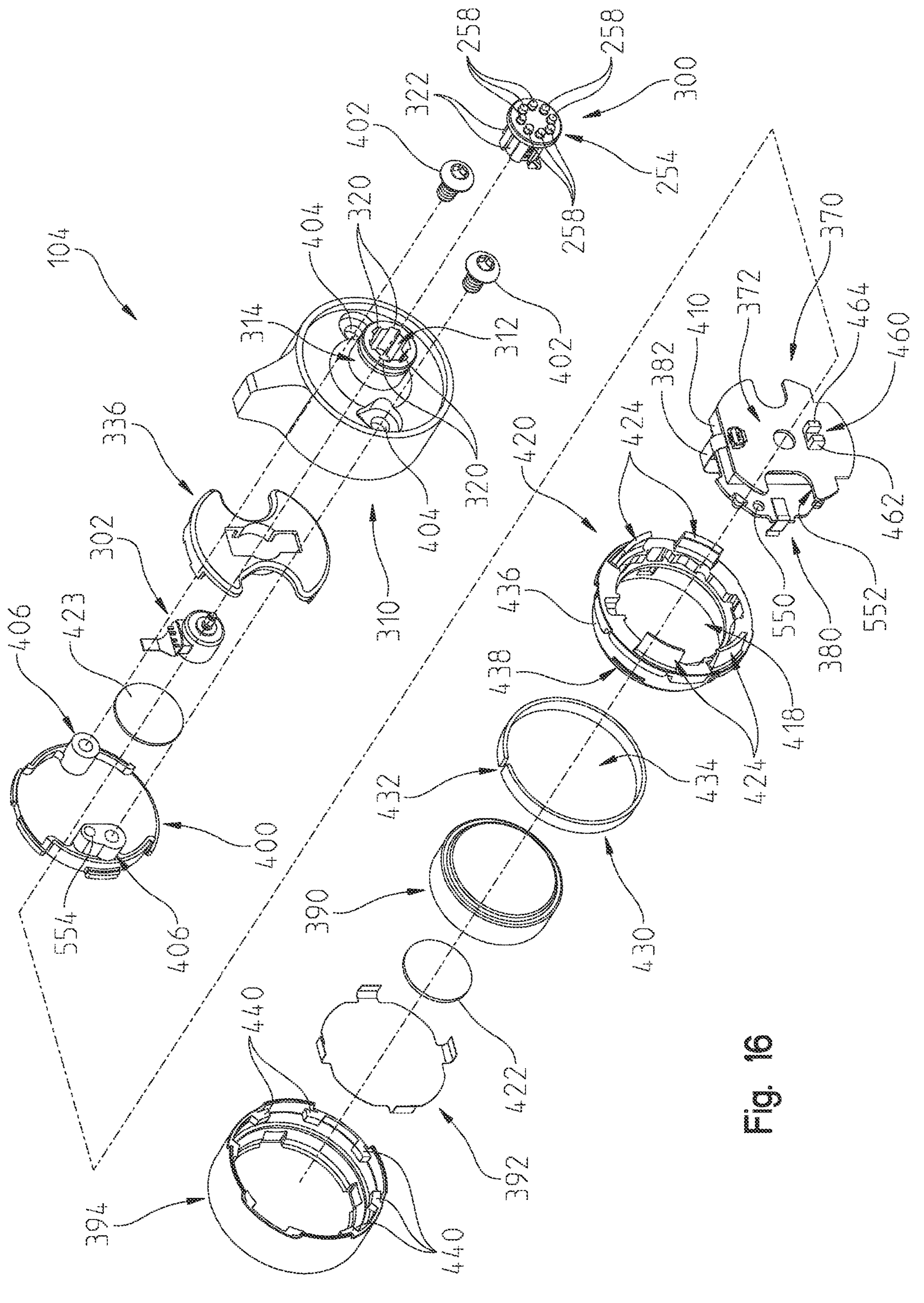
FIG. 16 illustrates an exploded rear perspective view of operator actuatable assembly and clutch assembly of the electro-mechanical lock core of FIG. 1.

Referring to FIGS. 15, 16 and 18, operator actuation assembly 104 is illustrated. Operator actuation assembly 104 includes a base 310 which has a recess 312 in a stem 314 to receive moveable clutch 300. Referring to FIG. 16, stem 314 of base 310 includes a plurality of guides 320 which are received in channels 322 of moveable clutch 300. Guides 320 permit the movement of moveable clutch 300 relative to base 310 along longitudinal axis 108 in direction 160 and direction 162 while limiting a rotation of moveable clutch 300 relative to base 310.

Referring to FIG. 15, base 310 includes another recess 330 which as explained herein receives several components of operator actuation assembly 104 including a chassis 336 which includes an opening 338 that receives motor 302. Chassis 336 stabilizes the motor position and supports electrical assembly 370. As shown in FIG. 19, when assembled a drive shaft 340 of motor 302 extends through a central aperture 342 of base 310.

Figure 17:
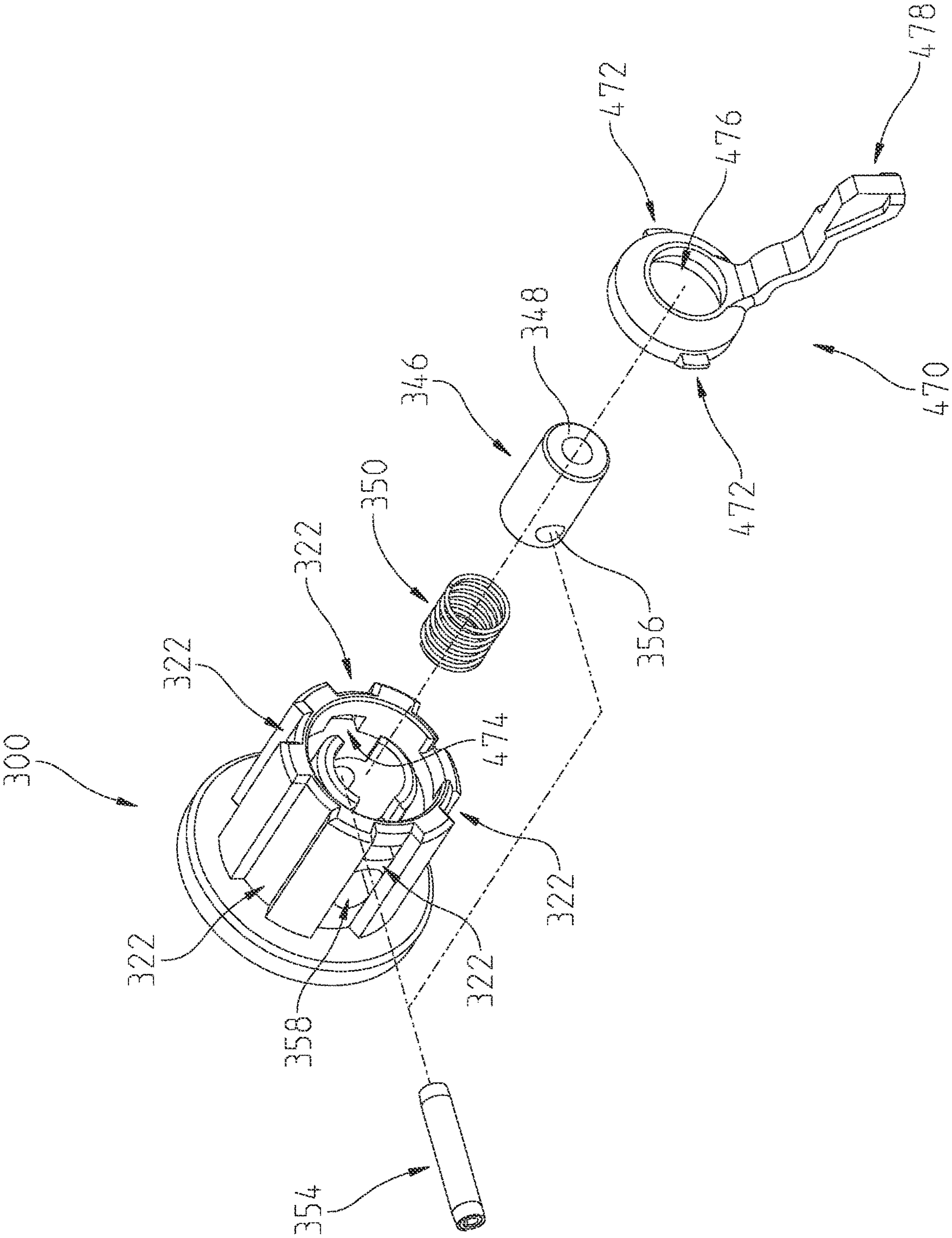
FIG. 17 illustrates an exploded front perspective view of the clutch assembly of FIGS. 15 and 16.

Referring to FIG. 17, motor 302 is operatively coupled to moveable clutch 300 through a control pin 346. Control pin 346 has a threaded internal passage 348 which is engaged with a threaded outer surface of drive shaft 340 of motor 302. By rotating drive shaft 340 of motor 302 in a first direction about longitudinal axis 108, control pin 346 advances in direction 160 towards lock actuator plug 106. By rotating drive shaft 340 of motor 302 in a second direction about longitudinal axis 108, opposite the first direction, control pin 346 retreats in direction 162 away from lock actuator plug 106. A biasing member 350, illustratively a compression spring, is positioned between control pin 346 and a stop surface 352 of moveable clutch 300.

A pin 354 is positioned in a cross passage 356 of control pin 346 and in elongated openings 358 in moveable clutch 300. Pin 354 prevents control pin 346 from rotating about longitudinal axis 108 with drive shaft 340 of motor 302, thereby ensuring that a rotational movement of drive shaft 340 about longitudinal axis 108 is translated into a translational movement of moveable clutch 300 along longitudinal axis 108 either towards lock actuator plug 106 or away from lock actuator plug 106. Elongated openings 358 are elongated to permit drive shaft 340 to rotate an amount sufficient to seat engagement features 258 of moveable clutch 300 in engagement features 256 of lock actuator plug 106 even when engagement features 258 of moveable clutch 300 are not aligned with engagement features 256 of lock actuator plug 106. In such a misalignment scenario, the continued rotation of drive shaft 340 results in control pin 346 continuing to advance in direction 160 and compress biasing member 350. An operator then by a rotation of operator actuation assembly 104 about longitudinal axis 108 will cause a rotation of moveable clutch 300 about longitudinal axis 108 thereby seating engagement features 258 of moveable clutch 300 in engagement features 256 of lock actuator plug 106 and relieve some of the compression of biasing member 350.

Figure 33:
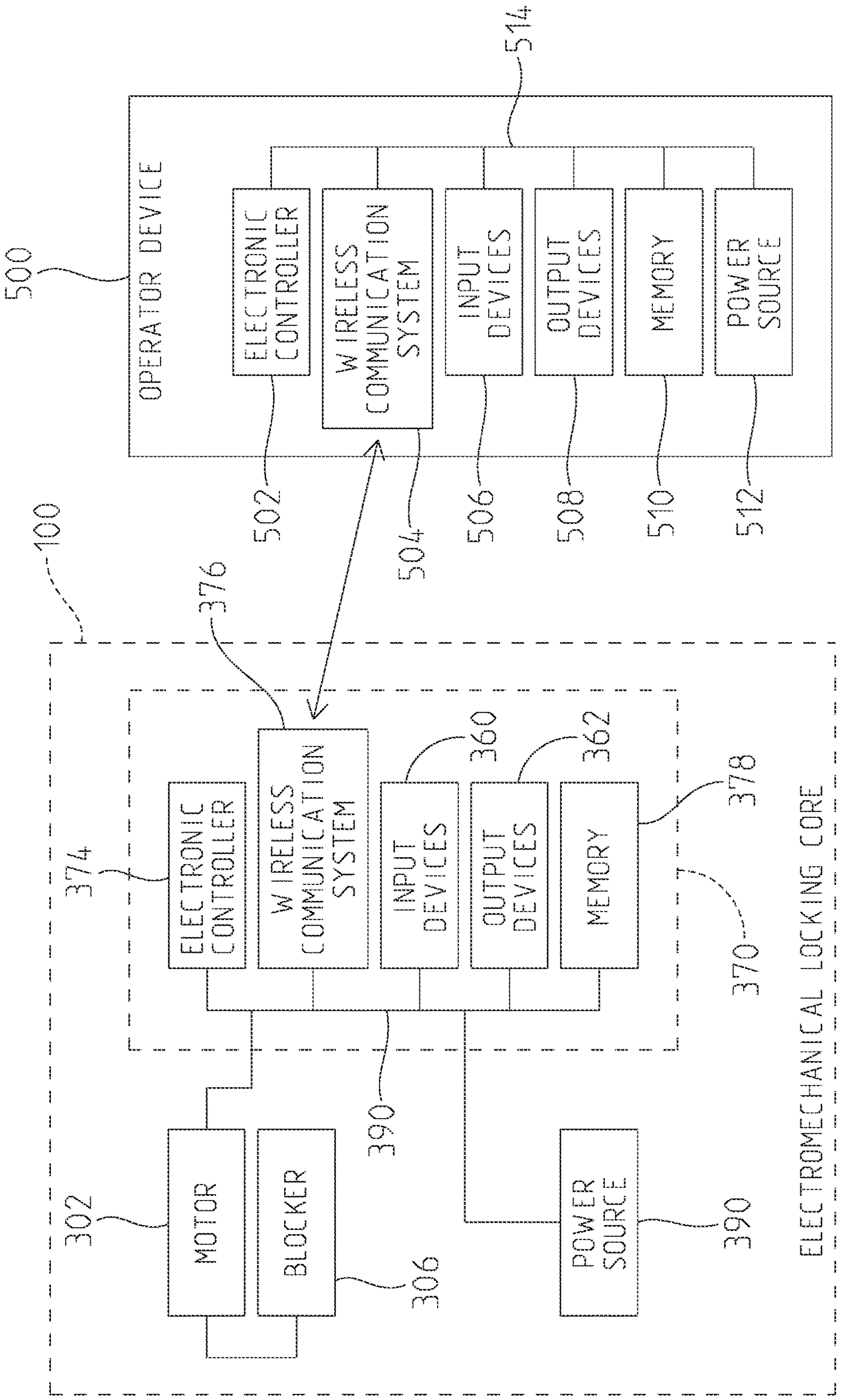
FIG. 33 is a representative view of an exemplary electro-mechanical locking core and an operator device.

Returning to FIGS. 15 and 16, operator actuation assembly 104 further includes an electrical assembly 370 which includes a first circuit board 372 which includes an electronic controller 374 (see FIG. 33), a wireless communication system 376 (see FIG. 33), a memory 378 (see FIG. 33) and other electrical components. Electrical assembly 370 further includes a second circuit board 380 coupled to first circuit board 372 through a flex circuit 382. Second circuit board 380 supports negative contacts 384 and positive contacts 386 for a power supply 390, illustratively a battery. Second circuit board 380 further supports a capacitive sensor lead 388 which couples to a touch sensitive capacitive sensor 392, such as a CAPSENSE sensor available from Cypress Semiconductor Corporation located at 198 Champion Court in San Jose, CA 95134.

Touch sensitive capacitive sensor 392 is positioned directly behind an operator actuatable input device 394, illustratively a knob cover (see FIG. 18). When an operator touches an exterior 396 of operator actuatable input device 394, touch sensitive capacitive sensor 392 senses the touch which is monitored by electronic controller 374. An advantage, among others, of placing touch sensitive capacitive sensor 392 behind operator actuatable input device 394 is the redirection of electrical static discharge when operator actuation assembly 104 is touched by an operator.

Referring to FIG. 18, first circuit board 372 and second circuit board 380, when operator actuation assembly 104 is assembled, are positioned on opposite sides of a protective cover 400. In embodiments, protective cover 400 is made of a hardened material which is difficult to drill a hole therethrough to reach and rotate lock actuator plug 106. Exemplary materials include precipitation-hardened stainless steel, high-carbon steel, or Hadfield steel. Referring to FIG. 15, protective cover 400 is secured to base 310 by a plurality of fasteners 402, illustratively bolts, the shafts of which pass through openings 404 in base 310 and are threaded into bosses 406 of protective cover 400. By coupling protective cover 400 to base 310 from a bottom side of base 310, first circuit board 372 is not accessible when power supply 390 is removed from operator actuation assembly 104. A supercapacitor 410 is also positioned between first circuit board 372 and protective cover 400 and operatively coupled to motor 302 to drive motor 302. In embodiments, supercapacitor 410 may be positioned on the other side of protective cover 400.

Power supply 390 is positioned in an opening 418 in a battery chassis 420. As shown in FIG. 18, an advantage among others, of battery chassis 420 is that battery 390 is prevented from contacting capacitive sensor lead 388 and touch sensitive capacitive sensor 392. A foam spacer 422 also maintains a spaced relationship between power supply 390 and touch sensitive capacitive sensor 392. A second foam spacer 423 is placed between supercapacitor 410 and protective cover 400. Referring to FIG. 16, battery chassis 420 includes clips 424 which are received in recesses 426 of protective cover 400 such that battery chassis 420 cannot be removed from protective cover 400 without removing fasteners 402 because clips 424 are held in place by ramps 428 of base 310 (see FIG. 15).

Figure 20:
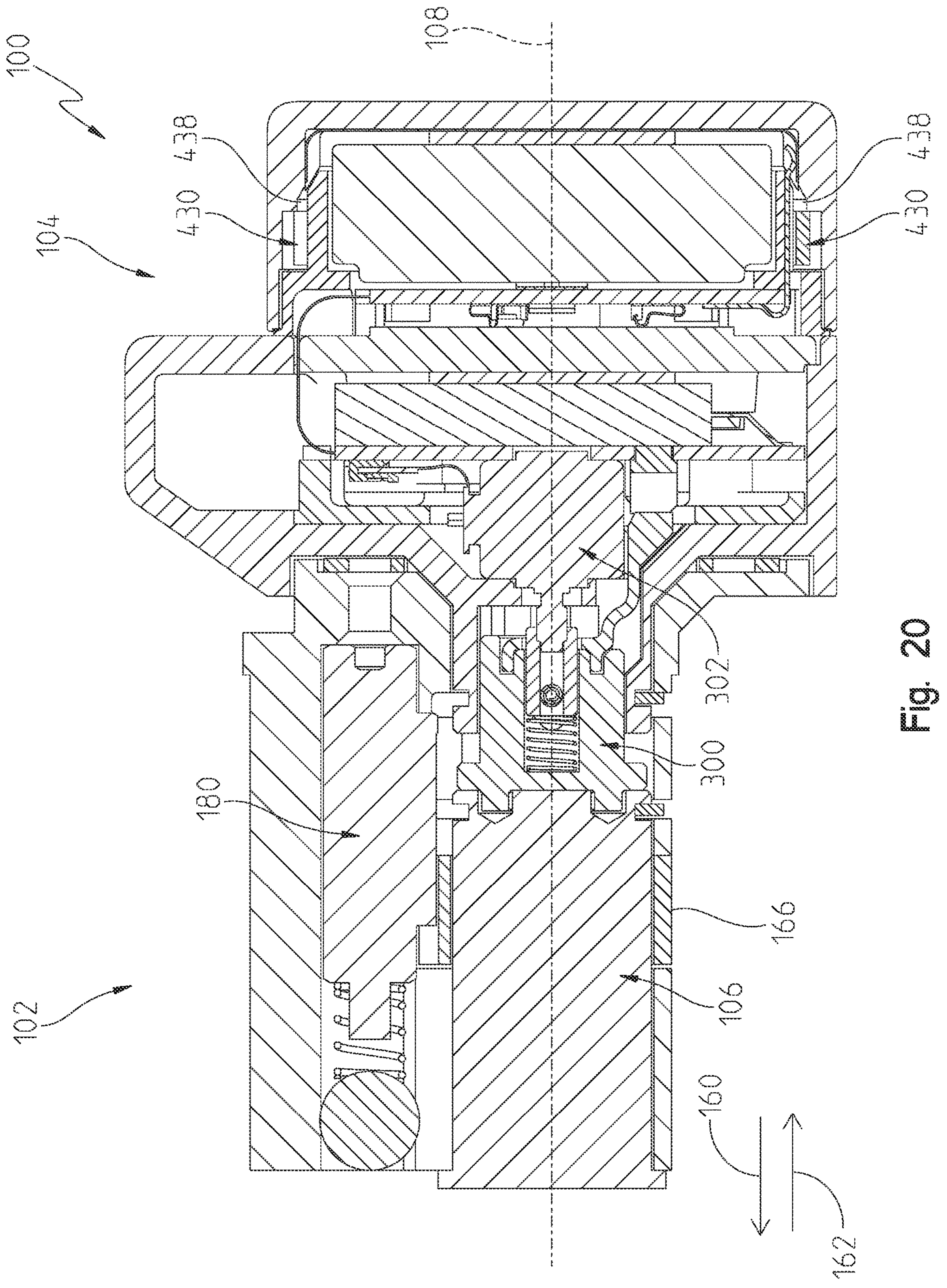
FIG. 20 illustrates the sectional view of FIG. 18 with the clutch assembly engaged with the lock actuator plug.

Referring to FIG. 16, actuatable operator input device 394 is secured to battery chassis 420 with an open retaining ring 430 which includes a slot 432. Slot 432 allows retaining ring 430 to be expanded to increase a size of an interior 434 of retaining ring 430. In a non-expanded state, retaining ring 430 fits over surface 436 of battery chassis 420 and has a smaller radial extent than retainers 438 of battery chassis 420 raised relative to surface 436 of battery chassis 420 as illustrated in FIG. 20. Further, in the non-expanded state, retaining ring 430 has a larger radial extent than retainers 440 of operator actuatable input device 394 (see FIG. 16). Thus, when retaining ring 430 has a smaller radial extent than retainers 438 of battery chassis 420, operator actuatable input device 394 is secured to battery chassis 420.

Figure 20A:
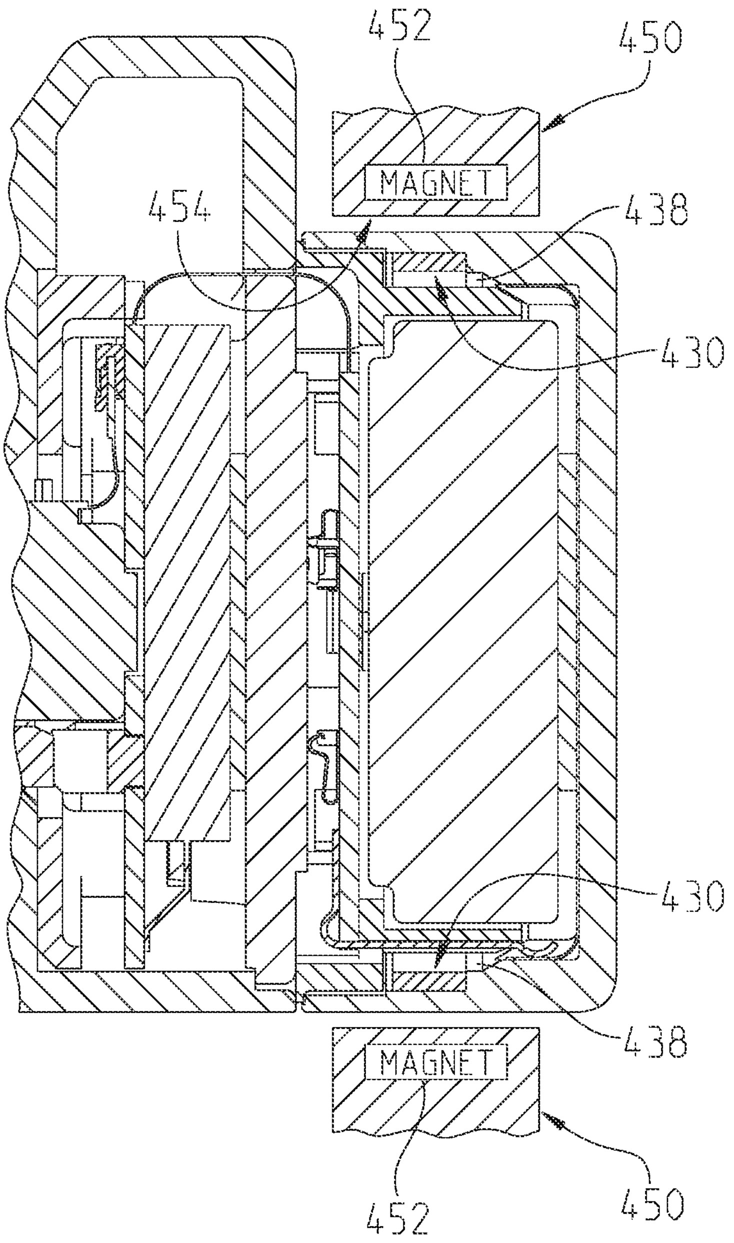
FIG. 20A illustrates a partial sectional view of FIG. 20 with a magnetic removal tool positioned about an operator actuatable input device of the operator actuatable assembly to move a retainer to permit removal of the operator actuatable input device.

Referring to FIG. 20A, a tool 450 carries a plurality of magnets 452. In embodiments, tool 450 has a circular shape with a central opening 454 to receive operator actuatable input device 394. When magnets 452 are positioned adjacent retaining ring 430, magnets 452 cause retaining ring 430 to expand outward towards magnets 452. In one embodiment, magnets are placed every 30° about operator actuatable input device 394 with tool 450. The orientation of the magnets alternates around the circular ring (a first magnet with a north pole closer to operator actuatable input device 394, followed by a second magnet with a south pole closer to the operator actuatable input device 394, and so on) This expansion results in the radial extent of retaining ring 430 to be larger than the radial extent of retainers 438 of battery chassis 420. As such, operator actuatable input device 394 is removable from battery chassis 420.

Operator actuation assembly 104 further includes a sensor 460 (see FIG. 16) which provides an indication to an electronic controller 374 of electro-mechanical lock core

100 when clutch 300 is in the disengaged position of FIG. 18. In the illustrated embodiment, sensor 460 is an optical sensor having an optical source in a first arm 462 and an optical detector in a second arm 464. An appendage 470 (see FIG. 17) is coupled to clutch 300 by tabs 472 being received in recesses 474. Appendage 470 includes a central opening 476 through which control pin 346 and drive shaft 340 extend and a leg 478 which is positioned between first arm 462 and second arm 464 of sensor 460 when clutch 300 is in the disengaged position of FIG. 18.

Returning to FIG. 33, electronic controller 374 is operatively coupled to wireless communication system 376. Wireless communication system 376 includes a transceiver and other circuitry needed to receive and send communication signals to other wireless devices, such as an operator device 500. In one embodiment, wireless communication system 376 includes a radio frequency antenna and communicates with other wireless devices over a wireless radio frequency network, such as a BLUETOOTH network or a WIFI network.

In embodiments, electro-mechanical lock core 100 communicates with operator device 500 without the need to communicate with other electro-mechanical lock cores 100. Thus, electro-mechanical lock core 100 does not need to maintain an existing connection with other electro-mechanical locking cores 100 to operate. One advantage, among others, is that electro-mechanical lock core 100 does not need to maintain network communications with other electro-mechanical lock cores 100 thereby increasing the battery life of battery 390. In other embodiments, electro-mechanical lock core 100 does maintain communication with other electro-mechanical locking cores 100 and is part of a network of electro-mechanical locking cores 100. Exemplary networks include a local area network and a mesh network.

Electrical assembly 370 further includes input devices 360. Exemplary input devices 360 include buttons, switches, levers, a touch display, keys, and other operator actuatable devices which may be actuated by an operator to provide an input to electronic controller 370. In embodiments, touch sensitive capacitive sensor 392 is an exemplary input device due to it providing an indication of when operator actuatable input device 394 is touched.

Once communication has been established with operator device 500, various input devices 506 of operator device 500 may be actuated by an operator to provide an input to electronic controller 374. In one embodiment, electro-mechanical lock core 100 requires an actuation of or input to an input device 360 of electro-mechanical lock core 100 prior to taking action based on communications from operator device 500. An advantage, among others, for requiring an actuation of or an input to an input device 360 of electro-mechanical lock core 100 prior to taking action based on communications from operator device 500 is that electro-mechanical lock core 100 does not need to evaluate every wireless device that comes into proximity with electro-mechanical lock core 100. Rather, electro-mechanical lock core 100 may use the actuation of or input to input device 360 to start listening to communications from operator device 500. As mentioned herein, in the illustrated embodiment, operator actuation assembly 104 functions as an input device 360. Operator actuation assembly 104 capacitively senses an operator tap on operator actuation assembly 104 or in close proximity to operator actuation assembly 104.

Exemplary output devices 362 for electro-mechanical lock core 100 include visual output devices, audio output device, and/or tactile output devices. Exemplary visual output devices include lights, segmented displays, touch displays, and other suitable devices for providing a visual cue or message to an operator of operator device 500. Exemplary audio output devices include speakers, buzzers, bells and other suitable devices for providing an audio cue or message to an operator of operator device 500. Exemplary tactile output devices include vibration devices and other suitable devices for providing a tactile cue to an operator of operator device 500. In embodiments, electro-mechanical lock core 100 sends one or more output signals from wireless communication system 376 to operator device 500 for display on operator device 500.

In the illustrated embodiment, electro-mechanical lock core 100 includes a plurality of lights which are visible through windows 364 (see FIGS. 1 and 2) and which are visible from an exterior of operator actuation assembly 104 of electro-mechanical lock core 100. electronic controller 374 may vary the illuminance of the lights based on the state of electro-mechanical lock core 100. For example, the lights may have a first illuminance pattern when access to actuate lock actuator plug 106 is denied, a second illuminance pattern when access to actuate lock actuator plug 106 is granted, and a third illuminance pattern when access to remove electro-mechanical lock core 100 from lock cylinder 122 has been granted. Exemplary illuminance variations may include color, brightness, flashing versus solid illumination, and other visually perceptible characteristics.

Operator device 500 is carried by an operator. Exemplary operator device 500 include cellular phones, tablets, personal computing devices, watches, badges, fobs, and other suitable devices associated with an operator that are capable of communicating with electro-mechanical lock core 100 over a wireless network. Exemplary cellular phones, include the IPHONE brand cellular phone sold by Apple Inc., located at 1 Infinite Loop, Cupertino, CA 95014 and the GALAXY brand cellular phone sold by Samsung Electronics Co., Ltd.

Operator device 500 includes an electronic controller 502, a wireless communication system 504, one or more input devices 506, one or more output devices 508, a memory 510, and a power source 512 all electrically interconnected through circuitry 514. In one embodiment, electronic controller 502 is microprocessor-based and memory 510 is a non-transitory computer readable medium which includes processing instructions stored therein that are executable by the microprocessor of operator device 500 to control operation of operator device 500 including communicating with electro-mechanical lock core 100. Exemplary non-transitory computer-readable mediums include random access memory (RAM), read-only memory (ROM), erasable programmable read-only memory (e.g., EPROM, EEPROM, or Flash memory), or any other tangible medium capable of storing information.

Figure 26:
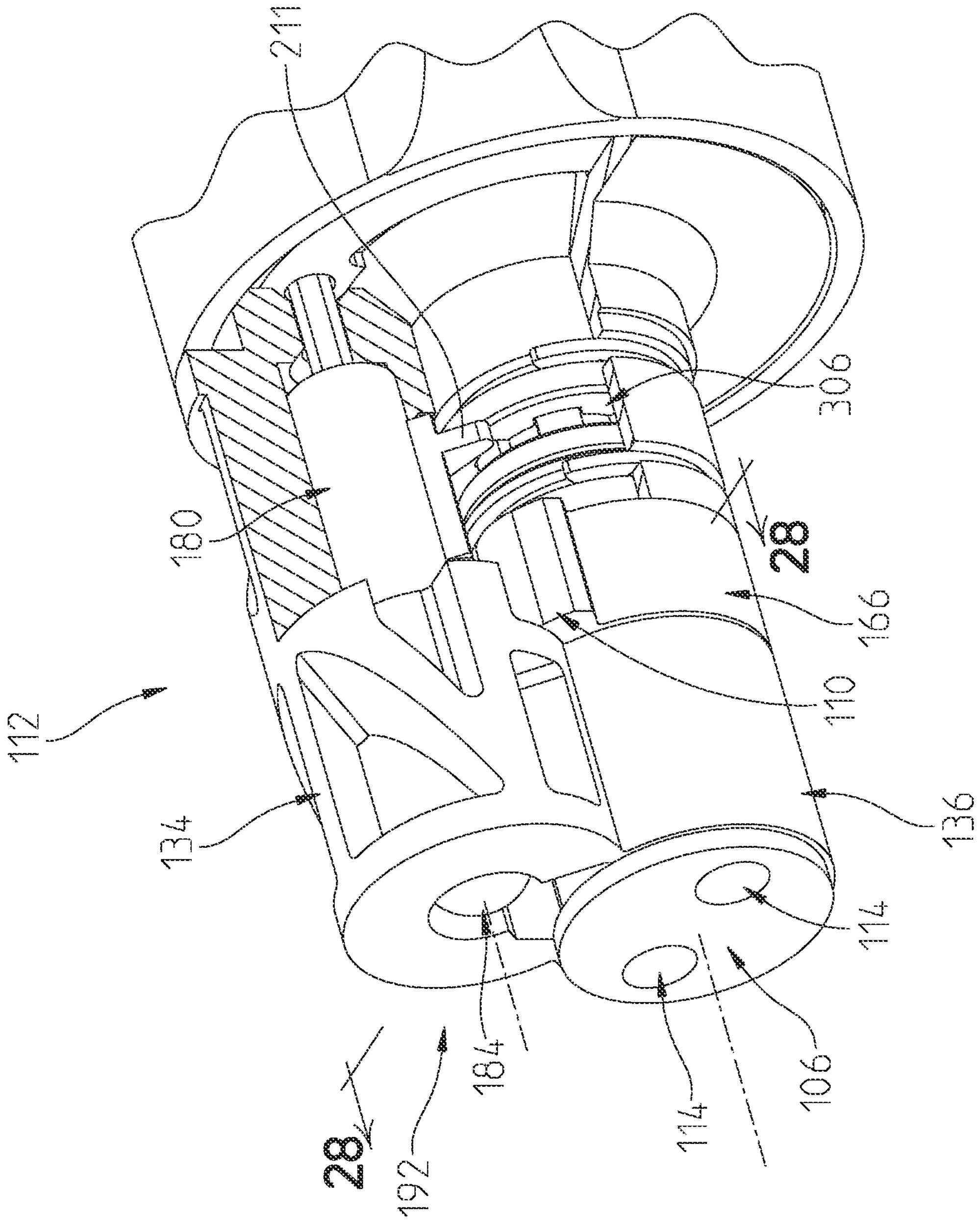
FIG. 26 illustrates a partial cut-away view of the electro-mechanical lock core of FIG. 1 corresponding to the arrangement of FIG. 25.
Figure 34:
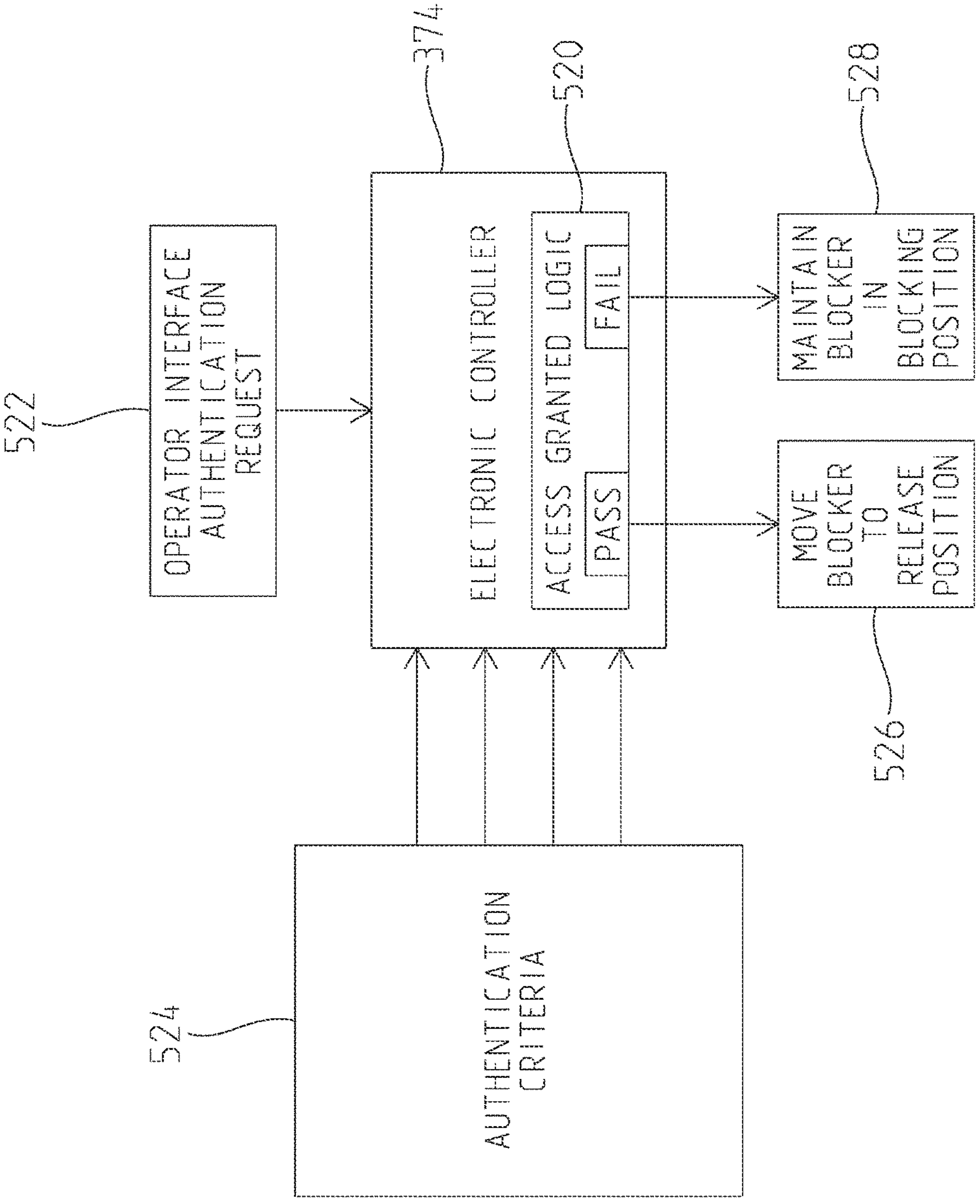
FIG. 34 is a representative view of a control sequence of the electro-mechanical locking core.

Referring to FIG. 34, electronic controller 374 executes an access granted logic 430 which controls the position of a blocker 306 (see FIG. 26). As explained in more detail herein, a position of blocker 306 controls whether core keeper 110 of electro-mechanical lock core 100 may be moved from an extended position (see FIG. 28) to a retracted position (see FIG. 29). Blocker 306 may be positioned by electric motor 302 in either a blocking position (see FIG. 24) wherein core keeper 110 may not be moved to the retracted position of FIG. 29 and a release position (see FIG. 26) wherein core keeper 110 may be moved to the retracted position of FIG. 29.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium 388 comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 374 is not microprocessor-based, but rather is configured to control operation of blocker 306 and/or other components of electro-mechanical lock core 100 based on one or more sets of hardwired instructions. Further, electronic controller 374 may be contained within a single device or be a plurality of devices networked together or otherwise electrically connected to provide the functionality described herein.

Electronic controller 374 receives an operator interface authentication request, as represented by block 522. In one embodiment, operator interface authentication request 522 is a message received over the wireless network from operator device 500. In one embodiment, operator interface authentication request 522 is an actuation of one or more of input devices 360. As explained in more detail herein, in one embodiment, operator actuation assembly 104 functions as an input device 360. Operator actuation assembly 104 capacitively senses an operator tap on operator actuation assembly 104 or in close proximity to operator actuation assembly 104.

Electronic controller 374 further receives authentication criteria 524 which relate to the identity and/or access level of the operator of operator device 500. In one embodiment, the authentication criteria is received from operator device 500 or communicated between electronic controller 374 and operator device 500. In one embodiment, an indication that the required authentication criteria has been provided to operator device, such as a biometric input or a passcode, is communicated to electronic controller 374.

Access granted logic 520 based on operator interface authentication request 522 and authentication criteria 524 determines whether the operator of operator device 500 is granted access to move core keeper 110 to the retracted position of FIG. 29 or is denied access to move core keeper 110 to the retracted position of FIG. 29. If the operator of operator device 500 is granted access to move core keeper 110 to the retracted position of FIG. 29, access granted logic 520 powers motor 302 to move blocker 306 to the release position (see FIG. 26), as represented by block 526. If the operator of operator device 500 is denied access to move core keeper 110 to the retracted position of FIG. 29, access granted logic 520 maintains blocker 306 in the blocking position (see FIG. 25), as represented by block 528.

Further, in embodiments, access granted logic 520 based on operator interface authentication request 522 and authentication criteria 524 determines whether the operator of operator device 500 is granted access to lock actuator plug 106 which in turn actuates cam member 126 in the illustrated embodiment or is denied access to lock actuator plug 106. If the operator of operator device 500 is granted access to lock actuator plug 106, access granted logic 520 powers motor 302 to move clutch 300 to the engaged position (see FIG. 20). If the operator of operator device 500 is denied access to move clutch 300 to the engaged position, access granted logic 520 maintains clutch 300 in a disengaged position (see FIG. 18).

Various operations of electro-mechanical lock core 100 are explained with reference to FIGS. 18-29. FIG. 18 illustrates a sectional view of electro-mechanical lock core 100 with clutch 300 in a disengaged positioned wherein engagement interface 254 of clutch 300 is spaced apart from engagement interface 250 of lock actuator plug 106. FIG. 18 is the rest position of electro-mechanical lock core 100. In the rest position, operator actuation assembly 104 is freely rotatable about longitudinal axis 108 and blocker 306, which in the illustrated embodiment is a portion of clutch 300, prevents an actuation of actuator 180 to move core keeper 110 to the retracted position of FIG. 29.

Referring to FIG. 20, electronic controller 374 has determined that one of access to lock actuator plug 106 or access to move core keeper 110 to the retracted position of FIG .29 has been granted. In response, clutch 300 has been moved in direction 160 by motor 302 to the engaged position wherein engagement interface 254 of clutch 300 is engaged with engagement interface 250 of lock actuator plug 106. This position also corresponds to blocker 306 to being in the release position (see FIG. 26). With clutch 300 moved in direction 160 to the position shown in FIG. 20, a rotation of operator actuation assembly 104 about longitudinal axis 108 causes a rotation of lock actuator plug 106 about longitudinal axis 108. In embodiments, after a predetermined period of time, electronic controller 374 moves clutch 300 back to the position shown in FIG. 18.

As mentioned above, the engaged position of clutch 300 corresponds to the release position of blocker 306. In order to move core keeper 110 from the extended position of FIG. 28 to the release position of FIG. 29, an operator manually actuates actuator 180. However, as shown in FIG. 20, operator actuation assembly 104 blocks access to actuator 180. By removing operator actuatable input device 394, touch sensitive capacitive sensor 392, foam spacer 422, and power supply 390, access to actuator 180 may be obtained. Operator actuatable input device 394, touch sensitive capacitive sensor 392, and foam spacer 422 are removed as a sub-assembly with tool 450 as discussed herein and as shown in FIG. 20A.

Once operator actuatable input device 394, touch sensitive capacitive sensor 392, and foam spacer 422 are removed, power supply 390 may be removed from battery chassis 420. If the operator has only been granted rights to actuate lock actuator plug 106, when power supply 390 is removed electronic controller 374 causes clutch 300 to return to the position of FIG. 18 with the energy stored in supercapacitor 410. If the operator has been granted rights to actuate core keeper 110 then electronic controller 374 leaves clutch 300 in the position of FIG. 20 when power supply 390 is removed.

Figure 21:
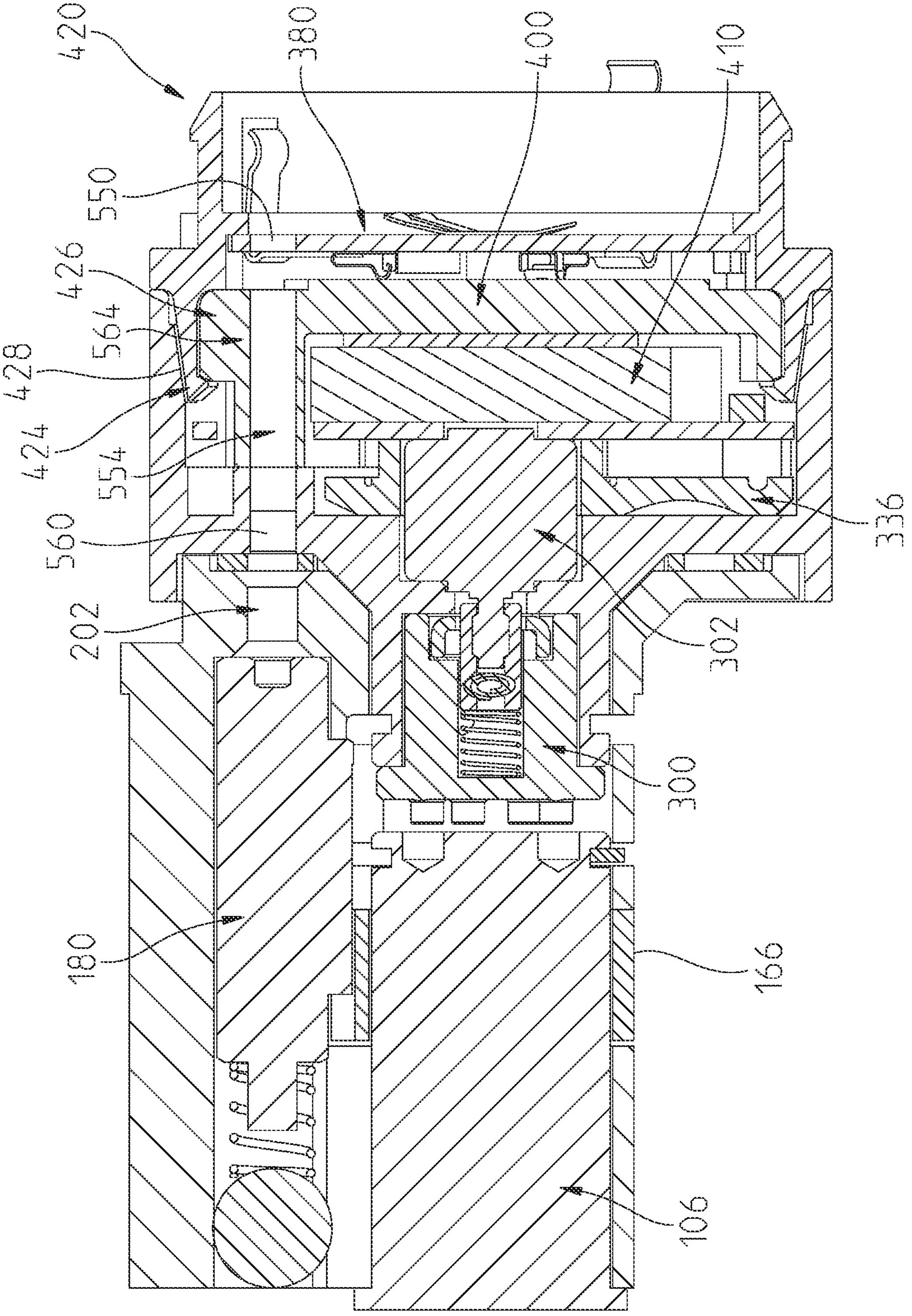
FIG. 21 illustrates a sectional view of FIG. 1 along lines 18-18 of FIG. 1 with an operator actuatable input and a battery of the operator actuatable assembly removed and the operator actuatable assembly rotated to align a passageway in the operator actuatable assembly with a passageway in the lock core body of the lock core assembly of FIG. 14.

As shown in FIGS. 15, 16, and 21, second circuit board 380 includes an aperture 550, first circuit board 372 includes a recess 552, protective cover 400 includes an aperture 554, chassis 336 includes a recess 556, and base 310 includes an aperture 560 which collectively form a passageway 564 (see FIG. 21). Operator actuation assembly 104 may be rotated as necessary to align passageway 564 with passage 202 in core body 112.

Figure 22:
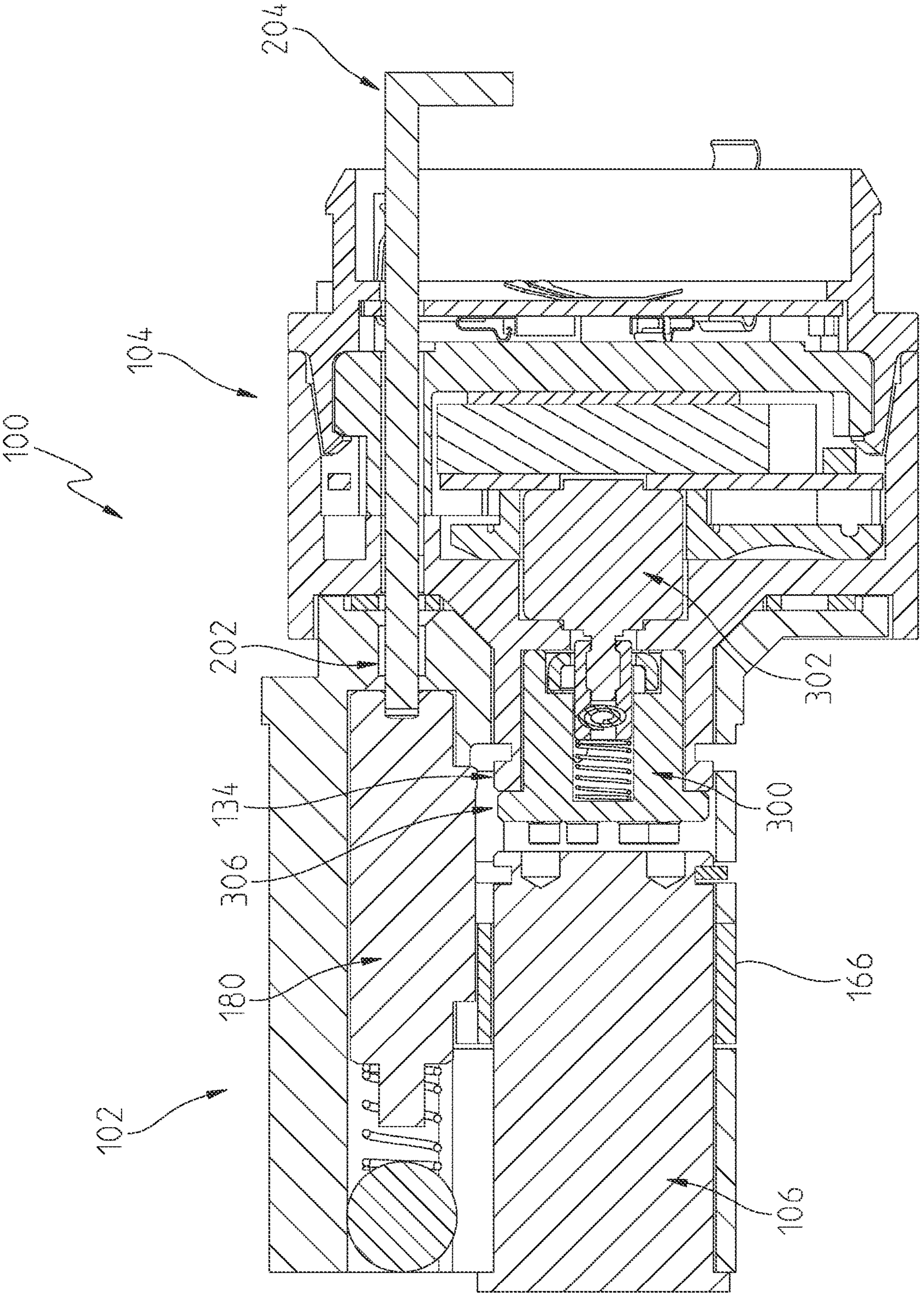
FIG. 22 illustrates the sectional view of FIG. 21 with a tool inserted into the passageway of the operator actuatable assembly and the passageway of the lock core body and in engagement with an actuator of a control assembly of the lock core assembly of FIG. 14.

Referring to FIG. 22, tool 204 is inserted through passageway 564 and passage 202 in core body 112 and is engaged with tool engagement portion 200 of actuator 180. In one embodiment, tool 204 is a wrench having a hexagonal shaped profile and tool engagement portion 200 of actuator 180 has a corresponding hexagonal shaped profile. In the position of actuator 180 shown in FIG. 22, actuator 180 is not able to rotate about axis 206 through an angular range sufficient enough to retract core keeper 110 to the retracted position of FIG. 29 due to blocker 211 (see FIG. 24) contacting stem 314 of base 310.

Figure 23:
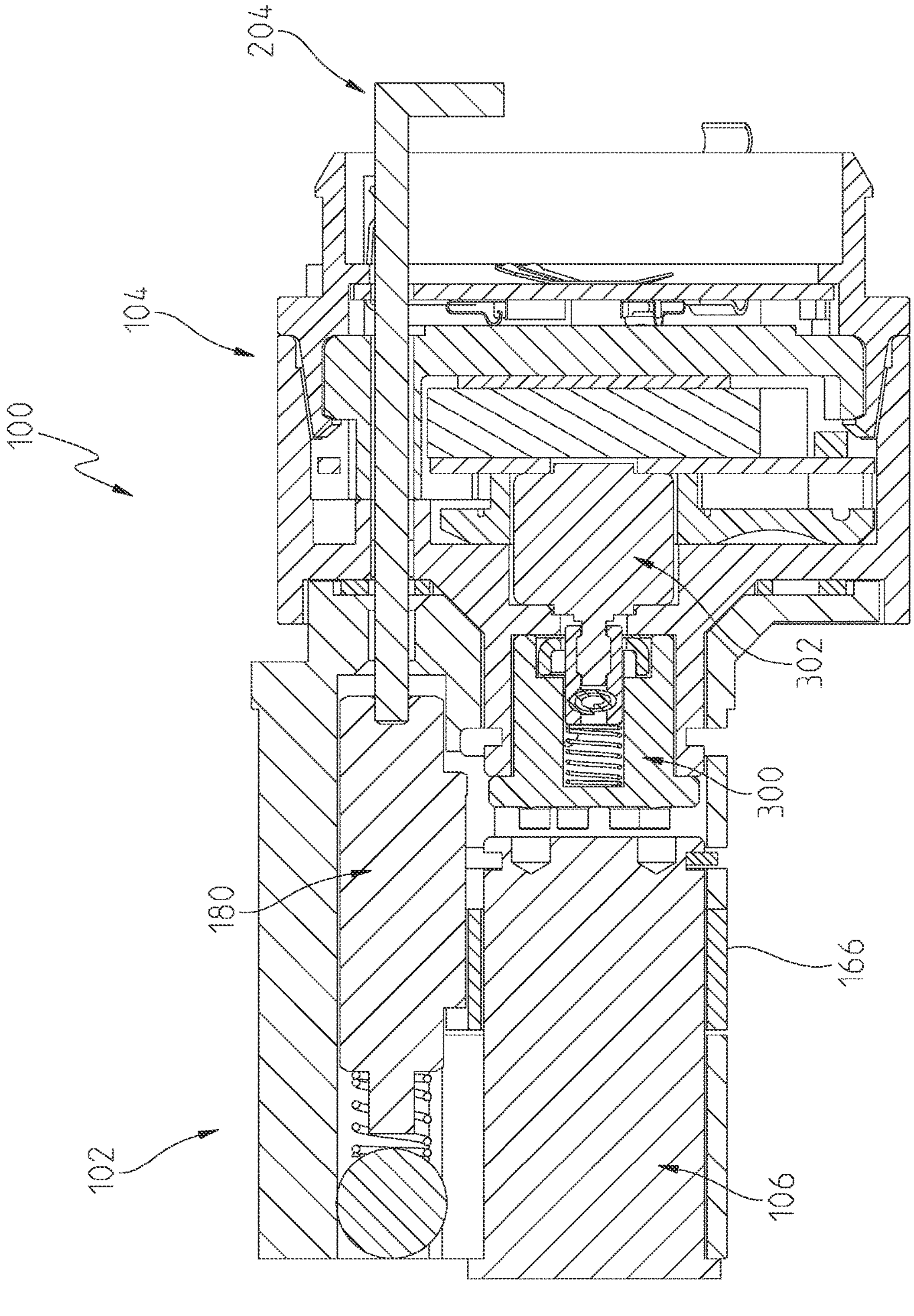
FIG. 23 illustrates the sectional view of FIG. 22 with the actuator of the control assembly displaced towards a rear portion of the lock core body.
Figure 24:
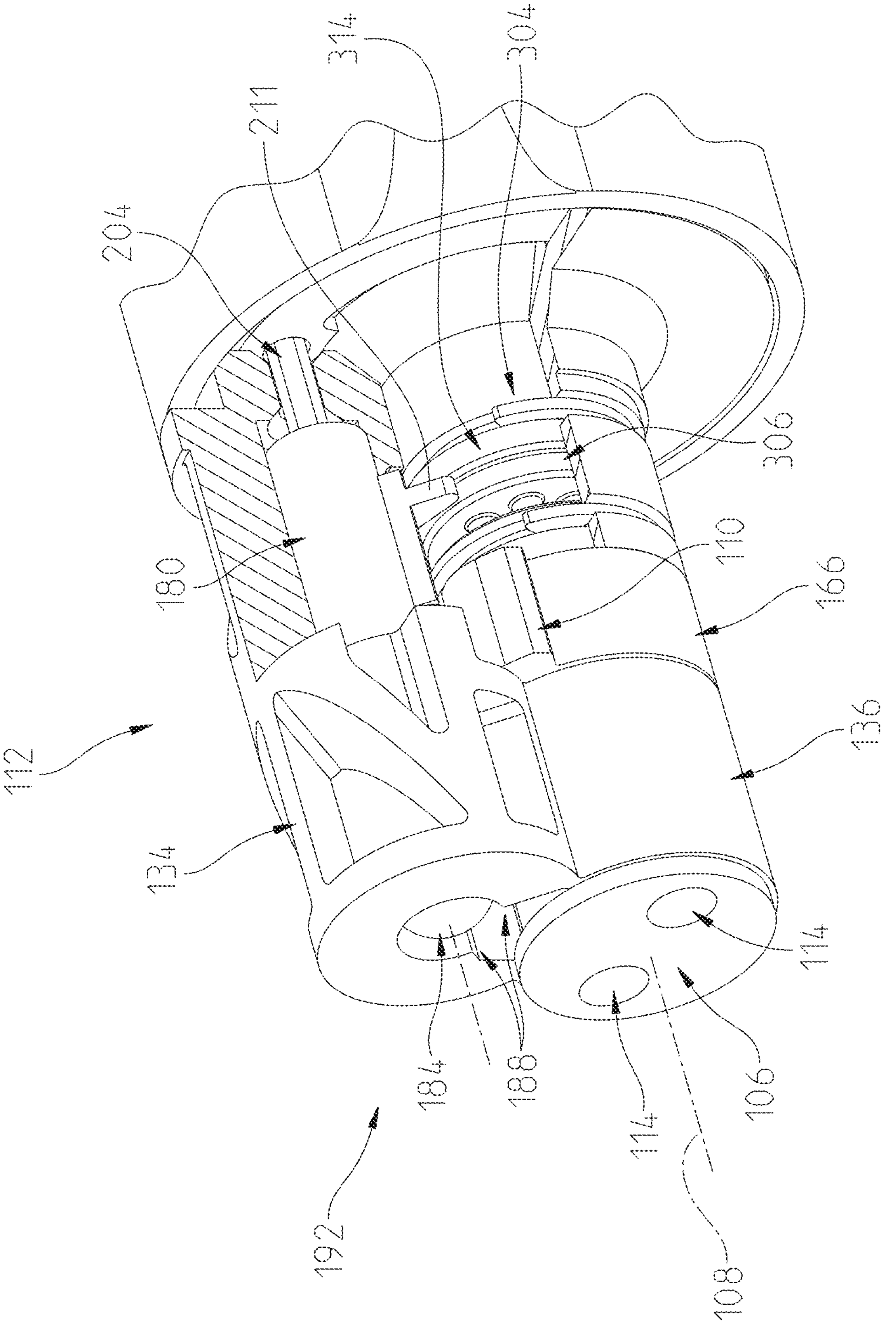
FIG. 24 illustrates a partial cut-away view of the electro-mechanical lock core of FIG. 1 corresponding to the arrangement of FIG. 23.

By pushing on tool 204 in direction 160, actuator 180 may be translated in direction 160 against the bias of biasing member 182 to the position shown in FIGS. 23 and 24. In the position shown in FIGS. 23 and 24, actuator 180 is not able to rotate about axis 206 through an angular range sufficient enough to retract core keeper 110 to the retracted position of FIG. 29 due to blocker 211 (see FIG. 24) contacting blocker 306 of clutch 300. In FIGS. 23 and 24, clutch 300 is in the disengaged position corresponding to access granted logic 520 determining the operator does not have access rights to move core keeper 110 from the extended position of FIG. 28 to the retracted position of FIG. 29.

Figure 27:
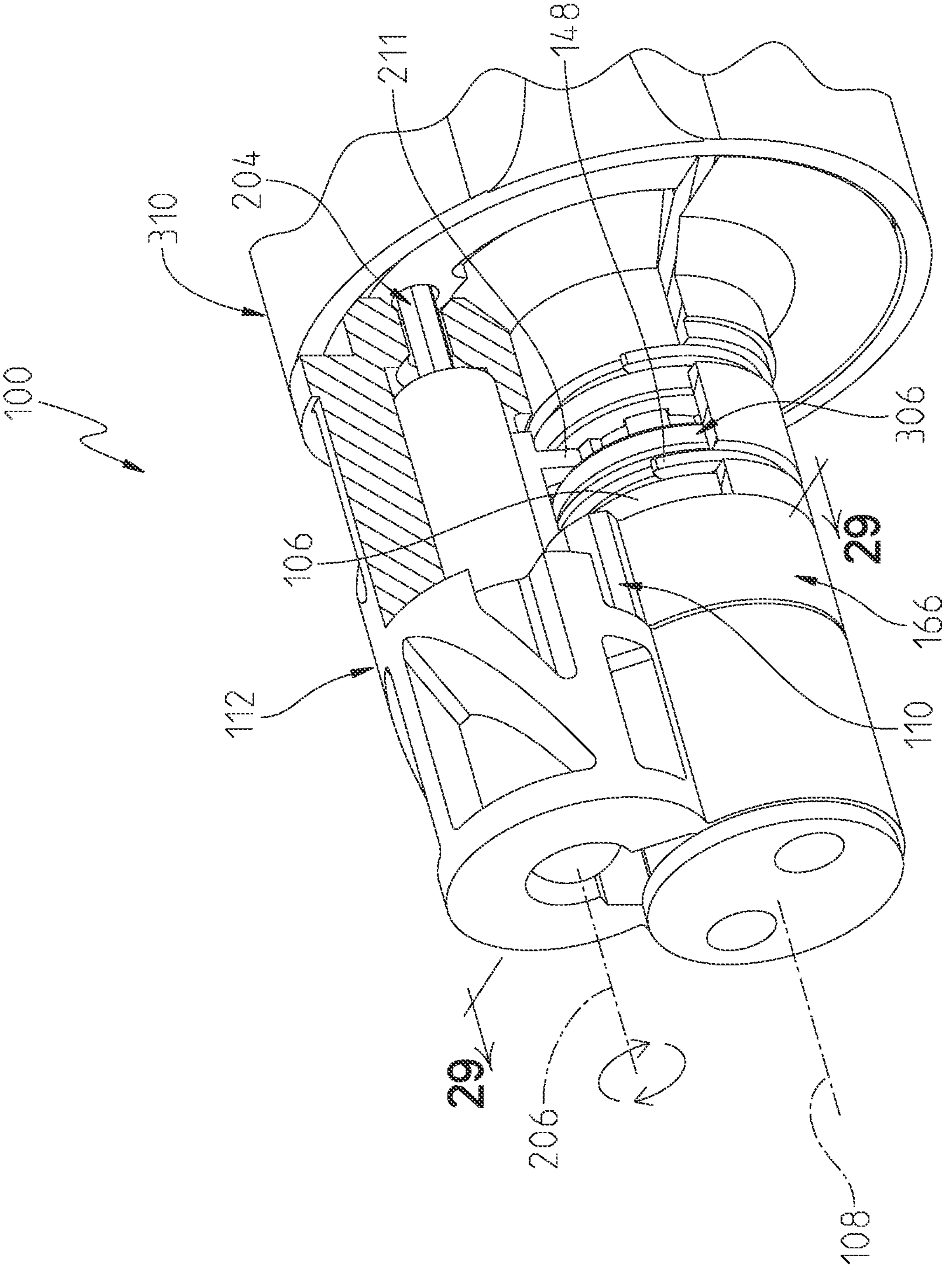
FIG. 27 illustrates the arrangement of FIGS. 25 and 26 with the actuator of the control assembly rotated to move the core keeper of the electro-mechanical lock core from an extended position of FIG. 24 to the illustrated retracted position.

In contrast in FIGS. 25 and 26, access granted logic 520 has determined that the operator has access rights to move core keeper 110 from the extended position of FIG. 28 to the retracted position of FIG. 29. As such, clutch 300 has been translated forward in direction 160 towards lock actuator plug 106. In this position of clutch 300, blocker 211 of actuator 180 may rotate about axis 206 in direction 212 to a position behind blocker 306 as shown in FIG. 27. The position of actuator 180 in FIG. 27 corresponds to FIG. 29 with core keeper 110 in the retracted position allowing electro-mechanical lock core 100 to be removed from lock cylinder 122.

Figure 30:
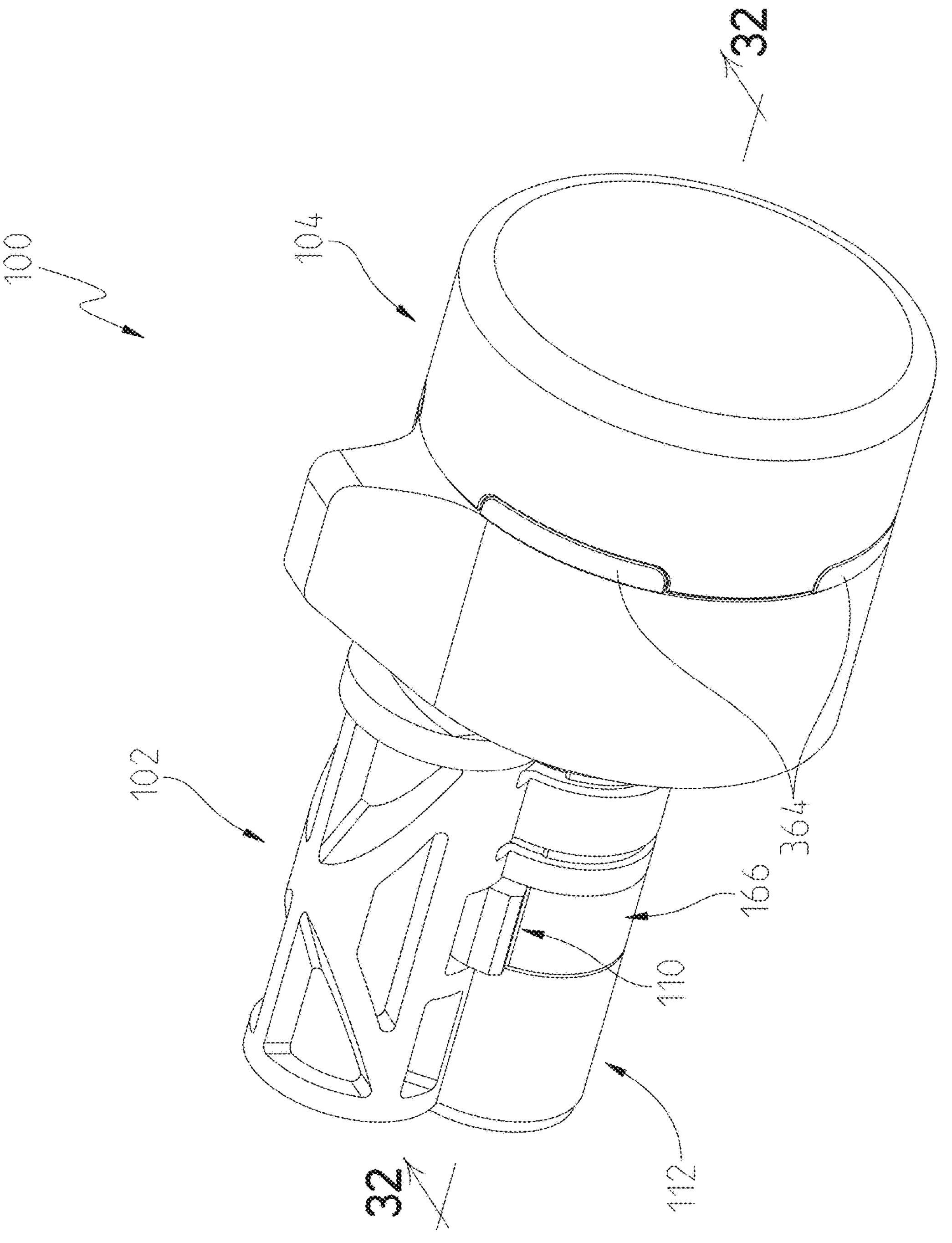
FIG. 30 illustrates a side perspective view of the electro-mechanical lock core of FIG. 1.

While electro-mechanical lock core 100 is coupled to lock cylinder 122 due to core keeper 110 being in the extended position of FIG. 28, operator actuation assembly 104 may not be decoupled from core assembly 102 to provide access to either lock actuator plug 106 or actuator 180. Referring to FIGS. 30-32, retainer 304 is positioned within lock cylinder 122 rearward of front surface 132 of lock cylinder 122 when electro-mechanical lock core 100 is coupled to lock cylinder 122. As such, retainer 304 may not be removed until an authorized user retracts core keeper 110 to the retracted position of FIG. 29 and removes electro-mechanical lock core 100 from lock cylinder 122. Once removed, retainer 304 may be removed and operator actuation assembly 104 be decoupled from core assembly 102.

Referring to FIG. 1, operator actuation assembly 104 of electro-mechanical lock core 100 has an exterior surface contour that may be grasped by an operator to rotate operator actuation assembly 104. Operator actuatable input device 394 includes a front surface 600 and a generally cylindrical side surface 602. Operator actuatable input device 394 mates against base 310 which includes a generally cylindrical side surface 604 and a thumb tab 606 having generally arcuate side surfaces 608 and a top surface 610. Thumb tab 606 assists the operator in grasping operator actuation assembly 104 and turning operator actuation assembly 104 relative to core assembly 102. Operator actuation assembly 104 may have different shapes of exterior surface contour, may include multiple tabs 606 or no tabs 606.

Referring to FIGS. 45-48, operator actuation assembly 104 is coupled to a large format interchangeable core ("LFIC") 900. Core 900 includes a lock core body, a control sleeve 904, a core keeper 906, and a lock actuator plug 910 (see FIG. 47). Lock actuator plug 910, like lock actuator plug 106 may be rotated by operator actuation assembly 104 when engaged to actuate a lock device. Similarly, core keeper 906, like core keeper 110, may be retracted to remove lock core 900 from a lock cylinder. Operator actuation assembly 104 is coupled to core 900 with a retainer 920, illustratively a C-clip.

Core 900 includes a control assembly 950 having an actuator 952 with a tool engagement portion 954. Tool engagement portion 954 is accessed with tool 204 in the same manner as actuator 180 of electro-mechanical lock core 100. A blocker 958 of actuator 952 must be positioned like blocker 211 for electro-mechanical lock core 100 in FIG. 27 to rotate actuator 952 thereby causing a rotation of control sleeve 904 through the intermeshing of a partial gear 964 of control sleeve 904 and a partial gear 966 of actuator 952. The rotation of control sleeve 904 retract core keeper 906 into lock core body 902 due to movement of pin 970 which is received in an opening 972 in core keeper 906.

Figure 35:
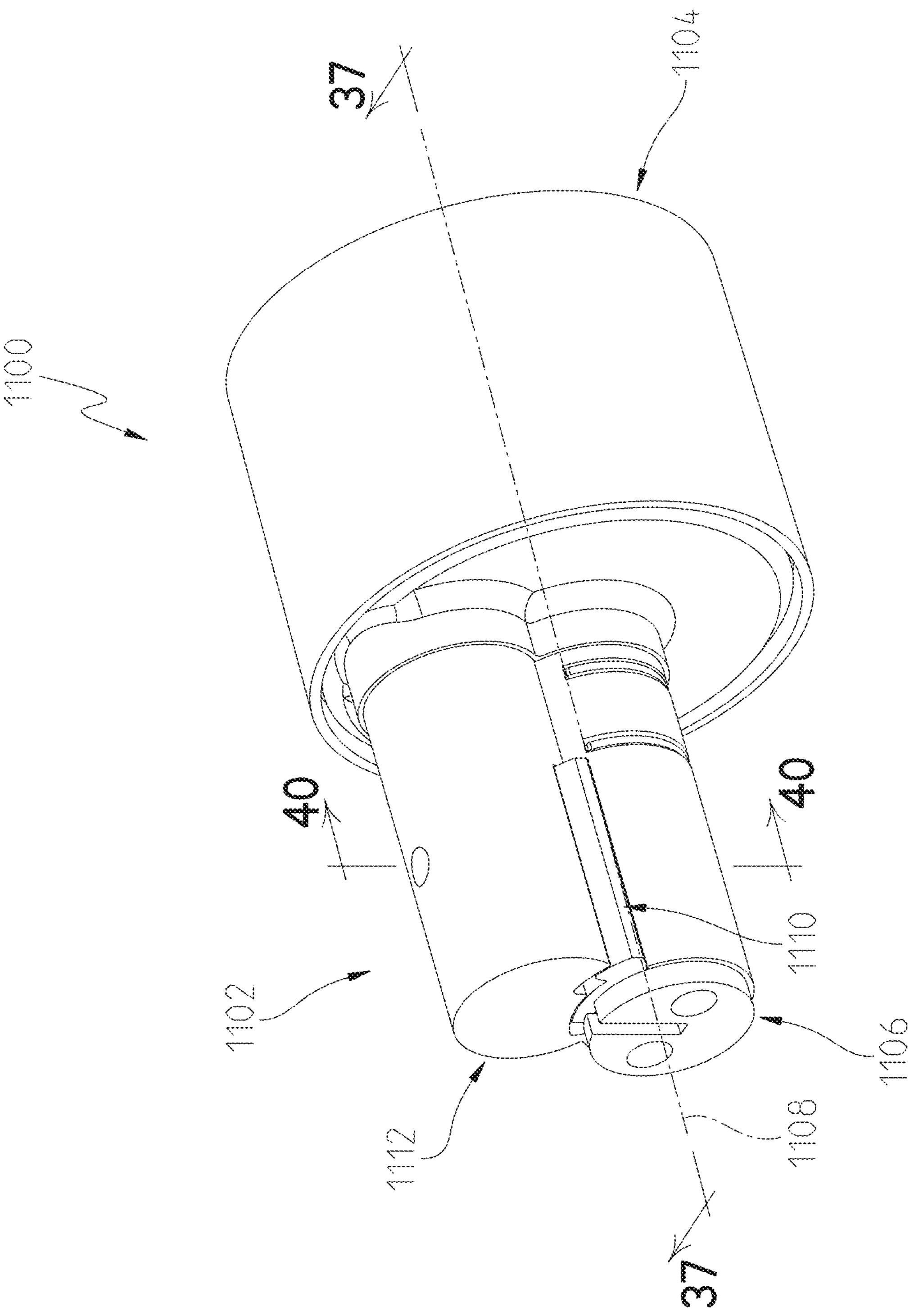
FIG. 35 illustrates a rear perspective view of another electro-mechanical lock core.
Figure 36:
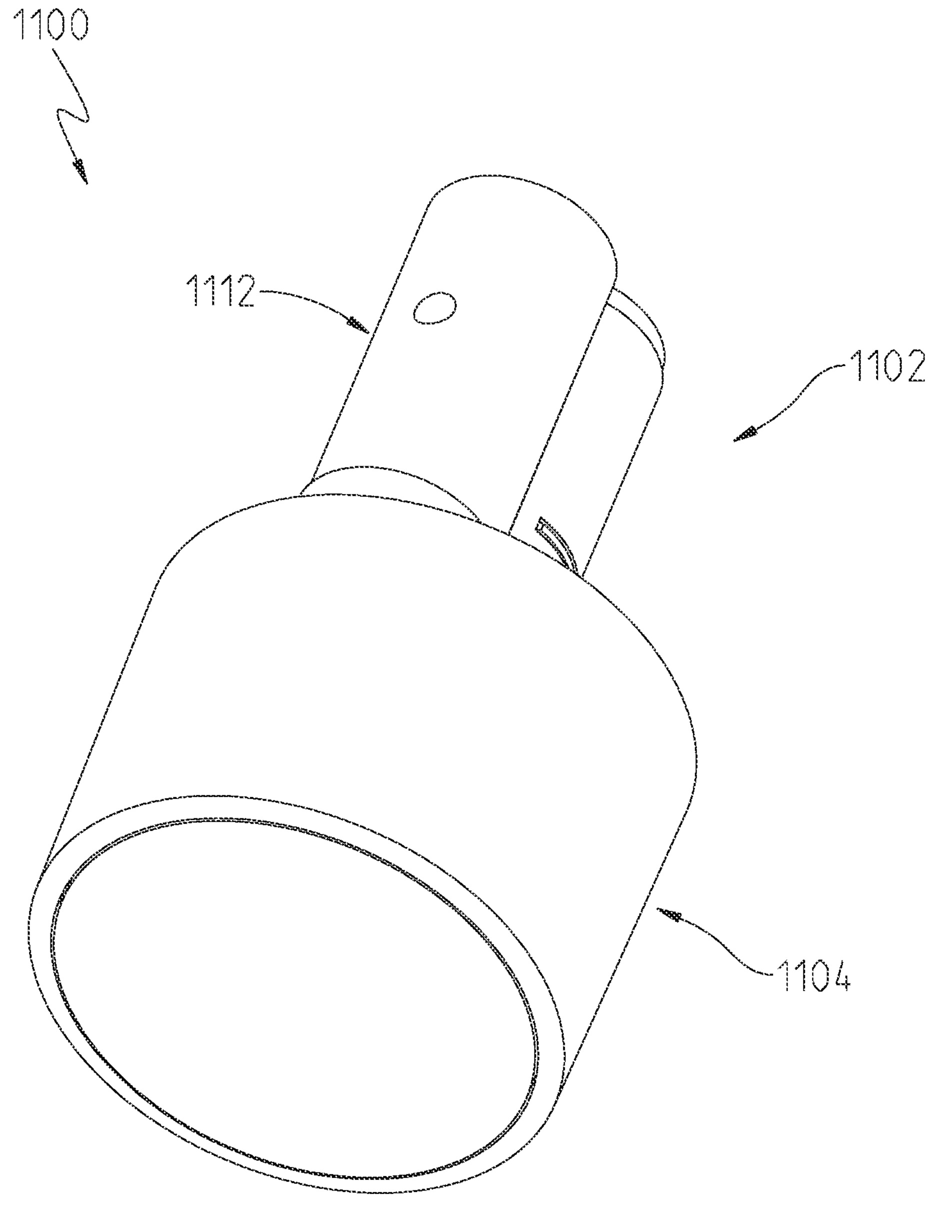
FIG. 36 illustrates a top perspective view of the electro-mechanical lock core of FIG. 35.
Figure 37:
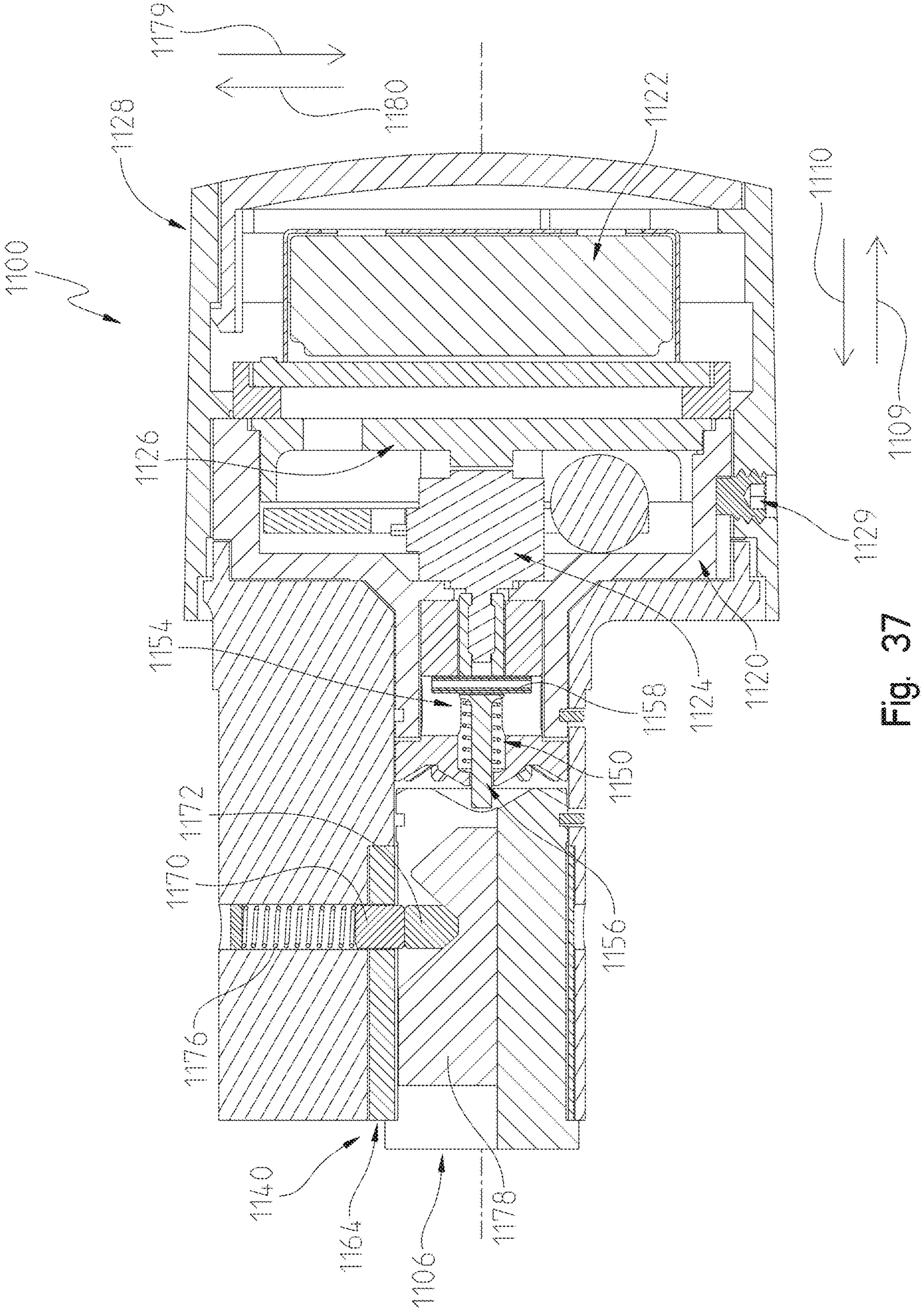
FIG. 37 illustrates a sectional view of the electro-mechanical lock core of FIG. 32 in a locked state with a disengaged clutch taken along lines 37-37 of FIG. 35.

Referring to FIGS. 35 and 36, another electro-mechanical lock core 1100 is illustrated. Electro-mechanical lock core 1100 includes a core assembly 1102 coupled to an operator actuation assembly 1104. As explained herein in more detail, in certain configurations operator actuation assembly 1104 may be actuated to rotate a core plug assembly 1106 (see FIG. 40) of core assembly 1102 about its longitudinal axis 1108 and in certain configurations operator actuation assembly 1104 may be actuated to move a core keeper 1110 of core assembly 1102 relative to a core body 1112 of core assembly 1102. Electro-mechanical lock core 1100 comprises an unlocked state and a locked state. Additionally, core assembly 1102 comprises a normal configuration and a control configuration. In the exemplary embodiment shown, core body 1112 defines a figure eight profile (see also FIGS. 40 and 41) which is received within a corresponding figure eight profile of a lock cylinder. The figure eight profile is known as a small format interchangeable core ("SFIC"). Core body 1112 may also be sized and shaped to be compatible with large format interchangeable cores ("LFIC") and other known cores. Accordingly, electo-mechanical lock core 1100 may be used with a plurality of lock systems to provide a locking device which restricts the operation of the coupled lock system. Further, although operator actuation assembly 1104 is illustrated as including a generally cylindrical knob, other user actuatable input devices may be used including handles, levers, and other suitable devices for interaction with an operator.

Figure 40:
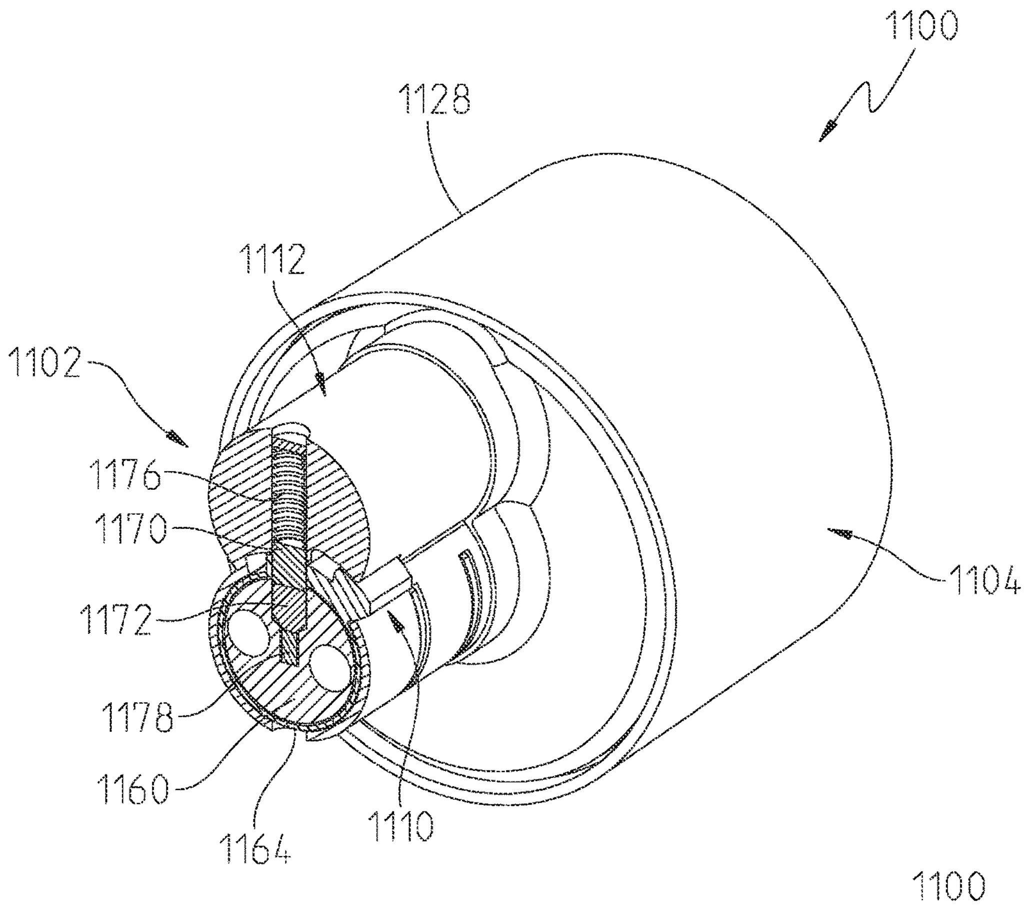
FIG. 40 illustrates a partial sectional view of the electro-mechanical lock core with a core keeper in an extended position taken along lines 40-40 in FIG. 35.
Figure 41:
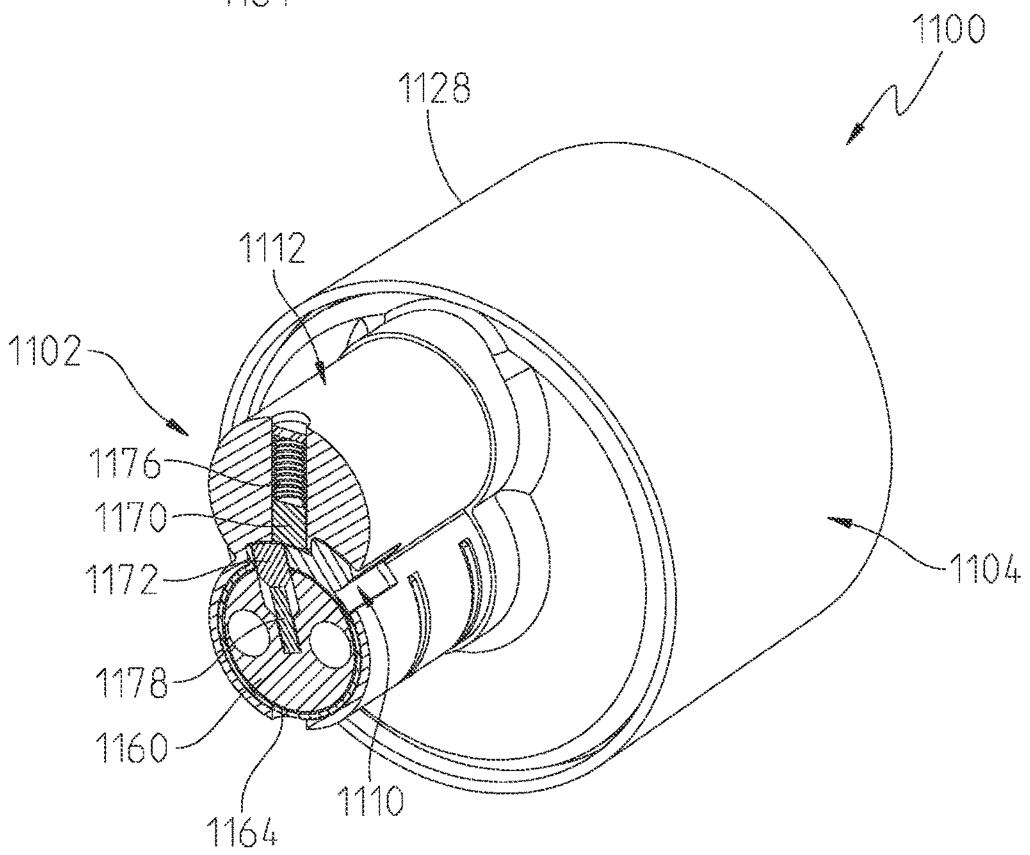
FIG. 41 illustrates a partial sectional view of the electro-mechanical lock core with the core keeper in a retracted position taken along lines 40-40 in FIG. 35.

Core keeper 1110 is moveable between an extended position shown in FIG. 40 and a retracted position shown in FIG. 41. When core keeper 1110 is in the extended position, core keeper 1110 is at least partially positioned outside of an exterior envelope of core body 1112. As a result, electro-mechanical lock core 1100 is retained within the lock cylinder in an installed configuration. That is, core keeper 1110 prohibits the removal of electro-mechanical lock core 1100 from the lock cylinder by a directly applied force. When core keeper 1110 is in the retracted position, core keeper 1110 is positioned at least further within the exterior envelope of core body 1112 or completely within the exterior envelope of core body 1112. As illustrated in FIG. 41, core keeper 1110 has rotated about longitudinal axis 1108 (see FIG. 42) and been received within an opening of core body 1112. As a result, electro-mechanical lock 1100 can be removed from or installed within the lock cylinder.

Referring now to FIGS. 37-44, electro-mechanical lock core 1100 is shown in more detail. Operator actuation assembly 1104 includes a knob base 1120, a knob cover 1126 received within and supported by a recess in knob base 1120, a motor 1124 supported by knob base 1120, a battery 1122 electrically coupled to motor 1124, and a knob cover 1128 that surrounds battery 1122, motor 1124, and at least a portion of knob base 1120. A fastener 1129 (see FIG. 37), illustratively a set screw, holds knob cover 1128 relative to knob base 1120 so knob base 1120 and knob cover 1128 rotate together about axis 1108. Operator actuation assembly 1104 also includes a printed circuit board assembly ("PCBA") 130. PCBA 1130 is electrically coupled to battery 1122 for power and communicatively coupled to motor 1124 to control the function of motor 1124. In the exemplary embodiment shown, motor 1124 is a stepper motor or other motor drive capable of position control (open-loop or closed loop). Battery 1122 may illustratively be a coin cell battery. Additionally, operator actuation assembly 1104 includes a transmitter and receiver for wireless communication with an electronic credential carried by a user, such as with operator device 500. In the exemplary embodiment shown, knob cover 1128 illustratively comprises a pry-resistance cover that protects PCBA 1130, the transmitter and receiver, and motor 1124 from forces and impacts applied to knob cover 1128. In one embodiment, knob cover 1126 is coupled to knob base 1120 with fasteners threaded into knob cover 1126 from an underside of knob cover 1126 facing motor 1124.

Core body 1112 of core assembly 1102 includes a cavity 1140 arranged concentrically with longitudinal axis 1108. Cavity 1140 receives a lock actuator assembly. The lock actuator assembly includes core plug assembly 1106, a biasing member 1150, a clutch 1152, a plunger 1156, and a clutch retainer 1154. Clutch 1152 is axially moveable in axial directions 1109, 1110 and is operatively coupled to knob base 1120, illustratively a spline connection (see FIG. 44). A first end of clutch 1152 has a plurality of engagement features. Clutch 1152 also includes a central passageway that houses at least a portion of plunger 1156 and biasing member 1150. Plunger 1156 includes a base portion and a distal portion extending from the base portion in an axial direction 1110. In the exemplary embodiment shown, the base portion of plunger 1156 is threadably coupled to a drive shaft of motor 1124. As a result, plunger 1156 is axially moveable within the central passageway in axial directions 1109, 1110 upon actuation of motor 1124. Moreover, plunger 1156 moves axially in response to rotational movement of the drive shaft of motor 1124.

Clutch 1152 includes a central opening coaxial with the central passageway that permits at least a distal portion of plunger 1156 to pass through. In the exemplary embodiment shown, biasing member 1150 biases clutch 1152 in axial direction 1110 toward core plug assembly 1106. Clutch 1152 includes a slot 1158 perpendicular to the central passageway. Plunger 1156 is axially retained within the central passageway of clutch 1152 by clutch retainer 1154, which is received within slot 1158. As a result, plunger 1156 is pinned to clutch 1152 for limited axial movement relative to clutch 1152.

Core plug assembly 1106 includes a core plug body 1160 and a control sleeve 1164. A first end of core plug body 1160 includes a plurality of engagement features configured to engage the plurality of engagement features of clutch 1152. Specifically, alignment of the engagement features of clutch 1152 and core plug body 1160 results in clutch 1152 engaging with core plug body 1160. When plunger 1156 is axially displaced in axial direction 1110, clutch 1152 is similarly displaced in axial direction 1110. If the engagement features of clutch 1152 align with the engagement features of core plug body 1160, the engagement features will engage (see FIG. 38). If the engagement features of clutch 1152 and core plug body 1160 are misaligned, the plurality of engagement features will not engage. However, plunger 1156 will continue to axially displace in axial direction 1110 while clutch 1152 is "pre-loaded" as plunger 1156 compresses biasing member 1150 (see FIG. 39). Because clutch 1152 rotates during operation in response to knob cover 1128 being rotated by a user, the engagement features of clutch 1152 and core plug body 1160 will align due to rotation of knob cover 1128.

Control sleeve 1164 surrounds core plug body 1160 and supports core keeper 1110 for rotation between the extended and retracted positions. Control sleeve 1164 is selectively rotatable about longitudinal axis 1108. More specifically, rotation of control sleeve 1164 about longitudinal axis 1108 is constrained by a stack of pin segments 1170, 1172. In the exemplary embodiment shown, pin segments 1170, 1172 are positioned radially in a radial direction 1180 relative to longitudinal axis 1108 and moveable in radial directions 1178, 1179. A biasing member 1176 biases pin segments 1170, 1172 in a radial direction 1179 (see FIG. 39).

Figure 42:
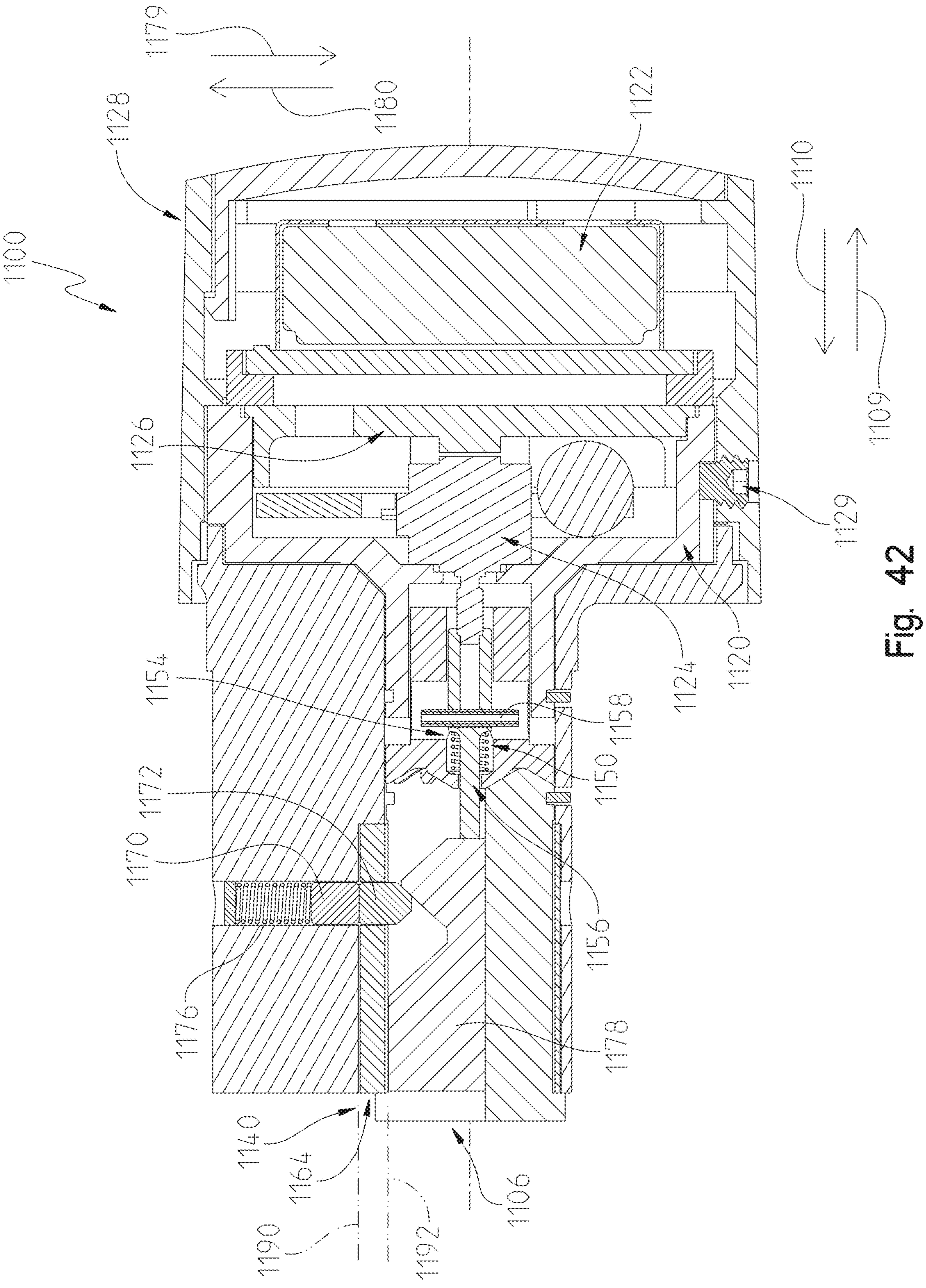
FIG. 42 illustrates a sectional view of the electro-mechanical lock core with a lock assembly in a control configuration and the engaged clutch taken along lines 37-37 of FIG. 35.

Core plug assembly 1106 also includes a keyblade 1178, which has a contoured profile. Keyblade 1178 is axially moveable in axial directions 1110, 1109. When core assembly 1102 enters the control mode, the drive shaft of motor 1124 rotates to axially displace plunger 1156 in axial direction 1110 further in the control configuration of FIG. 42 compared to the normal configuration of FIG. 38. More specifically, sufficient axial displacement of plunger 1156 in axial direction 1110 results in the distal portion of plunger 1156 engaging keyblade 1178. When keyblade 1178 is displaced in axial direction 1110, a ramp portion of the contoured profile of keyblade 1178 engages pin segment 1172 and radially displaces pin segments 1170, 1172. Thus, keyblade 1178 converts axial movement of plunger 1156 into radial movement of pin segments 1170, 1172.

In order to exit the control configuration and return to the normal configuration, motor 1124 reverses the direction of rotation. When motor 1124 is reversed such that plunger 1156 is axially displaced in axial direction 1109, the biasing force of biasing member 1176 in radial direction 1179 axially displaces keyblade 1178 in axial direction 1109. Accordingly, keyblade 1178 may be decoupled from plunger 1156. Furthermore, the engagement features of clutch 1152 and core plug body 1160 disengage when plunger 1156 is displaced in axial direction 1109. In the exemplary embodiment shown, motor 1124 reverses after expiration of a first preset time.

When installing or removing core plug body 1160 from core body 1112, keyblade 1178 is axially displaced in axial direction 1110 to radial displace pin segments 1170, 1172 in radial direction 1180. Displacement of pin segments 1170, 1172 in radial direction 1180 results in the abutting surfaces of pin segments 1170, 1172 aligning with a control shearline 1190 (see FIG. 42). Control shearline 1190 is defined by the interface of an exterior surface of control sleeve 1164 with an interior wall of cavity 1140 of core body 1112.

Operating shearline 1192 (see FIG. 38) is defined by the interface of an exterior surface of core plug body 1160 with an interior surface of control sleeve 1164. Since a user may release knob cover 1128 at any time, operating shearline 1192 is configured to be engaged even in the locked state of electro-mechanical lock core 1100. However, with clutch 1152 disengaged, knob cover 1128 spins freely and it is not possible for the user to rotate core plug body 1160.

Figure 38:
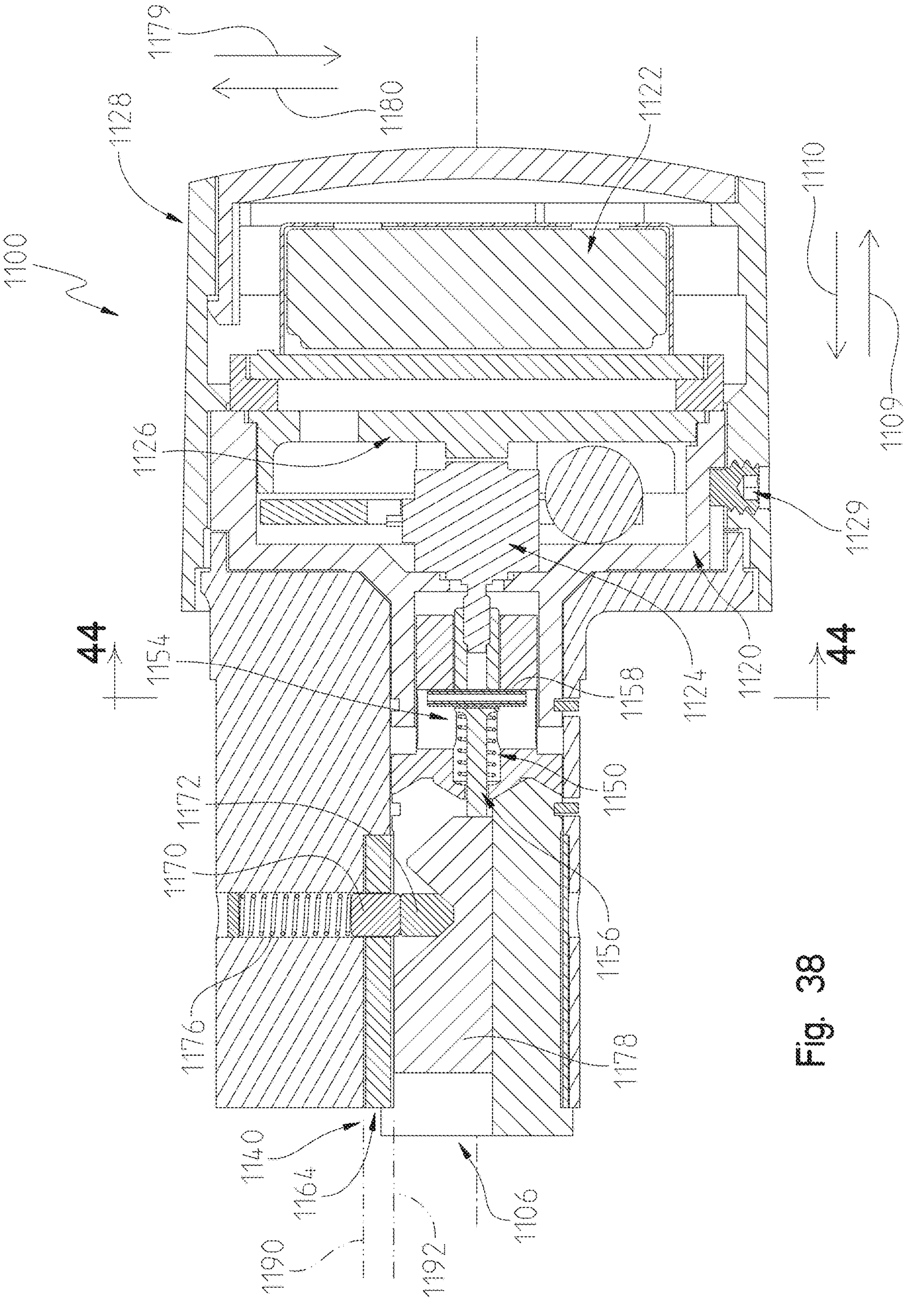
FIG. 38 illustrates a sectional view of the electro-mechanical lock core in an unlocked state with an engaged clutch taken along lines 37-37 of FIG. 35.

FIG. 38 illustrates a sectional view of electro-mechanical lock core 1100 in the unlocked state with the engagement features of clutch 1152 and core plug body 1160 engaged. Here, motor 1124 has actuated to axially displace plunger 1156 and clutch 1152 in axial direction 1110. The engagement features of clutch 1152 and core plug body 1160 are engaged because they were aligned with each other. Motor 1124 has not actuated plunger 1156 sufficiently in direction 1110 to axially displace keyblade 1178 in axial direction 1110. As a result, the interface between pin segments 1170, 1172 remains at operating shearline 1192 and electro-mechanical lock core 1100 transitions from the locked state (clutch 1152 spaced apart from core plug 1160) to the unlocked state (clutch 1152 engaged with core plug 1160). A rotation of knob cover 1128 by a user will result in rotation of core plug body 1160.

Figure 39:
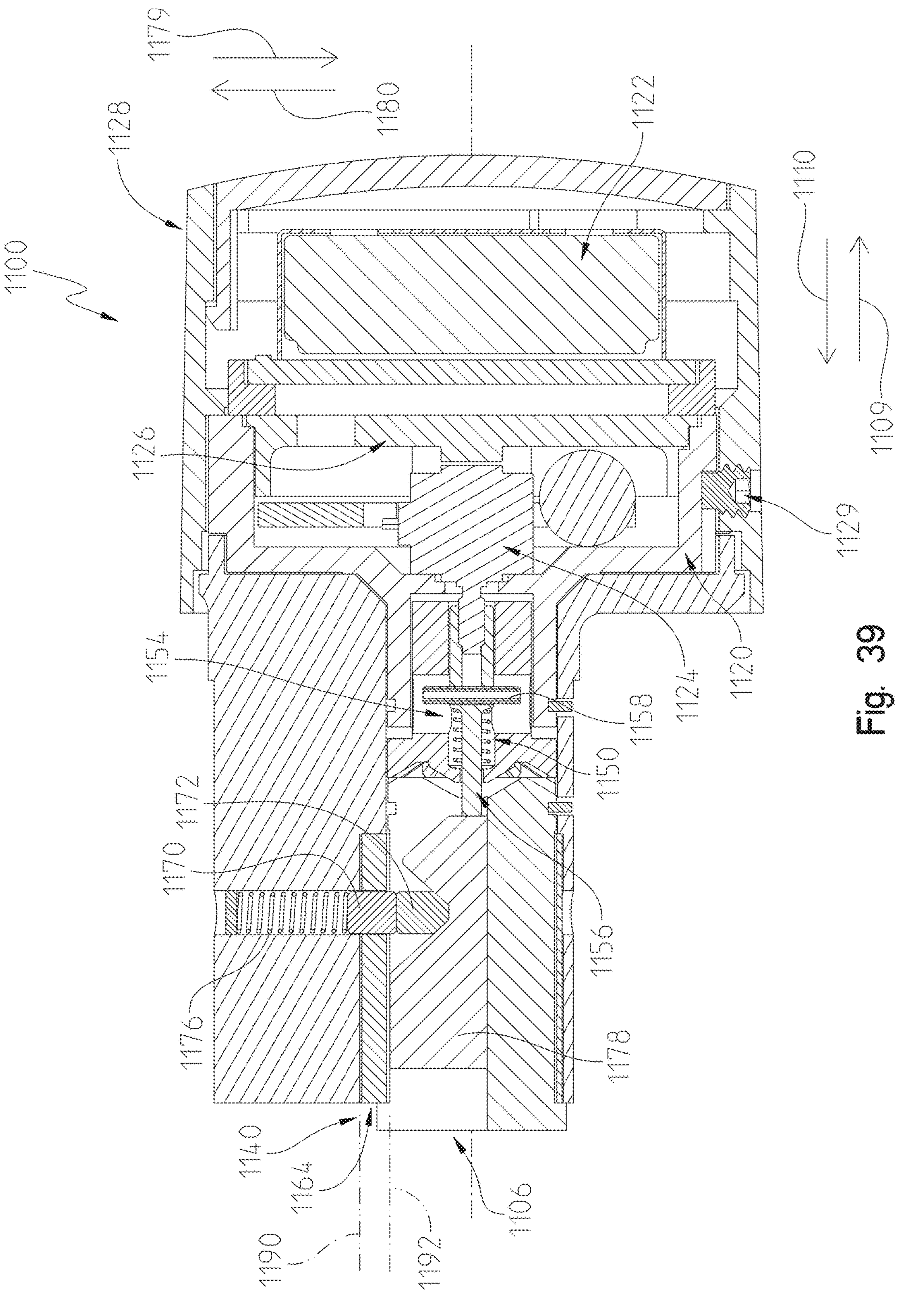
FIG. 39 illustrates a sectional view of the electro-mechanical lock core in a retractable state with the disengaged clutch taken along lines 37-37 of FIG. 35.

FIG. 39 illustrates a sectional view of electro-mechanical lock core 1100 in the unlocked state with the engagement features of clutch 1152 and core plug body 1160 disengaged. Here, motor 1124 has actuated to axially displace plunger 1156 and clutch 1152 in axial direction 1110. The engagement features of clutch 1152 and core plug body 1160 are disengaged because they were not aligned with each other. Accordingly, continued displacement of plunger 1156 in axial direction 1110 has "preloaded" biasing member 1150. When a user rotates knob cover 1128 about longitudinal axis 1108, the engagement features of clutch 1152 and core plug body 1160 will engage once they are aligned with each other. Motor 1124 has not actuated to axially displace keyblade 1178 in axial direction 1110. As a result, the interface between pin segments 1170, 1172 remains at operating shearline 1192 and electro-mechanical lock core 1100 transitions from the locked state to the unlocked state. A rotation of knob cover 1128 by user will result in engagement features of clutch 1152 and core plug body 1160 aligning and core plug body 1160 rotating.

FIG. 40 illustrates a partial sectional view of electro-mechanical lock core 1100 with core keeper 1110 in the extended positioned. Accordingly, core keeper 1100 extends outside of the exterior envelope of core body 1112. Additionally, the interface between pin segments 1170, 1172 is at operating shearline 1192. Therefore, core plug body 1160 may rotate relative to control sleeve 1164.

FIG. 41 illustrates a partial sectional view of electro-mechanical lock core 1100 with core keeper 1110 in the retracted position. Accordingly, core keeper 1110 is positioned at least further within the exterior envelope of core body 1112. Additionally, the interface between pin segments 1170, 1172 is at the control shearline 1190. Therefore, core plug body 1160 and control sleeve 1164 have rotated together about longitudinal axis 1108.

FIG. 42 illustrates a sectional view of electronical-mechanical lock core 1100 with lock assembly 1102 in the control configuration. The engagement features of clutch 1152 and core plug body 1160 are engaged. Here, motor 1124 has actuated to axially displace plunger 1156 and clutch 1152 in axial direction 1110. The engagement features of clutch 1152 and core plug body 1160 are engaged because they were aligned with each. Additionally, motor 1124 has actuated to axially displace keyblade 1178 in axial direction 1110. As a result, pin segments 1170, 1172 have radially displaced in radial direction 1180 until the interface between pin segments 1170, 1172 are at control shearline 1190. Accordingly, core plug body 1160 and control sleeve 1154 may be rotated together about longitudinal axis 1108 and core plug assembly 1106 removed from core body 1112.

Figure 43:
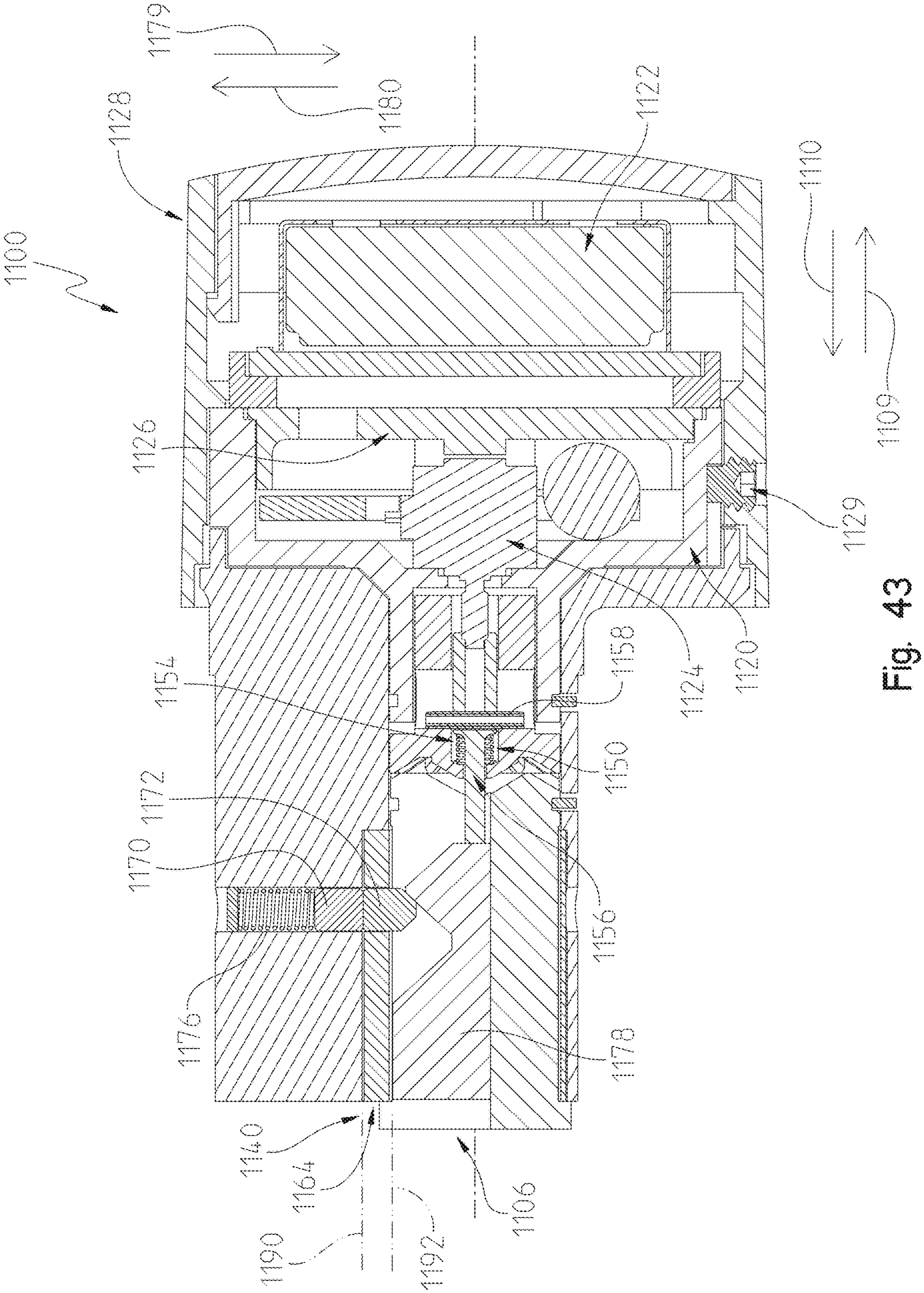
FIG. 43 illustrates a sectional view of the electro-mechanical lock core with the lock assembly in a control configuration and the disengaged clutch taken along lines 37-37 of FIG. 35.

FIG. 43 illustrates a sectional view of electro-mechanical lock core 1100 with lock assembly 1102 in the control configuration. The engagement features of clutch 1152 and core plug body 1160 are disengaged. Here, motor 1124 has actuated to axially displace plunger 1156 and clutch 1152 in axial direction 1110. The engagement features of clutch 1152 and core plug body 1160 are disengaged because they were not aligned with each other. Accordingly, continued displacement of plunger 1156 in axial direction 1110 has "preloaded" biasing member 1150. When a user rotates knob cover 1128 about longitudinal axis 1108, the engagement features of clutch 1152 and core plug body 1160 will engage once they are aligned with each other.

Figure 44:
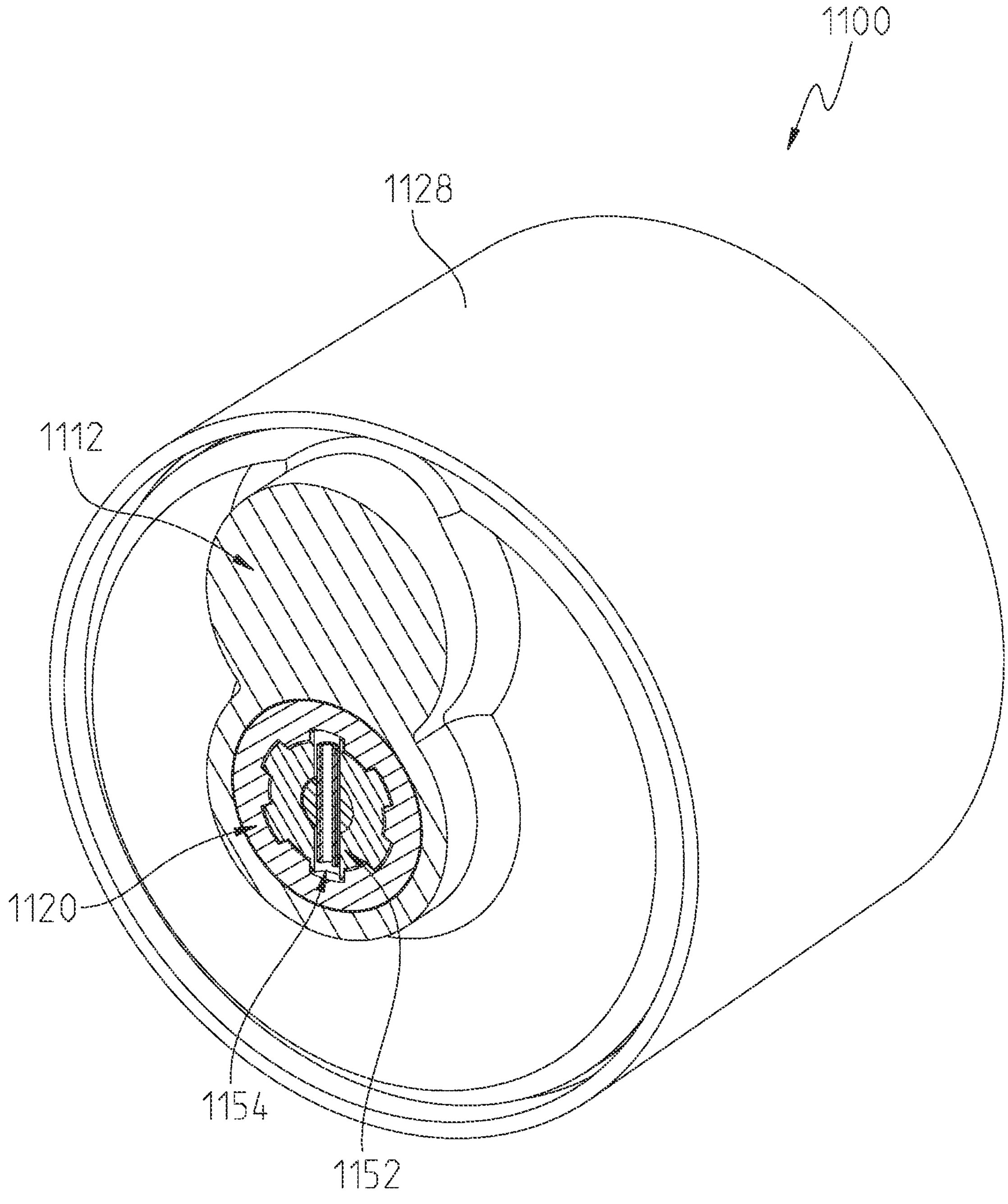
FIG. 44 illustrates a sectional view of the electro-mechanical lock core taken along lines 44-44 of FIG. 38.
Figure 45:
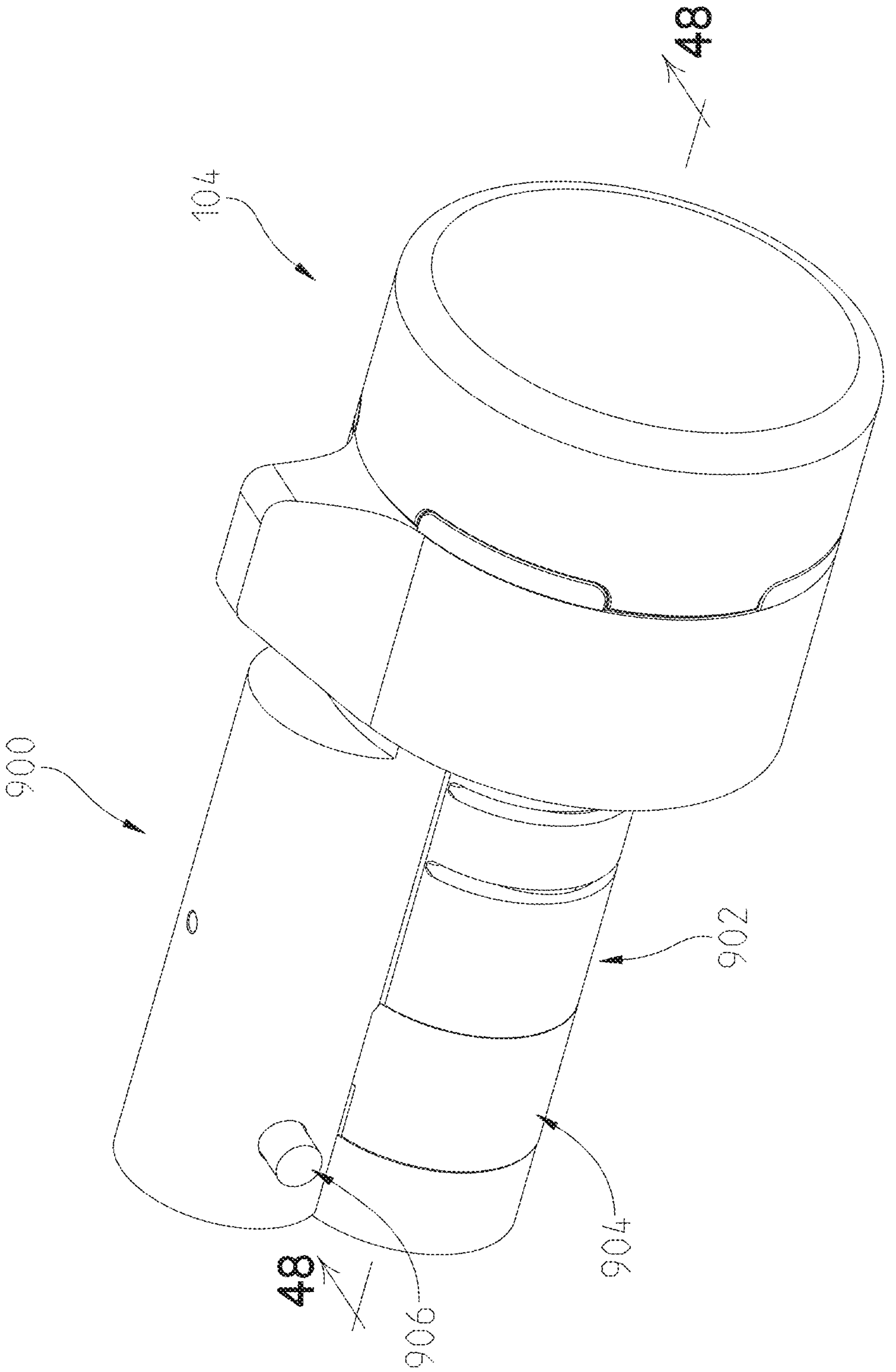
FIG. 45 illustrates a side perspective view of a large format electro-mechanical interchangeable core incorporating the operator actuatable assembly of the electro-mechanical lock core of FIG. 1.
Figure 46:
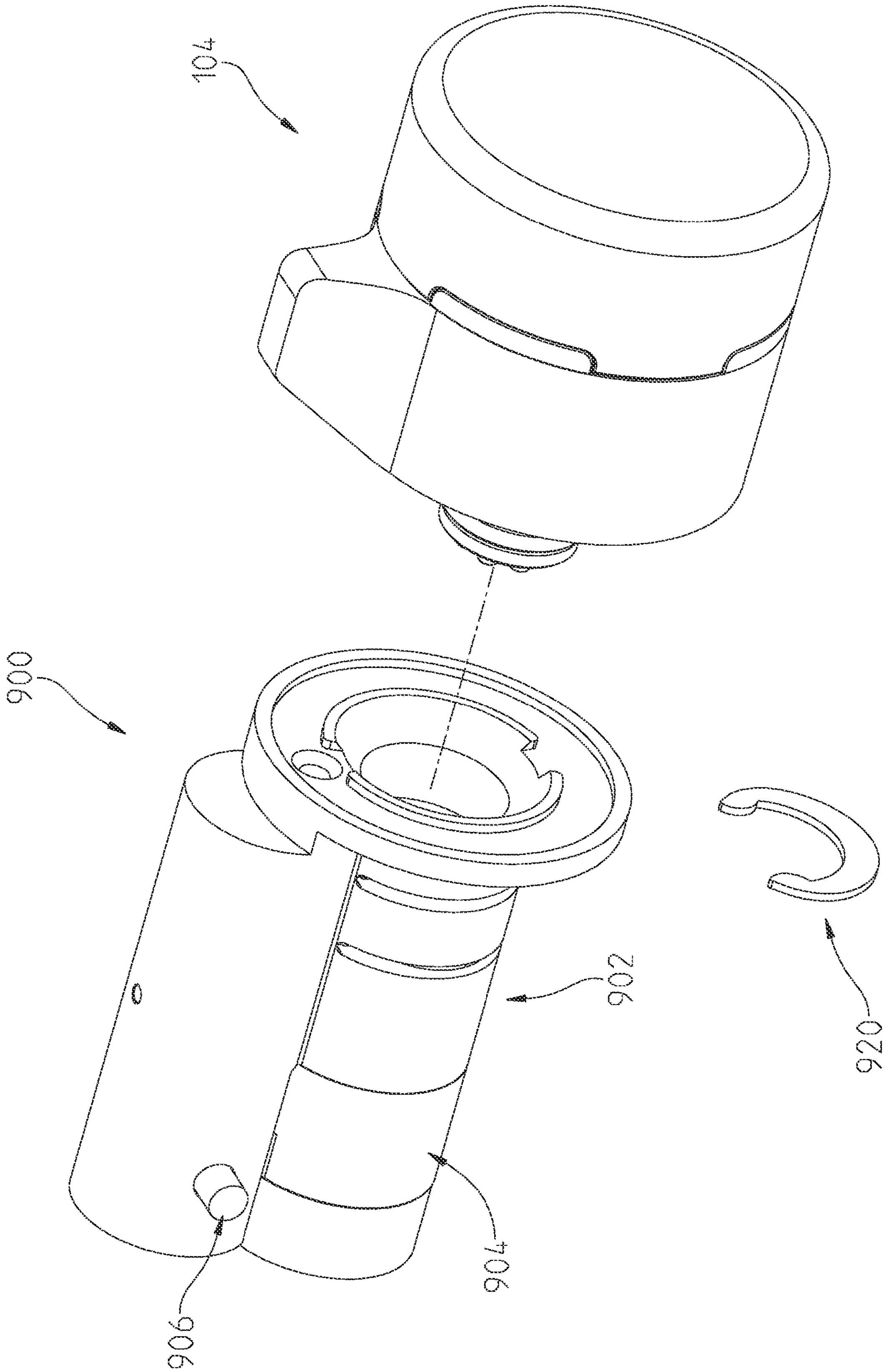
FIG. 46 illustrates an exploded view of the large format electro-mechanical interchangeable core of FIG. 45.
Figure 47:
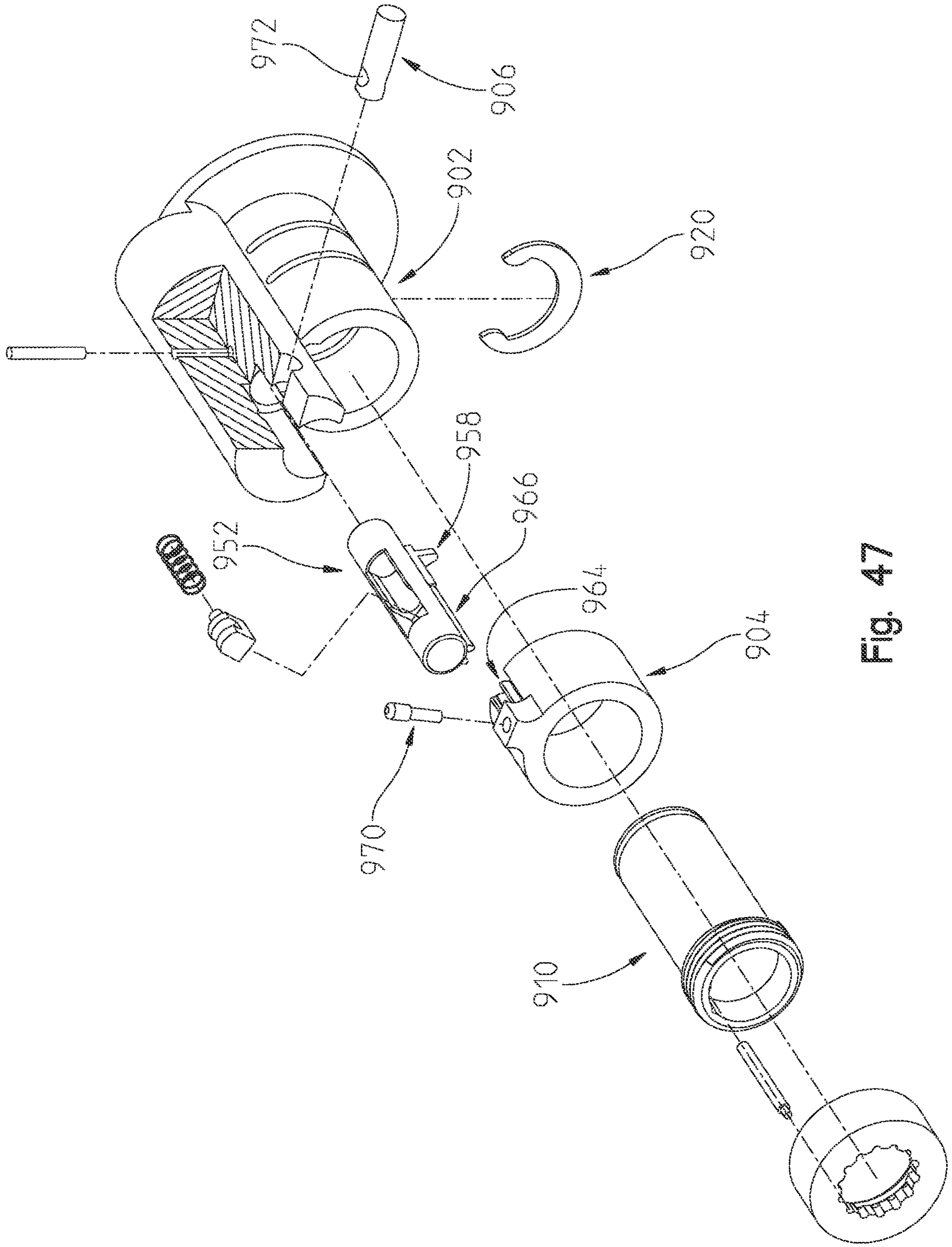
FIG. 47 illustrates an exploded view of a lock core assembly of the large format electro-mechanical interchangeable core of FIG. 45.

Turning now to FIG. 44, the spline connection between clutch 1152 and knob base 1120 is shown. As a result of this spline connection, clutch 1152 is rotationally coupled to knob cover 1128. Furthermore, the spline connection permits clutch 1152 to axial displace in axial directions 1109, 1110 and transfer torque applied to knob cover 1128 by a user. That said, the engagement features of clutch 1152 cannot engage with the engagement features of core plug body 1160 unless motor 1124 actuates to axially displace plunger 1156 in axial direction 1110. Therefore, impacting knob cover 1128 cannot cause a momentary engagement of clutch 1152 with core plug body 1160.

An advantage, among others, of electro-mechanical lock core 1100 is that no mechanical tool is required to transition or convert core assembly 1102 from the normal configuration to the control configuration. Instead, electro-mechanical lock core 1100 requires only that a user have administrator privileges. As a result, installation and removal of electro-mechanical lock core 1100 is simplified. Another advantage, among others, is the low part count of electro-mechanical lock core 1100, which results in simplified manufacturing. A further advantage, among others, of electro-mechanical lock core 1100 is increased reliability resulting from the absence of current-carrying moving parts. Additionally, there are no sliding or rotating contacts or slip rings. Instead, all of the electronics are contained within operator actuation assembly 1104 and the mechanical components are not part of the ground path.

In the exemplary embodiment shown, operator actuation assembly 1104 is supported by a unitary core body 1112 of core assembly 1102. An advantage, among others, of a unitary core body 1112 is that it is resistant to vertical and frontal impact.

Referring to FIGS. 49-57, a further exemplary electro-mechanical lock core 1200 is illustrated. Electro-mechanical lock core 1200 includes a core assembly 1202 coupled to an operator actuation assembly 1204. As explained herein in more detail, in certain configurations operator actuation assembly 1204 may be actuated to rotate a lock core plug 1206 of core assembly 1102 about its longitudinal axis 1208 (FIG. 52) and in certain configurations operator actuation assembly 1204 may be actuated to move a core keeper 1210 of core assembly 1202 relative to a core body 1212 of core assembly 1202.

Electro-mechanical lock core 1200 is configurable in an unlocked state and a locked state. Additionally, core assembly 1202 is configurable in a normal configuration and a control configuration. In the exemplary embodiment shown, core body 1212 defines a figure eight profile (see also FIGS. 54 and 55) which is received within a corresponding figure eight profile of a lock cylinder. The figure eight profile is known as a small format interchangeable core ("SFIC"). Core body 1212 may also be sized and shaped to be compatible with large format interchangeable cores ("LFIC") and other known cores. Accordingly, electo-mechanical lock core 1200 may be used with a plurality of lock systems to provide a locking device which restricts the operation of the coupled lock system. Further, although operator actuation assembly 1204 is illustrated as including a generally cylindrical knob with a thumb tab, other user actuatable input devices may be used including handles, levers, and other suitable devices for interaction with an operator.

Figure 54:
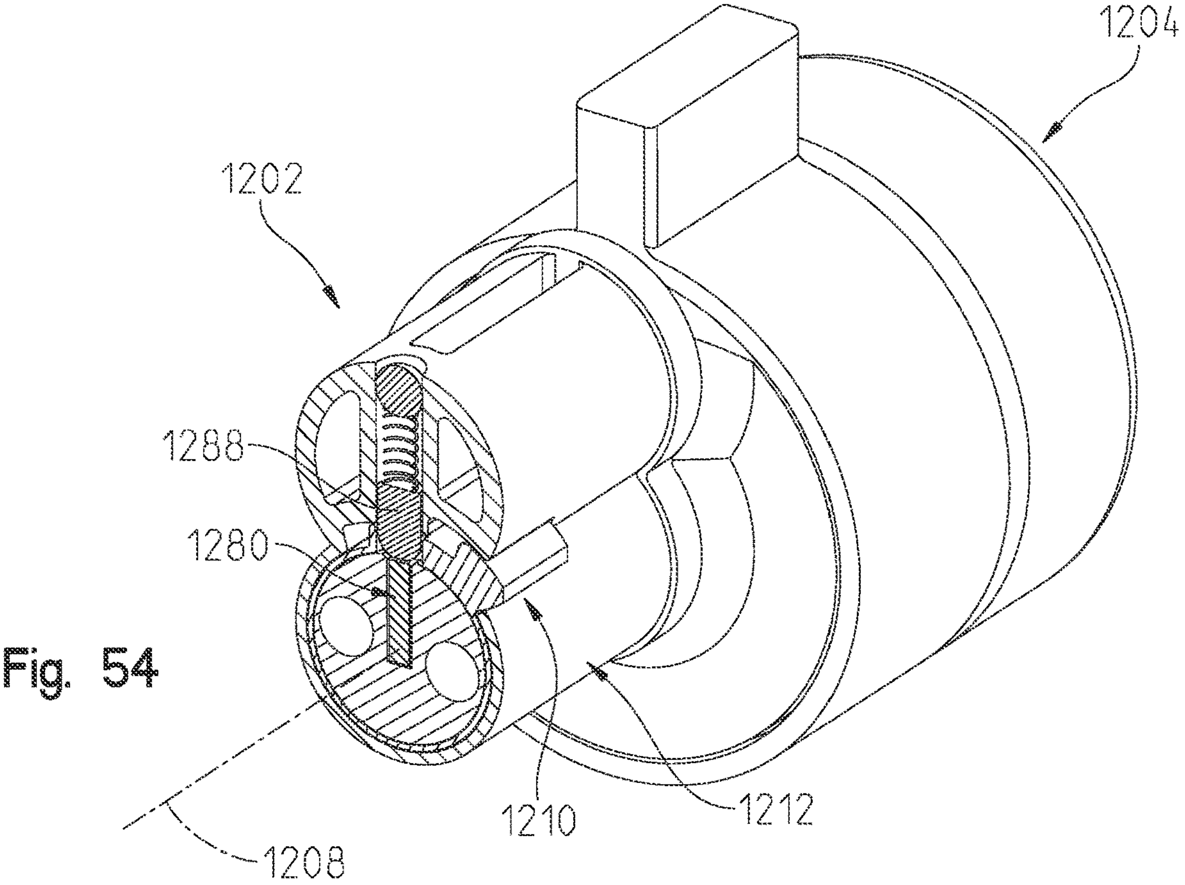
FIG. 54 illustrates a sectional view of the electro-mechanical lock core of FIG. 49 with a core keeper in an extended position taken along lines 54-54 of FIG. 49.
Figure 55:
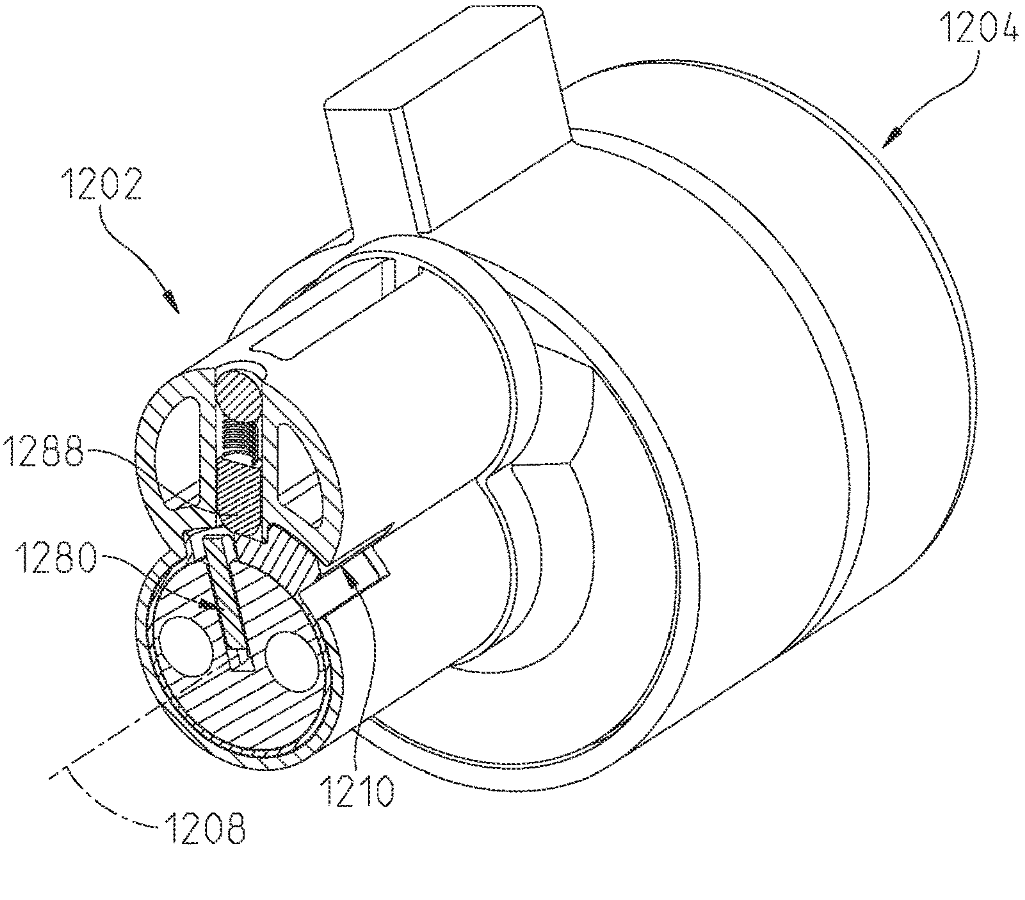
FIG. 55 illustrates a sectional view of the electro-mechanical lock core of FIG. 49 with a core keeper in a retracted position taken along lines 54-54 of FIG. 49.

Core keeper 1210 is moveable between an extended position shown in FIG. 54 and a retracted position shown in FIG. 55. When core keeper 1210 is in the extended position, core keeper 1210 is at least partially positioned outside of an exterior envelope of core body 1212. As a result, electro-mechanical lock core 1200 is retained within the lock cylinder 122 in an installed configuration. That is, core keeper 1210 prohibits the removal of electro-mechanical lock core 1200 from the lock cylinder 122 by a directly applied force. When core keeper 1210 is in the retracted position, core keeper 1210 is positioned at least further within the exterior envelope of core body 1212 or completely within the exterior envelope of core body 1212. As illustrated in FIG. 55, core keeper 1210 has rotated about longitudinal axis 1208 and been received within an opening of core body 1212. As a result, electro-mechanical lock 1200 can be removed from or installed within lock cylinder 122.

Operator actuation assembly 1204 is generally the same as operator actuation assembly 104 except that an operator actuatable base 1220 has a differing exterior profile compared to base 310. Further, clutch 300 includes a central opening 1228 (see FIG. 50) through which plunger 1156, which replaces control pin 346, extends. Lock core plug 1206 includes the engagement interface 250 of lock actuator plug 106 which mates with engagement interface 254 of clutch 300 to engage clutch 300 with lock core plug 1206. Lock core plug 1206 further includes a central aperture 1216 through which plunger 1156 may extend.

The controller 374 of electro-mechanical lock core 1200 controls motor 302 to move clutch 300 and plunger 1156 similar to the movement of clutch 1152 and plunger 1156 for electro-mechanical lock core 1100. Similar to electro-mechanical lock core 100, electronic controller 374 advances clutch 300 in direction 1250 towards lock core plug 1206 to engage engagement interface 254 of clutch 300 with engagement interface 250 of lock core plug 1206. Once engaged, an operator may rotate operator actuation assembly 1204 about longitudinal axis 1208 to actuate the lock device, such as cam member 126, to which electro-mechanical lock core 1200 is coupled.

Figure 51:
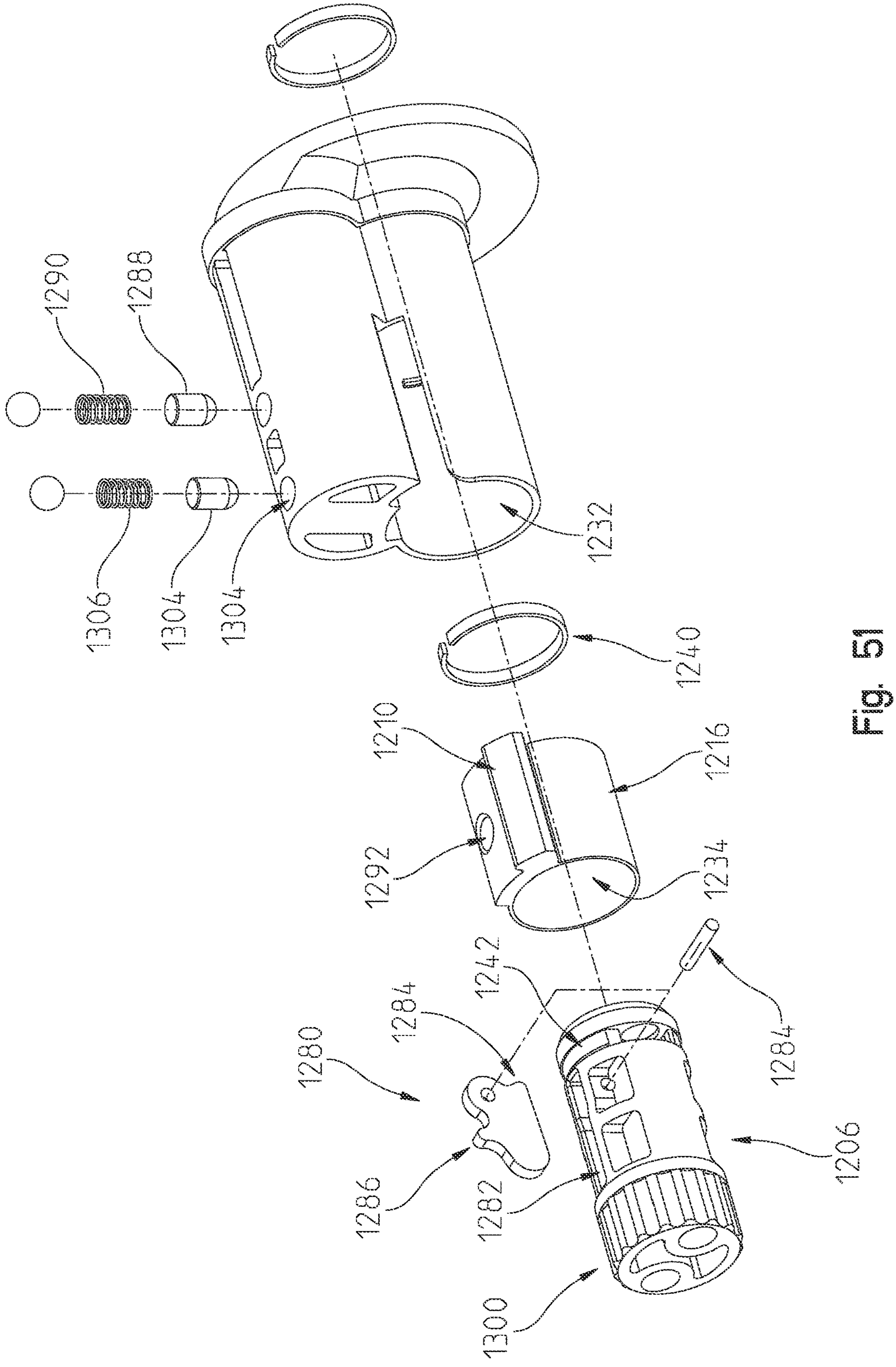
FIG. 51 illustrates an exploded view of a lock core assembly of the electro-mechanical lock core of FIG. 32.
Figure 57:
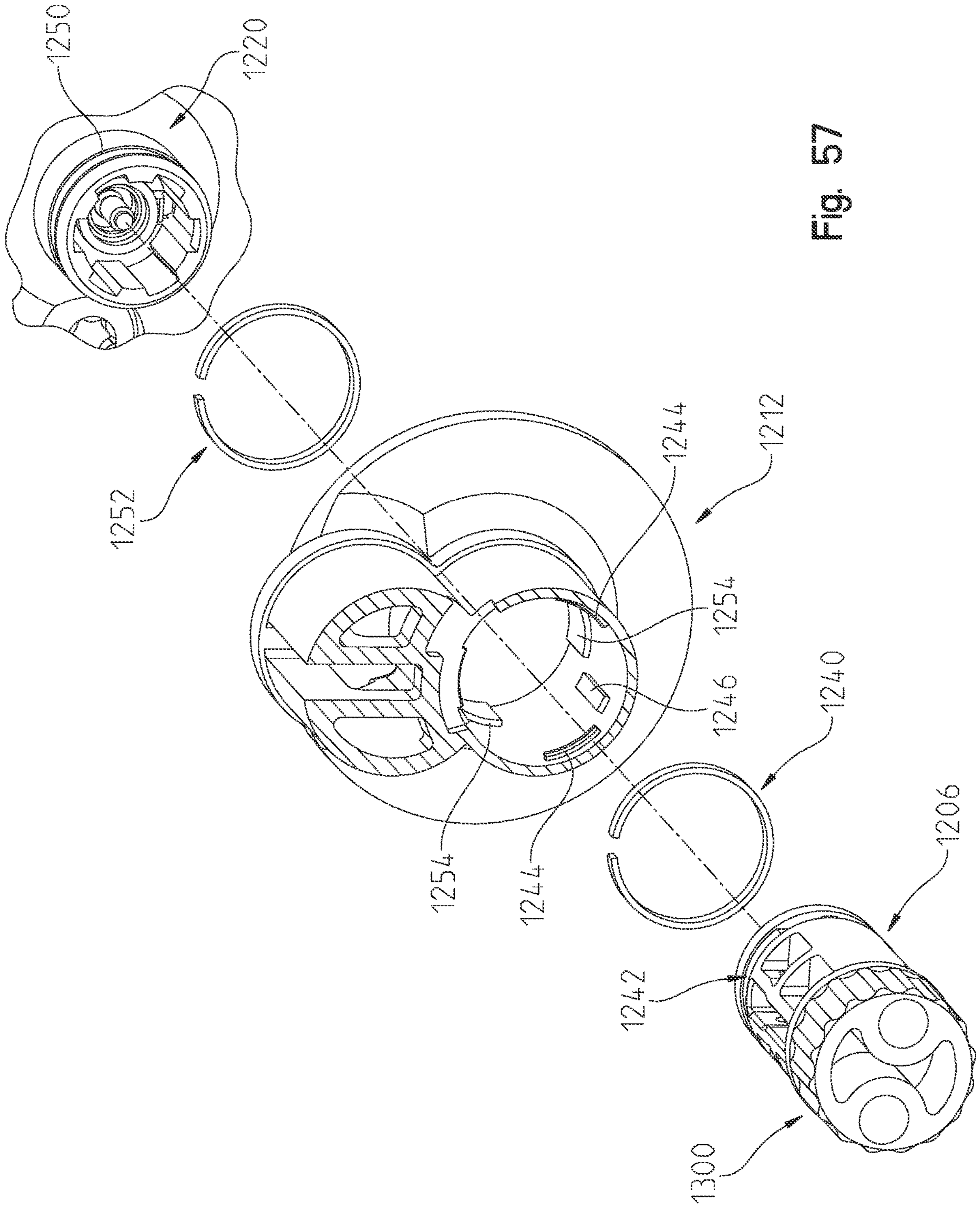
FIG. 57 illustrates a partial exploded view of the electro-mechanical lock core of FIG. 49.

Similar to electro-mechanical lock core 1100, core keeper 1210 is carried by a control sleeve 1216 (see FIG. 51). Referring to FIG. 51, core body 1212 includes a cavity 1232 which receives central aperture 1216 and lock core plug 1206. Lock core plug 1206 is further received within an interior 1234 of central aperture 1216. Referring to FIG. 57, lock core plug 1206 is held within core body 1212 with a snap ring 1240 which is partially received in a recess 1242 in lock core plug 1206 and is located between retainer tabs 1244 of core body 1212 and retainer tabs 1246. In a similar fashion core keeper 1210 includes a recess 1250 in which is partially received a snap ring 1252. Snap ring 1252 is located between retainer tabs 1246 of core body 1212 and retainer tabs 1254 of core body 1212 to hold operator actuation assembly 1204 relative to core assembly 1202.

Control sleeve 1216 supports core keeper 1210 for rotation between the extended (see FIG. 54) and retracted (see FIG. 55) positions. Control sleeve 1216 is selectively rotatable about longitudinal axis 1208. More specifically, rotation of control sleeve 1216 about longitudinal axis 1208 is controlled by a position of a cam member 1280. Referring to FIG. 51, cam member 1280 is positioned in a recess 1282 of lock core plug 1206 and is rotatably coupled to lock core plug 1206 with a pin 1284. Cam member 1280 includes an end 1284 which is contacted by plunger 1156 to cause a rotation of cam member 1280 about pin 1284. A second end 1286 of cam member 1280 contacts a pin segment 1288 through an opening 1292 in central aperture 1216. Pin segment 1288 is biased in direction 1294 (see FIG. 52) by a biasing member 1290, illustratively a compression spring.

Figure 52:
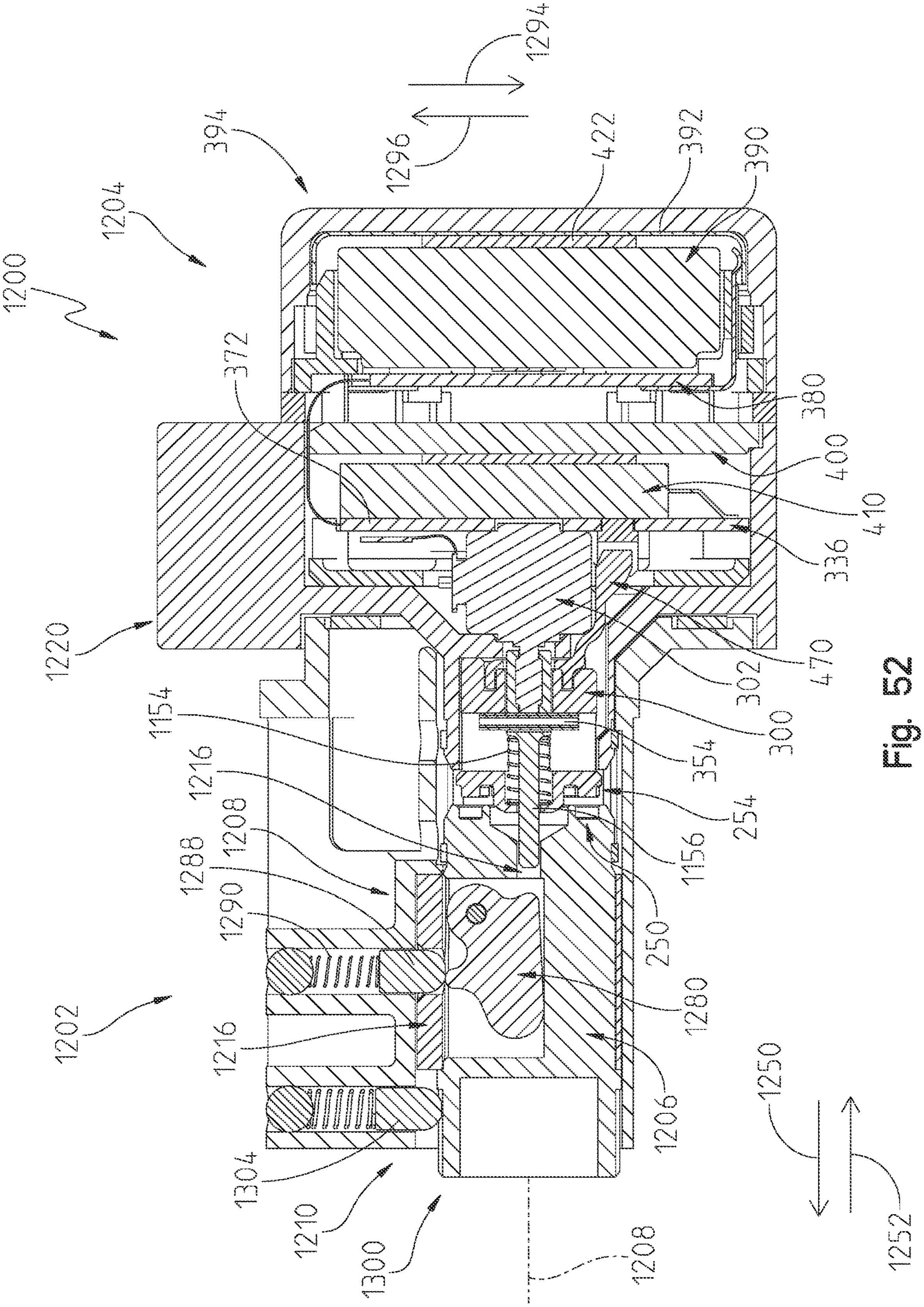
FIG. 52 illustrates a sectional view of the electro-mechanical lock core of FIG. 49 in a locked state with a disengaged clutch taken along lines 52-52 of FIG. 49.
Figure 53:
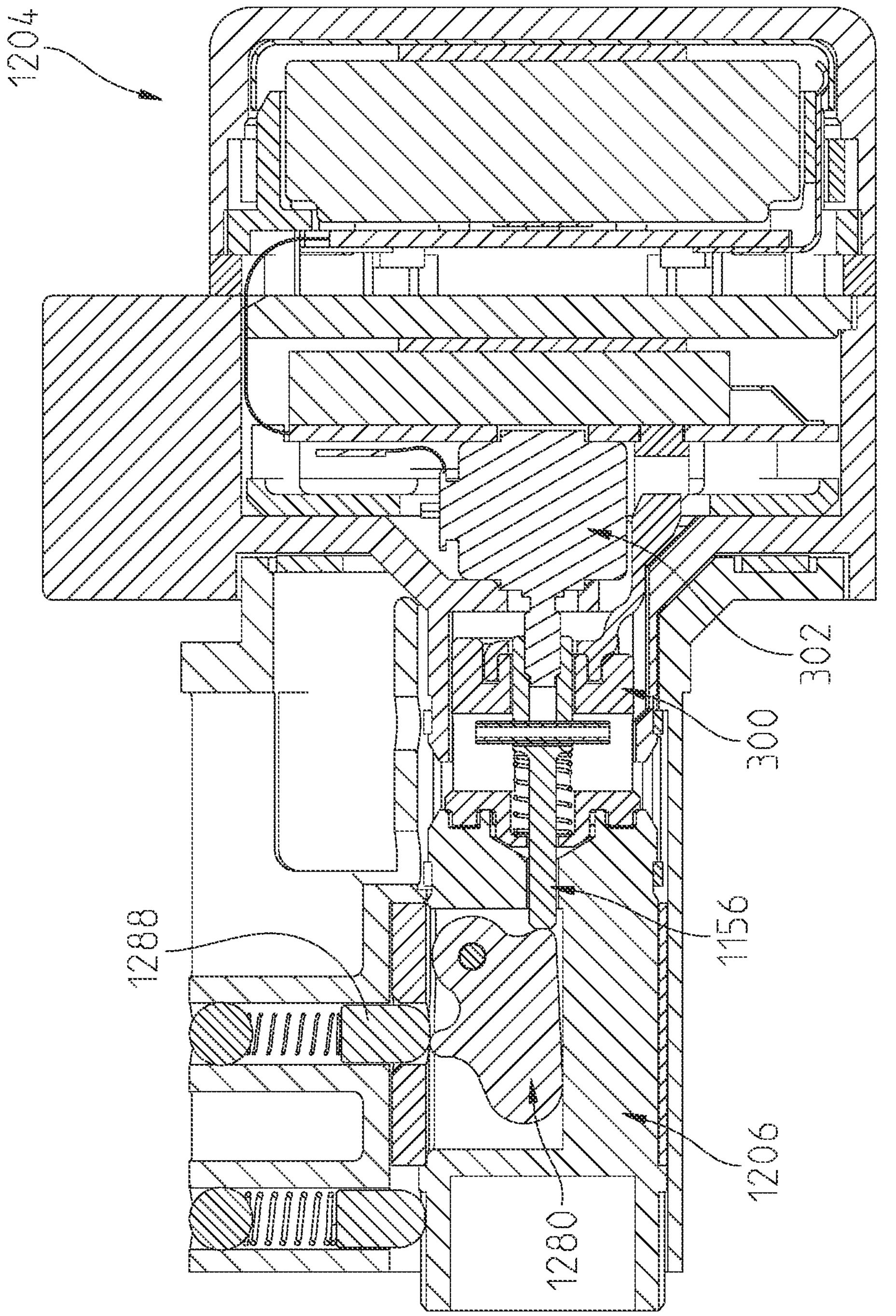
FIG. 53 illustrates a sectional view of the electro-mechanical lock core of FIG. 49 in an unlocked state with an engaged clutch taken along lines 52-52 of FIG. 49.
Figure 56:
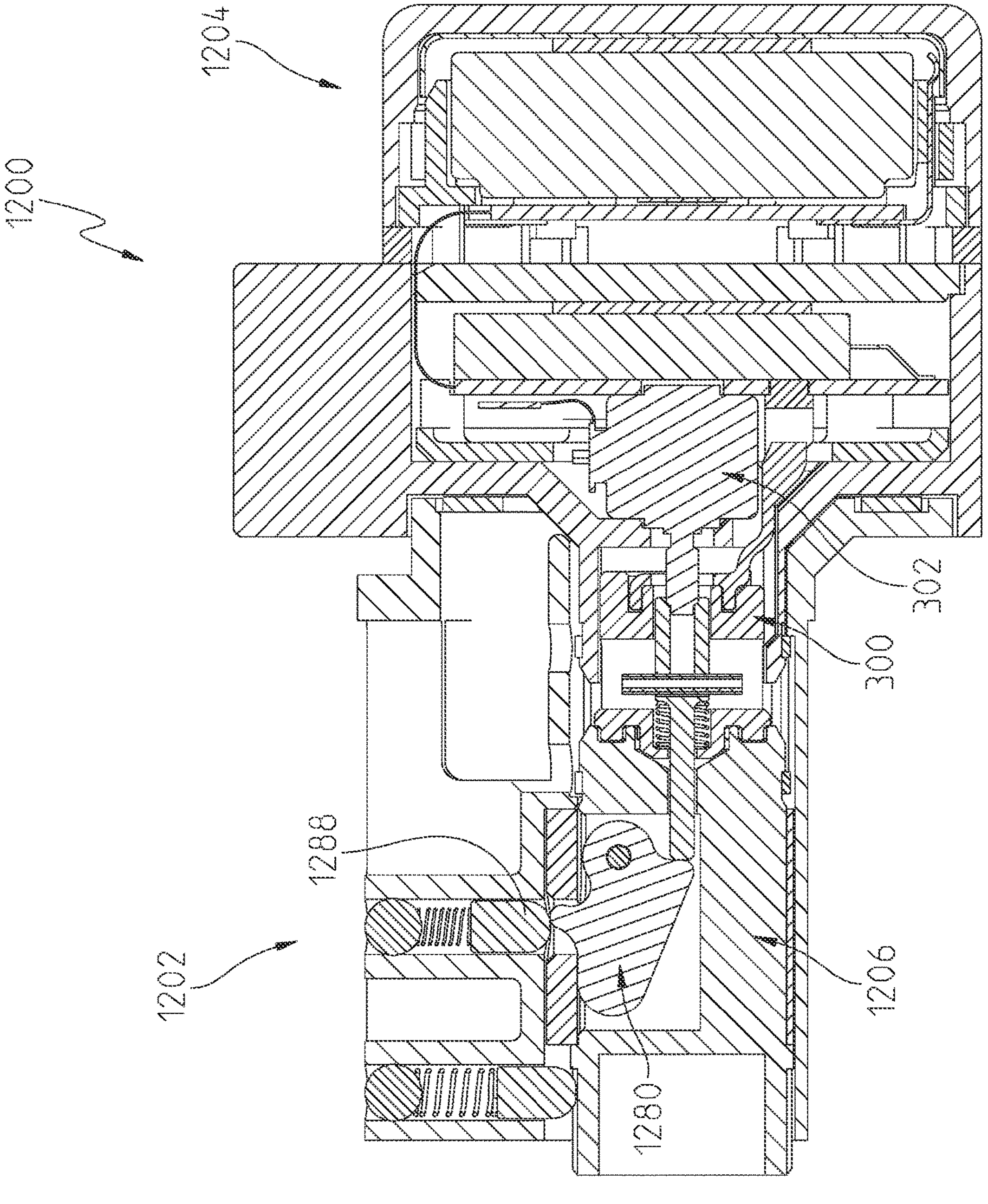
FIG. 56 illustrates a sectional view of the electro-mechanical lock core of FIG. 49 with the lock assembly in a control configuration and the engaged clutch taken along lines 52-52 of FIGS. 49.

Referring to FIG. 52, clutch 300 is disengaged from lock core plug 1206 and plunger 1156 is not contacting pin 1284 of cam member 1280. When electronic controller 374 determines that an operator has access to actuate lock core plug 1206, electric motor 302 moves clutch 300 forward to an engaged position wherein engagement interface 254 of clutch 300 engages with engagement interface 250 of lock core plug 1206, but plunger 1156 is not contacting pin 1284 of cam member 1280 (see FIG. 53). In this position, a rotation of operator actuation assembly 1204 causes a corresponding rotation of lock core plug 1206, but not a rotation of central aperture 1216. When electronic controller 374 determines that an operator has access to retract core keeper 1210, motor 302 continues to drive plunger 1156 forward relative to clutch 300 resulting in plunger 1156 contacting pin 1284 of cam member 1280 to rotate cam member 1280 about pin 1284 thereby pushing pin segment 1288 out of opening 1292 in central aperture 1216 and second end 1286 into opening 1292 of central aperture 1216 (see FIGS. 55 and 56). When second end 1286 is positioned in opening 1292 of central aperture 1216 as shown in FIGS. 55 and 56 lock core plug 1206 is coupled to central aperture 1216. In this position, a rotation of operator actuation assembly 1204 causes a corresponding rotation of lock core plug 1206 and central aperture 1216, thereby retracting core keeper 1210 to the position shown in FIG. 55.

Electro-mechanical lock core 1200 further includes an indexer 1300 (see FIG. 51). Indexer 1300, in the illustrated embodiment, is a plurality of recesses 1302 about lock core plug 1206. A recess 1302 of the plurality of recesses receives a pin segment 1304 when the recess 1302 is vertically aligned with a passageway 1302 in which pin segment 1304 is positioned. A biasing member 1306 biases pin segment 1304 into the recess 1302 and provides a tactile feedback to the operator of a rotational position of lock core plug 1206.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. An interchangeable lock core for use with a lock device having a locked state and an unlocked state, the lock device including an opening sized to receive the interchangeable lock core, the interchangeable lock core comprising:

a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body, the lock core body having a front end and a rear end opposite the front end, the front end including a front face;

a moveable plug positioned within the interior of the lock core body proximate the rear end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis;

a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position;

an operator actuatable assembly supported by the lock core body, the operator actuatable assembly including a base extending into the interior of the lock core body and an operator actuatable input device positioned forward of the front end of the lock core body and supported by the base;

an electro-mechanical control system which in a first configuration operatively couples the operator actuatable input device of the operator actuatable assembly to the moveable plug and in a second configuration uncouples the operator actuatable input device of the operator actuatable assembly from the moveable plug; and a retainer which couples the operator actuatable assembly to the lock core body at a position between the front face of the lock core body and the rear end of the lock core body.

2. The interchangeable lock core of claim 1, wherein the lock core body includes an opening and the base of the operator actuatable assembly includes a groove, the retainer being positioned in the opening of the lock core body and the groove of the operator actuatable assembly.

3. The interchangeable lock core of claim 2, wherein the groove is a circumferential groove and the retainer permits the operator actutatable assembly to freely rotate about the moveable plug axis.

4. An interchangeable electro-mechanical lock core for use with a lock device having a locked state and an unlocked state, the lock device including an opening sized to receive the interchangeable lock core, the interchangeable lock core comprising:

a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body, the lock core body having a front end and a rear end opposite the front end, the front end including a front face;

a moveable plug positioned within the interior of the lock core body proximate the rear end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis;

a core keeper moveably coupled to the lock core body, the core keeper being positionable in a retain position wherein the core keeper extends beyond the envelope of the lock core body to hold the lock core body in the opening of the lock device and a remove position wherein the core keeper is retracted towards the lock core body relative to the retain position;

an operator actuatable assembly supported by the lock core body, the operator actuatable assembly including an operator actuatable input device positioned forward of the front end of the lock core body and supported by the lock core body, the operator actuatable input device including a knob portion intersecting the moveable plug axis and a thumb tab extending outward from the knob portion; and an electro-mechanical control system which in a first configuration operatively couples the operator actuatable input device of the operator actuatable assembly to the moveable plug and in a second configuration uncouples the operator actuatable input device of the operator actuatable assembly from the moveable plug.

5. The interchangeable electro-mechanical lock core of claim 4, wherein the knob portion is rotationally symmetrical about the moveable plug axis.

6. The interchangeable electro-mechanical lock core of claim 4, wherein a first portion of the knob portion is a first portion of a base, a second portion of the base is positioned internal to the lock core body, and a second portion of the knob portion is a cover which is supported by the base.

7. The interchangeable electro-mechanical lock core of claim 6, wherein the electro-mechanical control system includes an electronic controller, a motor driven by the electronic controller, and a power source operatively coupled to the motor, each of the electronic controller, the motor, and the power source are supported by the base of the operator actuatable assembly.

8. The interchangeable electro-mechanical lock core of claim 7, wherein the knob portion circumscribes the power source and the electronic controller.

9. The interchangeable electro-mechanical lock core of claim 7, wherein the electro-mechanical control system includes a clutch positionable by the motor in a first position to engage the moveable plug in the first configuration of the electro-mechanical control system and in a second position disengaged from the moveable plug in the second configuration of the electro-mechanical control system.

10. The interchangeable electro-mechanical lock core of claim 7, wherein the power source intersects the moveable plug axis.

11. The interchangeable electro-mechanical lock core of claim 4, wherein the electro-mechanical control system includes an electronic controller, a motor driven by the electronic controller, and a power source operatively coupled to the motor, each of the electronic controller, the motor, and the power source are supported by the operator actuatable assembly.

12. The interchangeable electro-mechanical lock core of claim 11, wherein the operator actuatable assembly is freely spinning about the moveable plug axis when the electro-mechanical control system is in the second configuration.

13. The interchangeable electro-mechanical lock core of claim 12, wherein the electro-mechanical control system includes a clutch positionable by the motor in a first position to engage the moveable plug in the first configuration of the electro-mechanical control system and in a second position disengaged from the moveable plug in the second configuration of the electro-mechanical control system.

14. The interchangeable electro-mechanical lock core of claim 4, wherein the operator actuatable input device is freely spinning about the moveable plug axis when the electro-mechanical control system is in the second configuration.

15. A method of accessing a core keeper of an interchangeable lock core having an operator actuatable assembly, the method comprising the steps of:

expanding, through a non-contact method, a retaining ring which couples a first portion of an operator actuatable input device of the operator actuatable assembly to a second portion of the operator actuatable assembly in a first position to a second position, wherein the retaining ring permits the first portion to be removed from the second portion in the second position, the non-contact method comprising expanding the retaining ring from the first position to the second position using a tool positioned adjacent to an exterior surface of the first portion of the operator input device, the tool remaining spaced apart from the retaining ring throughout the expansion of the retaining ring from the first position to the second position; and moving at least the first portion of the operator actuatable input device away from the lock core to provide access to an actuator operatively coupled to the core keeper.

16. The method of claim 15, wherein the tool includes a plurality of magnets, and wherein the expanding, through the non-contact method, step includes locating the plurality of magnets of the tool proximate the exterior surface of the first portion of the operator actuatable input device.

17. The method of claim 16, wherein the first portion of the operator actuatable input device includes a knob portion and the tool is formed as a ring supporting the plurality of magnets, wherein the ring is placed about the knob portion during the step of locating the plurality of magnets proximate the exterior surface of the first portion of the operator actuatable input device.

* * * * *